United States Patent [19]

Crank et al.

[11] Patent Number: 5,583,988
[45] Date of Patent: Dec. 10, 1996

[54] METHOD AND APPARATUS FOR PROVIDING RUNTIME CHECKING FEATURES IN A COMPILED PROGRAMMING DEVELOPMENT ENVIRONMENT

[75] Inventors: Erik Crank; Jon Bellin, both of Travis County, Tex.

[73] Assignee: National Instruments Corporation, Austin, Tex.

[21] Appl. No.: 208,559

[22] Filed: Mar. 9, 1994

[51] Int. Cl.$^6$ .................................................... G06F 11/00
[52] U.S. Cl. ............................ 395/185.01; 395/183.14; 364/267.91
[58] Field of Search .................... 395/185.01, 183.02, 395/183.31, 183.11, 184.01, 185.21, 183.13, 183.14; 364/267.91

[56] References Cited

U.S. PATENT DOCUMENTS

| | | | |
|---|---|---|---|
| 4,775,932 | 10/1988 | Oxley et al. | 364/200 |
| 5,193,180 | 3/1993 | Hastings . | |
| 5,274,811 | 12/1993 | Borg et al. | 395/700 |
| 5,335,344 | 8/1994 | Hastings | 395/575 |

OTHER PUBLICATIONS

Long, Fuchs & Abraham, Compiler–Assisted Static Checkpoint Insertion, 1992 Int'l Fault–Tolerant Computing Symposium, at 58.

Nicollin, Sifakis & Yovine, Compiling Real–Time Specifications into Extended Automata, IEEE Transactions on Software Engineering, Sep. 1992, at 794.

Kessler, Fast Breakpoint Design and Implementation, Proceedings of the ACM SIGPLAN '90 Conference on Programming Language Design and Implementation, at 78.

LabWindows User Manual Version 2.3, Apr. 1994 Edition, Part Number 320312–01, National Instruments Corporation, pp. 1-1-16-16.

Object Trace product sheet; received for Object Software Inc. on Mar. 2, 1994.

Insight 1.1 product literature; dated Mar. 1994.

*Primary Examiner*—Robert W. Beausoliel, Jr.
*Assistant Examiner*—Norman M. Wright
*Attorney, Agent, or Firm*—Jeffrey C. Hood

[57] ABSTRACT

A method and apparatus for performing runtime checking during program execution in a compiled environment using the full ANSI-C programming language. The present invention detects a number of errors during runtime that cannot be found by a compiler at the precise moment that a respective C language restriction is violated. The present invention also provides the user with a direct indication of the problem, thus saving debugging time. The runtime checking features of the present invention further detects when a user is using library functions improperly. When C source code is compiled, the present invention allocates special data structures for every pointer, array and structure object in the program. An association is made between each of these objects, and its special data structure in the compiler symbol table. At runtime, these data structures contain status information about their associated objects. The present invention also inserts special machine language instructions for C expressions during compilation that either modify values in the special data structures or call internal runtime checking functions according to the present invention that use the information in the respective data structures to determine whether an expression is illegal and report errors if necessary. The runtime checking features of the present invention include a method for specifying precise restrictions on the arguments that may be passed to library functions. These restrictions are used to determine whether arguments to library functions conform to their respective restrictions and reports any violations to the user at runtime, indicating which argument caused the error and which restriction was violated.

45 Claims, 41 Drawing Sheets

Microfiche Appendix Included
(103 Microfiche, 1 Pages)

Block Info Data Structure

Pointer Info Data Structure

| Start [32 bits] | Size [31 bits] | SFlag [1 bit] | Type [32 bits] |

Dynamic Block Info Data Structure

Fig. 5

| Argument Info (an array of 64 Ptr Info objects) | Called Function Pointer |
| Return Value Info (a single Ptr Info object) | Return Function Pointer |

Current Runtime Information Data Structure

Fig. 6

| | | PtrInfo for expression (Y*)e, where e has type (x*) | |
|---|---|---|---|
| X | Y | Info | Size Ptr |
| scalar | scalar | Retain from e | Retain from e |
| scalar | void | Retain from e | Retain from e |
| scalar | ptr/str/array | IGNORE | Empty |
| void | scalar | Retain from e | Retain from e |
| void | ptr/str/array | IGNORE | Empty |
| void (dynamic) | any | (determine) | Retain from e |
| ptr | scalar/void | POINTER | Retain from e |
| array | scalar/void | (array) | Retain from e |
| struct | scalar/void | STRUCT | Retain from e |
| struct (empty) | scalar/void | STRUCT | Use Info from e |

(dynamic)–e points into dynamic memory at runtime (empty)–Block Info for e is empty (array)–special value corresponding to type of array element (determine)–determine if sufficient space; if so, create new Pointer Info; if not, report error

```
<< Running >>
double a[10];
double *ptr;

main()
{
    ptr = &a[11];

*ptr;
}
```

<< Running >>  c:\erik\ptrderef.prj
Name        C S  Date
■ijun.c     □ C  3/1/94, 12:54 PM <1> c:\erik\ptrderef.c NON-FATAL RUNTIME ERROR
"ptrderef.c", line 6, col 12
Array index [11] too large [maximum: 9].

Break     Continue

8/11     5     Ins

Screen Capture   MS-DOS Prompt   Program Manager

```
<< Running >>
 1  double a[10];
 2  double *ptr;
 3
 4  main()
 5  {
 6      ptr = &a [11];
 7
 8      *ptr;
 9
10
11  }
```

FATAL RUNTIME ERROR
"ptrderef.c", line 8, col 5
Dereference of out-of-bounds pointer: 9 bytes [2 elements] past end of array.

[Break]

Runtime Errors 3 errors
NON- FATAL RUNTIME ERROR
"ptrderef.c", line 6, col 5
Assignment of out-of-bounds pointer: 9 bytes past end of array.
FATAL RUNTIME ERROR
"ptrderef.c", line 6, col 5
Dereference of out-of-bounds pointer: 9 bytes (2 elements) past end of array.

3 of 3

Screen Capture   MS-DOS Prompt   Program Manager

METHOD AND APPARATUS FOR PROVIDING RUNTIME CHECKING FEATURES IN A COMPILED PROGRAMMING DEVELOPMENT ENVIRONMENT

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

MICROFICHE APPENDIX

The present disclosure includes a microfiche appendix comprising 1 microfiche and 103 frames. The microfiche appendix comprises appendices A–F, which are source code listings of one embodiment of the present invention. Appendix A is a source code listing of compiler code which creates data structures and inserts calls to runtime checking functions. Appendix B is a source code listing of various runtime checking functions. Appendix C is a source code listing of various dynamic memory runtime checking functions. Appendix D is a source code listing of various external library runtime checking functions. Appendices E and F are header files for appendices A–D.

FIELD OF THE INVENTION

The present invention relates to programing development and debugging tools, and more particularly to a method and apparatus for performing runtime checking of a compiled program to detect errors during program run-time that cannot otherwise be found by a compiler.

DESCRIPTION OF THE RELATED ART

Computer programmers are being called upon to develop increasingly larger and more complex software applications. In order to aid programmers in developing these applications, various software development environments have been created which include a number of useful tools to aid programmers. Programming development environments are available for many different programming languages and various examples include "Visual Basic", "QuickBASIC", "ThinkC", "Visual C++", "Borland C++", "Symantec C++", etc. The above trademarks, as well as other marks used in the present application, are trademarks of their respective companies.

A typical C programming development environment includes a source code editor, a 32 bit ANSI-C compatible compiler, a linker, a debugger, and standard ANSI-C libraries. The source code editor acts much like a word processor in allowing the software developer to enter source code which appears as text on the screen. The compiler operates to compile a source code listing into an object file, which is a set of executable machine language instructions that can then be executed on a computer. The linker is provided to link multiple object files and external libraries into a program. The debugger is used to aid in debugging the source code listing during execution.

In text-based programming environments such as C, Pascal, BASIC, etc. there are typically a number of restrictions on what constitutes a legal or valid program. For example, the C programming language includes a number of rules of "defined behavior" based on the ANSI-C standard. If a source code listing developed by a programmer does not conform to this "defined behavior," then either the program will not compile or the program will not execute properly when compiled. A certain number of programming language violations can be discovered by the compiler at compile time. However, many of the restrictions cannot be enforced by a compiler, and thus a compiled and executable program will typically include a number of errors or violations, referred to as bugs. In most programming environments, finding these bugs, referred to as debugging, is extremely difficult and time consuming, even when a debugging tool is available. Some bugs are subtle, i.e., they do not cause immediate problems in the program but cause significant problems much later during execution when finding the problem is more difficult. As a result the vast majority of software products released today include numerous undocumented bugs. Undiscovered bugs in a computer program cost software developers much time and money in addition to the time and money spent debugging the program. For example, a software developer is typically required to maintain a team of software application engineers to field user complaints, issue software patches to fix particularly troublesome bugs, and devote much research and development time in searching for and fixing bugs in future product releases. For the individual programmer, debugging is a very time consuming process, and individual programmers will typically spend much of their time and effort in finding and fixing bugs in their programs.

Therefore, a method and apparatus is greatly desired which provides a runtime checking capability wherein many types of errors in a program which cannot be found at compile time can be detected at the precise time during execution when a restriction is violated. It would also be greatly desirable for the runtime checker to provide the user with a direct indication of the problem and the line of code where it occurred, thus saving a tremendous amount of debugging time.

Various program development environments have incorporated limited runtime checking features. For example, a version of runtime checking was implemented in "LabWindows" for DOS version 1.2, which was released by National Instruments in October of 1989. LabWindows for DOS was a programming environment which supported a subset of C and BASIC that did not include structures and also did not include pointer data types, except as a way of declaring scalars passed by reference. For example, an integer passed by reference could be referred to as *i, but pointer arithmetic was not allowed and thus operations such as i++ and i[5] were illegal. Also, since pointers were not supported, dynamic memory allocation was not supported.

LabWindows for DOS also implemented language subsets through an interpreter. In other words, LabWindows for DOS would not compile a source code listing into executable machine language instructions, but rather interpreted source code instructions one at a time. The user source code was translated into a parse tree and at runtime the parse tree was traversed by the execution subsystem. In order to execute an operation node in the parse tree, a function specific to the operation type specified by the node was called. LabWindows for DOS further included built-in libraries which were statically linked into the environment. Object module libraries could be loaded either at runtime or during the execution of a menu command. These object modules or library files could be written or developed by the user, as long as they were compiled by certain defined compilers and obeyed a small set of restrictions.

The runtime checking implemented in LabWindows for DOS version 1.2 was designed to accomplish the following objectives. The first objective was to prevent users from accessing beyond the end of strings or arrays. Since LabWindows for DOS only implemented a subset of C and BASIC that did not include pointer data types, the runtime checking was limited to checking strings and arrays previously declared by a user, or subarrays and substrings passed to a function. This is a far easier task than it would be to implement runtime checking in an environment that supports the full ANSI-C language, which includes pointers, structures, casting and dynamic memory allocation. Further since the LabWindows for DOS environment was interpreted rather than compiled, the compiler issues associated with implementing runtime checking in a compiled program were not addressed. Performing runtime checking in an interpreted environment is much simpler than in a compiled environment. For example, in the interpreter used in LabWindows for DOS, much of the information that was needed for the runtime checking was required to be maintained by the interpreter for other reasons. Also, the fact that the code necessary to perform runtime checking was required to be executed before certain operations were executed was not much of an inconvenience because these operations were executed via C code in any case. In contrast, in a typical compiled-code system, very little of the information available at compile time is retained at runtime. To perform runtime checking, large amounts of data must be maintained that would otherwise not be maintained. However, it is also important that the size of the data maintained be kept to an absolute minimum because users are typically expected to create very large applications containing many modules in compiled code systems.

Although runtime checking is easier to implement in an interpreted environment than in a compiled environment, in general a programming development environment which includes a compiler is preferable to an interpreted environment because compiled code executes faster than interpreted code. Although a runtime checking capability will considerably slow down compiled code execution, the compiled code will still typically execute much faster than interpreted code that also includes runtime checking capabilities. In addition to greater speed of execution, compilers are considered to be more sophisticated than interpreters, and thus an environment which includes a compiler is more desirable than one which merely includes an interpreter.

The runtime checking capability provided in LabWindows for DOS was also designed to prevent users from passing argument values to library functions that could cause the functions to access beyond the end of strings or arrays. This was principally for situations where the passing of such argument values would not be detectable by the library alone without aid from the interpreter and its symbol tables. Runtime checking was further designed to prevent users from passing argument values to library functions that were inconsistent with each other or inconsistent with argument values passed to the library in a previous function call. This was also designed to prevent situations where such inconsistencies would not be detectable by the library alone without aid from the interpreter and its symbol tables.

The latter two runtime checking operations described above which checked arguments to library functions were required to be handcoded. In other words, for each of these functions for which a runtime check was necessary, a companion function was required to be written which received information from the interpreter. This companion function required knowledge of the interpreter's data structures, and consequently only developers of LabWindows for DOS were able to create these companion functions. In addition, the companion function was called only if it was installed in the symbol table for the library when its related library function was installed. There was no automated way of accomplishing this except by handcoding the function installation, which again could only be done by developers of LabWindows for DOS. Therefore, although LabWindows for DOS could load object module libraries written by anyone, there was no automated mechanism available to allow users to implement runtime checking for their library functions. Only LabWindows developers could implement runtime checking, and runtime checking was performed only for libraries developed by National Instruments. Further, although LabWindows for DOS provided some functions that could be called in the object module library to check array and string sizes, this was not a complete solution. If the object module library function was called internally as well as by the end user program, these special runtime checking functions could not be used.

Another product that includes limited runtime checking capabilities is QuickBASIC from Microsoft Corporation. QuickBASIC contains an editor, compiler, and debugger in one program and includes a runtime checking feature that ensures that the user does not access beyond the end of an array. The QuickBASIC language stores each array with size information, and thus programs compiled with the stand alone QuickBASIC compiler automatically perform these runtime checks. However, QuickBASIC does not include a pointer data type and thus does not require runtime checking for pointer data types. Further, QuickBASIC does not include embedded libraries and thus does not include runtime checking for embedded libraries. QuickBASIC also does not have any mechanism for specifying runtime checks for compiled code, except that code compiled with the QuickBASIC compiler automatically performs array access checks as described above. Furthermore, if compiled C modules are used, a language interface routine must be written that can use the (undocumented) size information in the array to perform its own checks. Therefore, although QuickBASIC provides some limited runtime checking capabilities, i.e., automatic runtime checking for array accesses, a runtime checking capability is greatly desired which contends with all aspects of runtime checking. A runtime checking capability is further desired which has a general mechanism for supporting runtime checks at the point where externally compiled code is called into a program.

A UNIX product called CodeCenter from Centerline Corporation includes a C interpreter that performs limited runtime checks. However, CodeCenter only performs runtime checking in an interpreted environment and does not include a compiler. As noted above, it is far easier to perform runtime checking in an interpreted environment than it is in a compiled environment. CodeCenter also does not include a general mechanism for supporting runtime checks at the point where compiled code is called into a program. Code Center may also include an embedded ANSI-C library that performs runtime checking, but there is no general mechanism provided for other library developers to use.

A UNIX product called Purify developed by Pure Software, Inc. takes a very different approach to runtime checking. Purify is a "back-end" add on product that is not a compiler or a programming environment like the products described above. Rather, Purify modifies a user's object files to record information after every memory access and makes checks before every memory access. This product makes only limited checks at the language level. For instance, Purify imposes "invalid zones" around array boundaries which allow it to catch the overriding of arrays by a few bytes, but not by a large number of bytes. Thus, Purify does not perform runtime checks that are supported at the compiler lever and thus does not make complete checks at the language level. For more information on the operation of Purify, please see U.S. Pat. No. 5,193,180 titled "System for Modifying Relocatable Object Code Files to Monitor Accesses to Dynamically Allocated Memory" and assigned to Pure Sonware.

One drawback to Purify is that information provided to the user when an error occurs is limited since Purify has little source code information. It would be highly desirable for a runtime checking program to provide a user with the precise location (including the exact C expression) that caused an error.

Also, Purify catches only fatal errors and does not attempt to catch the following non-fatal errors: a) Illegal pointer arithmetic; b) Illegal pointer comparison; c) Illegal pointer subtraction; d) Casting an object into a larger type; and e) Assignment of invalid pointer expressions. It would be highly desirable for a runtime checking program to detect the above non-fatal errors.

Further, Purify does not strictly enforce certain ANSI-C restrictions because it does not have language information. In particular, Purify may not catch an illegal reference of a pointer to freed memory. If the block of memory to which a freed pointer refers is reallocated by another call to malloc (), references to the freed pointer may not flag an error since it now points to an allocated block of memory. Purify may also not catch references beyond array boundaries of locals since it does not check for boundaries of local arrays. Also, Purify may not catch references of more than 8 bytes beyond array boundaries. Purify cannot catch accesses that extend more than the number of bytes in the "buffer zone" at array boundaries.

In addition, Purify requires modification of externally compiled object and libraries. Finally, Purify is closely tied to the hardware and system for which it was designed. Complete knowledge of the system functions, object code format, and the type of CPU is required. It would be highly desirable for a runtime checking program to be hardware/ system independent.

Therefore, an improved method and apparatus for performing runtime checking in a programming development environment is desired. An improved runtime checking capability is desired which can perform runtime checking on compiled programs which support full ANSI-C, including pointers, structures, casting and dynamic memory allocation. Performing runtime checking in this context is considerably more difficult than in an environment that supports only a subset of a text-based language that does not contain pointer data types, etc. Runtime checking in a full ANSI-C environment must contend with pointers that can be assigned arbitrary values, be incremented or decremented, and point to structures that contain pointers to other structures. A runtime checking capability is also desired which can be incorporated into a programming development environment including a compiler, as opposed to merely an interpreter. As discussed above, performing runtime checking in a compiled environment is far more difficult than in an environment which merely includes an interpreter. A runtime checking capability is further desired which can provide an automated mechanism for users to create and install runtime checking functions for their object module library functions. A capability is also desired which performs runtime checks on the arguments to library functions, their consistency with other parameters, and their consistency with previous information passed to the library.

SUMMARY OF THE INVENTION

The present invention comprises a method and apparatus for performing runtime checking operations during execution of a compiled program in an environment which supports the full ANSI-C programming language. The present invention detects a number of errors during runtime that cannot be found by a compiler, including errors in various types of pointer manipulation and dynamic memory allocation. The runtime checking features of the present invention further detect when a user is using library functions improperly. The above errors are detected at the precise moment that a respective C language restriction is violated, and the user is provided with a direct indication of the problem and the location in the source code file where the violation occurred, thus saving debugging time.

The runtime checking features of the present invention are implemented in an integrated compiler/execution environment which allows direct access to compiler data structures at runtime. The present invention is also preferably implemented in a single process system, and thus there is no overhead involved with context switches and interprocess communication. When a respective source code file is compiled, the present invention allocates special data structures for every pointer and aggregate data item, i.e., arrays and structures, in the program. At runtime, these data structures contain status information about their associated objects.

An association is made between each of these objects and its special data structure in the compiler symbol table. For an executable file not compiled by the compiler of the present invention that includes definitions of pointers or aggregate data items used in other executable files compiled by the compiler of the present invention, a linker operates to assign an ignore value to those expressions where the pointers and aggregate data items are used to disable runtime checking for these objects. This is because these objects will not include the associated data structures necessary for runtime checking.

Also during compilation, the present invention inserts special machine language instructions and function calls into the executable code for C expressions that manipulate pointers, arrays, or structures. The instructions are used to modify values in the special data structures at runtime. The function calls call internal runtime checking functions according to the present invention that use the information in the respective data structures to determine whether an expression is illegal or invalid and report errors if necessary. These runtime checking functions utilize coordinates where the respective C expression being checked is located so that the user can be informed of the precise location in the source code file where the bug is located.

The special data structures that are created by the present invention collectively contain information about every pointer, array and structure in the user's program. These data structures are as follows. A data structure referred to as Block Info is associated with every aggregate data item, including arrays and structures, but not unions, and contains information about the beginning and size of the object and whether the object is a structure or an array. A data structure referred as Pointer Info is associated with every pointer object, including pointers in structures and arrays, and includes information about the object to which the pointer refers. A data structure referred to as Dynamic Block Info is associated with every block of memory allocated by the malloc function and is created at runtime. This data structure includes information regarding the beginning of the memory block, the size of the block, whether the object contained in the memory block is a structure or an array and the type that was first used to reference the dynamic memory. A fourth data structure is used to store current runtime information, i.e., information about the current runtime state as it relates to runtime checking. The information in this data structure facilitates use of protocols for passing and retrieving runtime checking information for function arguments, and for returning and receiving runtime checking information from a called function.

During runtime or program execution, runtime checking operations are provided for almost all pointer references, including pointer dereferences, pointer arithmetic operations, pointer and structure assignments, pointer comparisons and subtractions, pointer casting, and passing and returning pointers and structures to and from functions. These runtime checking functions check for illegal or invalid operations and report the error to the user.

Dynamic memory operations are handled differently than other operations because, unlike other objects, the type and size of objects stored in dynamic memory are not known at compile time. In other words, the memory allocation routines in C include no information about the type of the object that will be stored in memory. The present invention dynamically allocates a Dynamic Block Info data structure for each dynamically allocated object. When an object is deallocated, the present invention sets the size field of the Dynamic Block Info data structure to zero to indicate that the object is free. The Dynamic Block Info data structure is preferably never deallocated itself until the program terminates. In order to better track dynamic memory objects, the present invention monitors cast expressions from pointers into dynamic memory. The first time a pointer into dynamic memory is cast into a non-void type, the present invention records this type in the Dynamic Block Info data structure and allocates any additional informational objects needed for providing runtime checking.

The present invention further includes runtime checking operations for library functions. The present invention allows a user to specify restrictions for the arguments to individual functions in a library. A library compiler referred to as libprot uses these user-specified restrictions to generate C source code that includes calls to internal functions which verify that the arguments to the functions satisfy the restrictions. The generated source code is compiled and linked in to the respective source code being compiled. When the user's compiled code calls a library function, the present invention links in the specially generated function which performs checks on the arguments at runtime before calling the actual library function. In this manner, invalid arguments are detected at runtime prior to the library function being called.

Therefore, a method and apparatus for performing runtime checking in a compiled programming development environment is disclosed. The present invention implements runtime checking in an environment which supports the full ANSI-C programming language, including pointer manipulation and dynamic memory allocation. Further, the present invention supports runtime checking of arguments passed to external libraries.

BRIEF DESCRIPTION OF THE DRAWINGS

A better understanding of the present invention can be obtained when the following detailed description of the preferred embodiment is considered in conjunction with the following drawings, in which:

FIG. 5 illustrates a Dynamic Block Info data structure created at runtime for dynamically allocated objects;

FIG. 6 illustrates a Current Runtime Information data structure which is used during program execution to monitor runtime checking operations;

FIG. 11 is a chart illustrating operation of a cast expression when casting from a pointer to an object of type X to a pointer to an object of type Y;

FIGS. 28A–B to 31A–B illustrate operation of the present invention in notifying the user of various runtime errors.

DETAILED DESCRIPTION OF THE PREFERRED EMBODIMENT

Figure 1:
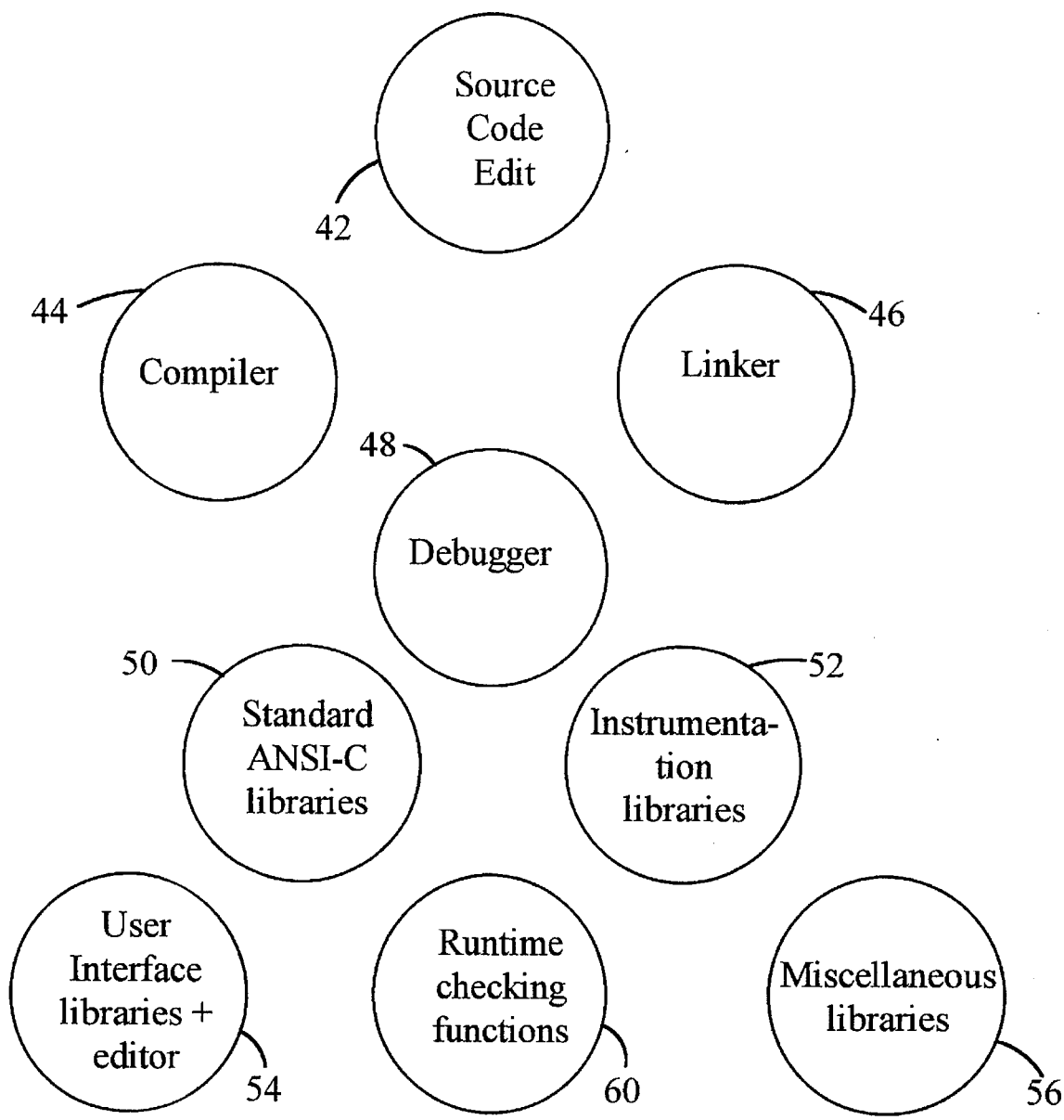
FIG. 1 illustrates the various components in the programming development environment according to the present invention.

Referring now to FIG. 1, a diagram illustrating a programming development environment including runtime checking capabilities according to the present invention is shown. In the preferred embodiment, the programming development environment preferably includes a C source code editor 42, a 32 bit ANSI-C compatible compiler 44, a linker 46, a debugger 48, standard ANSI-C libraries 50, various instrumentation libraries 52, a user interface library and editor 54, various miscellaneous libraries 56, and runtime checking functions 60 according to the present invention. The compiler 44 creates data structures and inserts various instructions and function calls into the compiled code according to the present invention. The data structures are preferably created for certain data items or objects in the user's code, preferably for each pointer and aggregate data item. In the present disclosure, the term aggregate data item includes arrays and structures. The instructions inserted into the code are generally used during runtime to update these data structures as the respective data items change during program execution. The function calls comprise calls to runtime checking functions 60 which perform various runtime checking operations of the present invention. The runtime checking functions of the present invention alert the user to errors in his/her code as well as the precise line where the error occurred. In the present disclosure, the various types of errors which may occur in a program are collectively referred to as invalid operations.

In the preferred embodiment, the present invention is incorporated into a programming development environment that is adapted for instrumentation programming. In this embodiment, the instrumentation libraries include various instrumentation specific tools and libraries for data acquisition analysis and presentation, including libraries for GPIB (general purpose interface bus), RS-232, VXI bus, data acquisition and analysis, as well as various instruments drivers for controlling devices from various instrument vendors. However, it is noted that the runtime checking features of the present invention can be adapted for any type of development environment, including either a general purpose programming development environment or environments that are specifically adapted and suited for other applications. It is also noted that the runtime checking features of the present invention may be adapted to any type of programming language, including C, C++, Pascal, BASIC, Ada, etc. However, in the preferred embodiment, the runtime checking features of the present invention are adapted to the ANSI-C programming language.

Figure 1A:
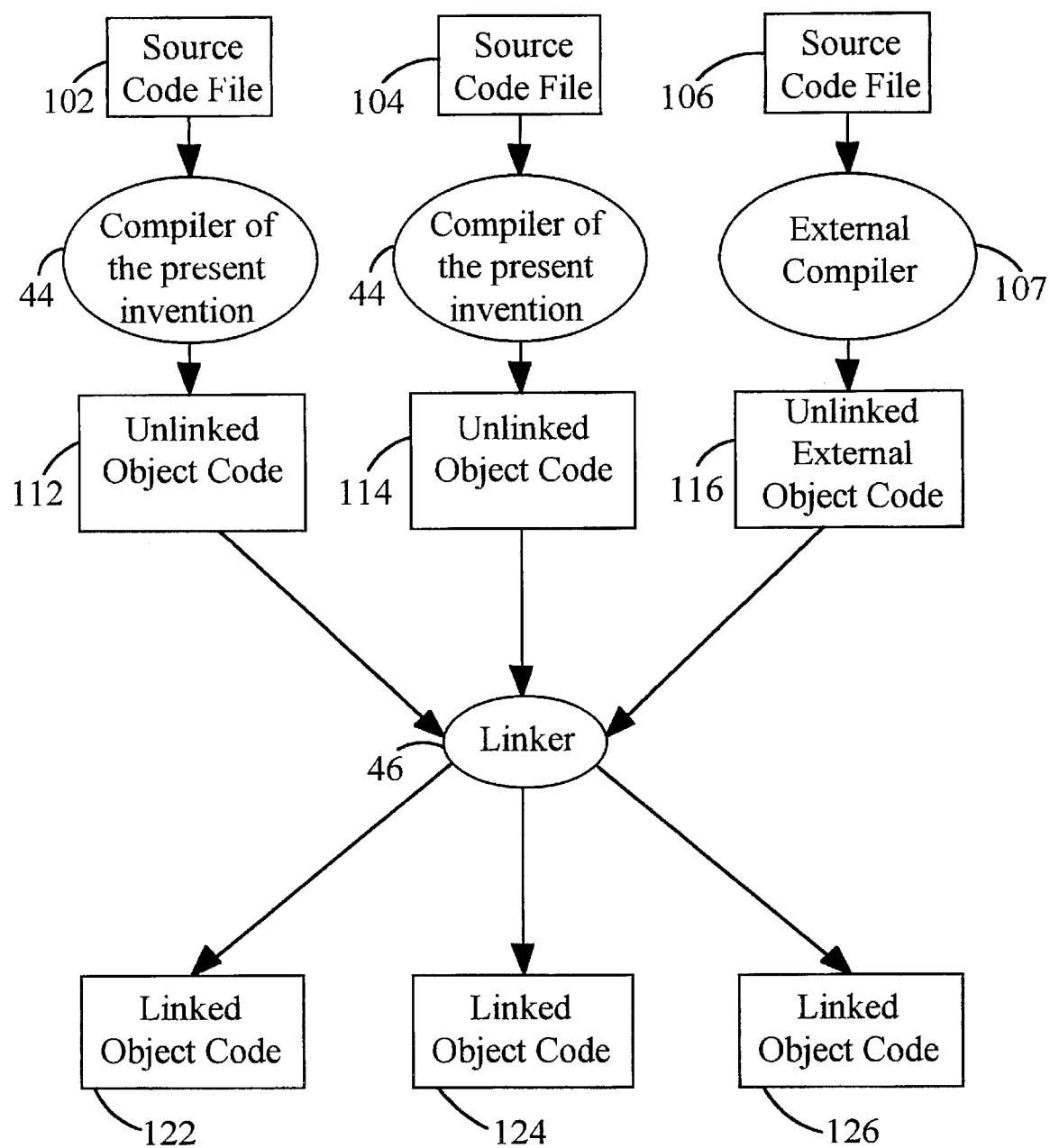
FIG. 1A is a block diagram illustrating operation of the compiler and linker of the present invention in transforming source code files into linked executable files.

Referring now to FIG. 1A, a block diagram illustrating operation of the compiler 44 and linker 46 of the present invention in transforming one or more source code files into linked object code files or executable ties is shown. As shown, one or more source code files 102 and 104 are compiled by the compiler of the present invention and thus produce unlinked object code 112 and 114 as shown. In addition, a source code file 106 may be compiled by an external compiler 107, i.e., a compiler not according to the present invention, which generates unlinked external object code file 116. The various unlinked object code generated by the compiler of the present invention 112 and 114 as well as the unlinked external object code 116 are then provided to the linker 46 according to the present invention. The linker 46 operates to link the respective object code files into linked object code 122, 124 and 126 as shown.

In many cases it is possible for one source code file 102 to have expressions which include objects, i.e., pointers or aggregate data items, wherein the definition of these objects appear in a separate source code file 104. In the instance where the source code file which includes a respective object in an expression and the source code file which includes the definition of this object are both compiled by the compiler of the present invention, the linker 46 operates to associate the data structure created by the compiler of the present invention and the use of that object in the respective source code file. In the instance where the source code file which includes a respective object in an expression is compiled by the compiler of the present invention, and the source code file which includes the definition of this object is not compiled by the compiler of the present invention, the linker 46 operates to return an IGNORE value for each instance where that object is used.

Figure 1B:
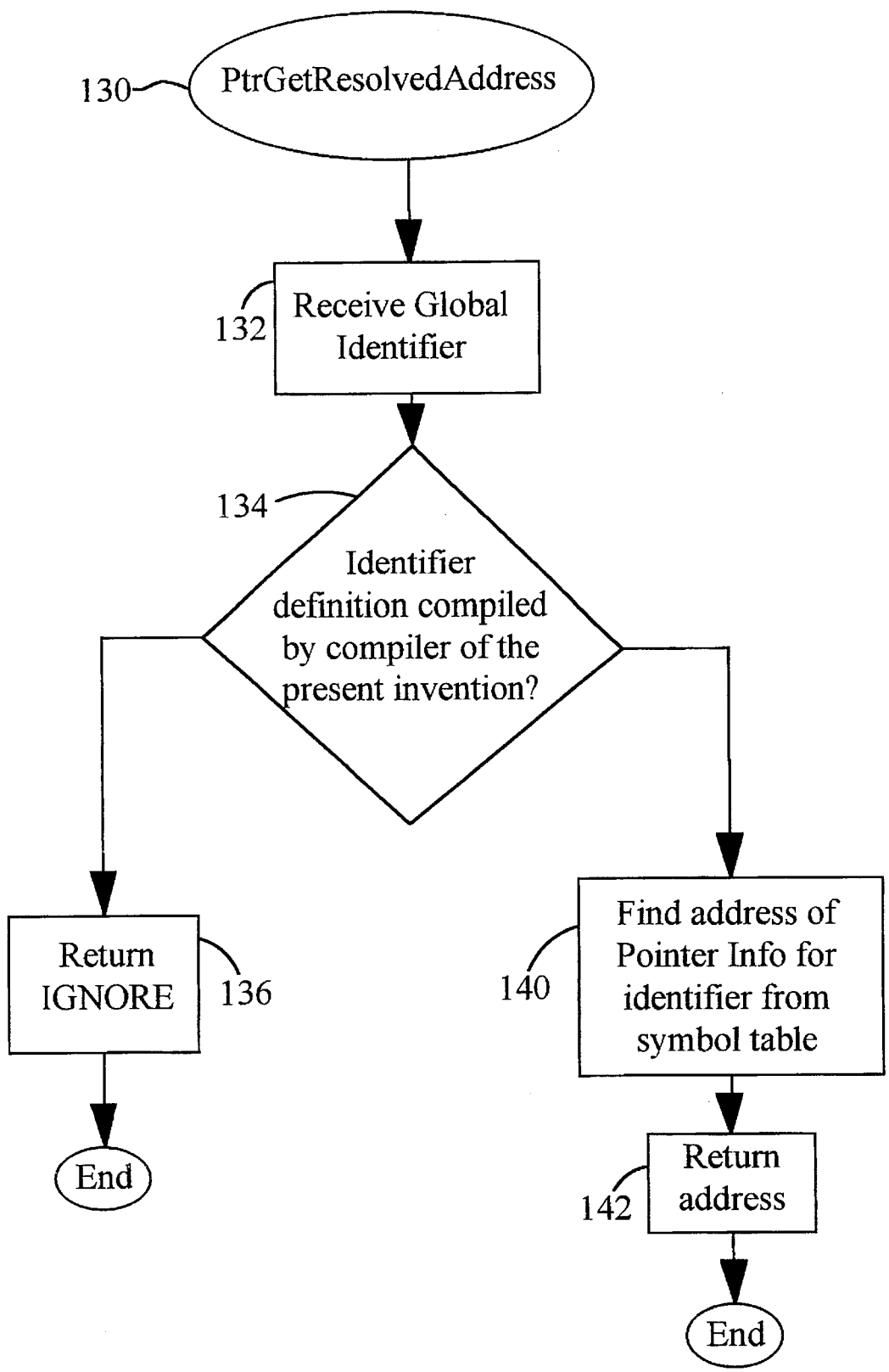
FIG. 1B illustrates a function performed in the linker of FIG. 2.

Referring now to FIG. 1B, a function referred to as PtrGetResolvedAddress comprised in the linker 46 is called in step 130. This function receives an object or identifier, preferably either a pointer or aggregate data item, in step 132 from a source code file compiled using the compiler of the present invention. In step 134 the function determines if the definition of the respective identifier was compiled by the compiler of the present invention. If not, then in step 136 the IGNORE value is returned for this identifier, and thus during execution no runtime checking of this object or identifier occurs. In this manner, runtime checking is disabled for identifiers or objects that were defined in externally compiled code. This is necessary because no data structure will have been created for this object, and thus no runtime checking can occur for this object.

If the definition of the respective identifier was compiled using the compiler of the present invention, then in step 140 the linker finds the address of the Pointer Info data structure for the identifier from the compiler symbol table. In step 142, the linker returns this address to the respective function. Therefore, the function PtrGetResolvedAddress operates on each global identifier or object compiled by the compiler of the present invention to link or associate respective objects with their respective data structure. For objects that are defined in a source code file that is not compiled by the compiler of the present invention, runtime checking is disabled for this object.

Figure 2A:
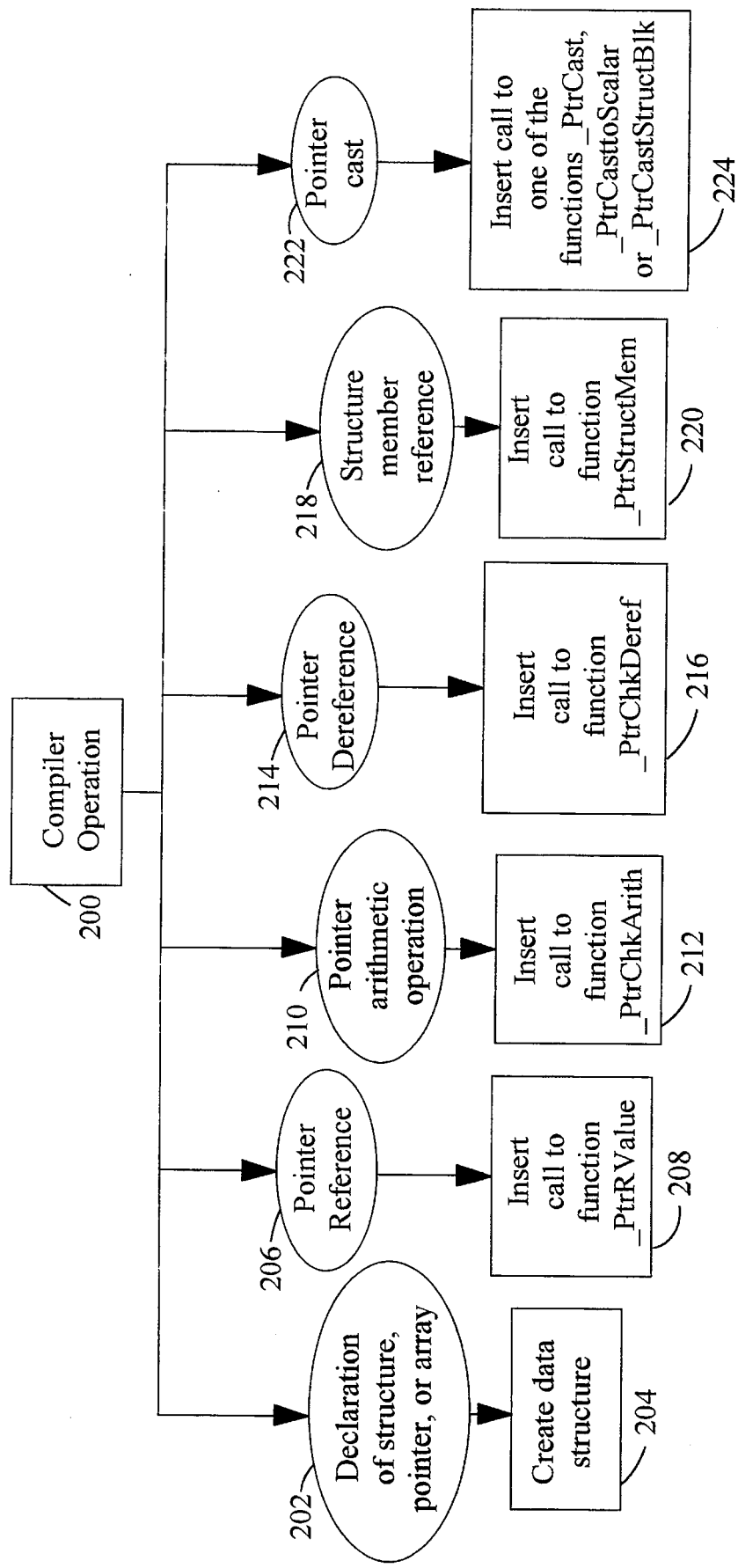
FIGS. 2A–C illustrate the operation of the compiler according to the present invention.
Figure 2B:
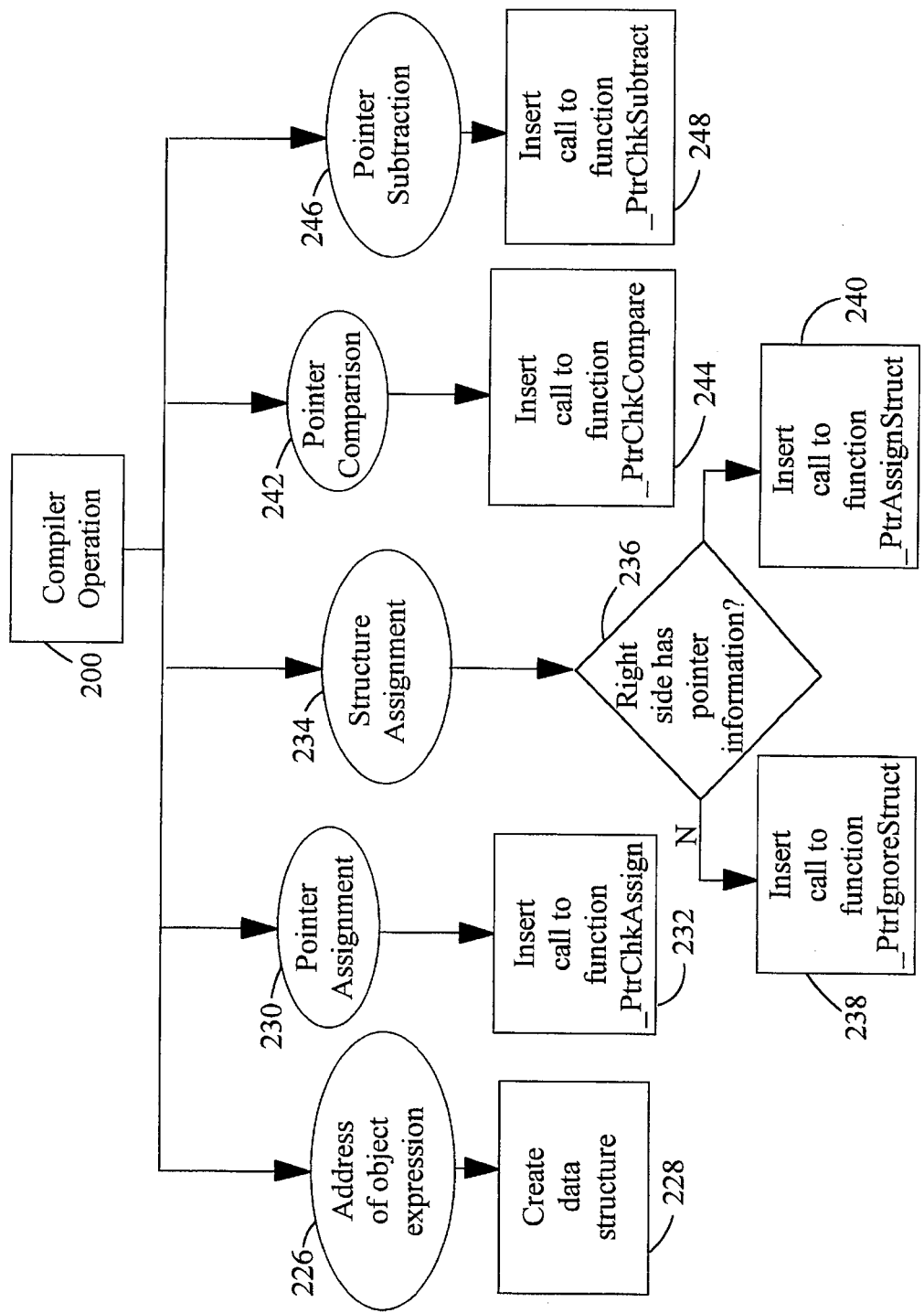
Figure 2C:
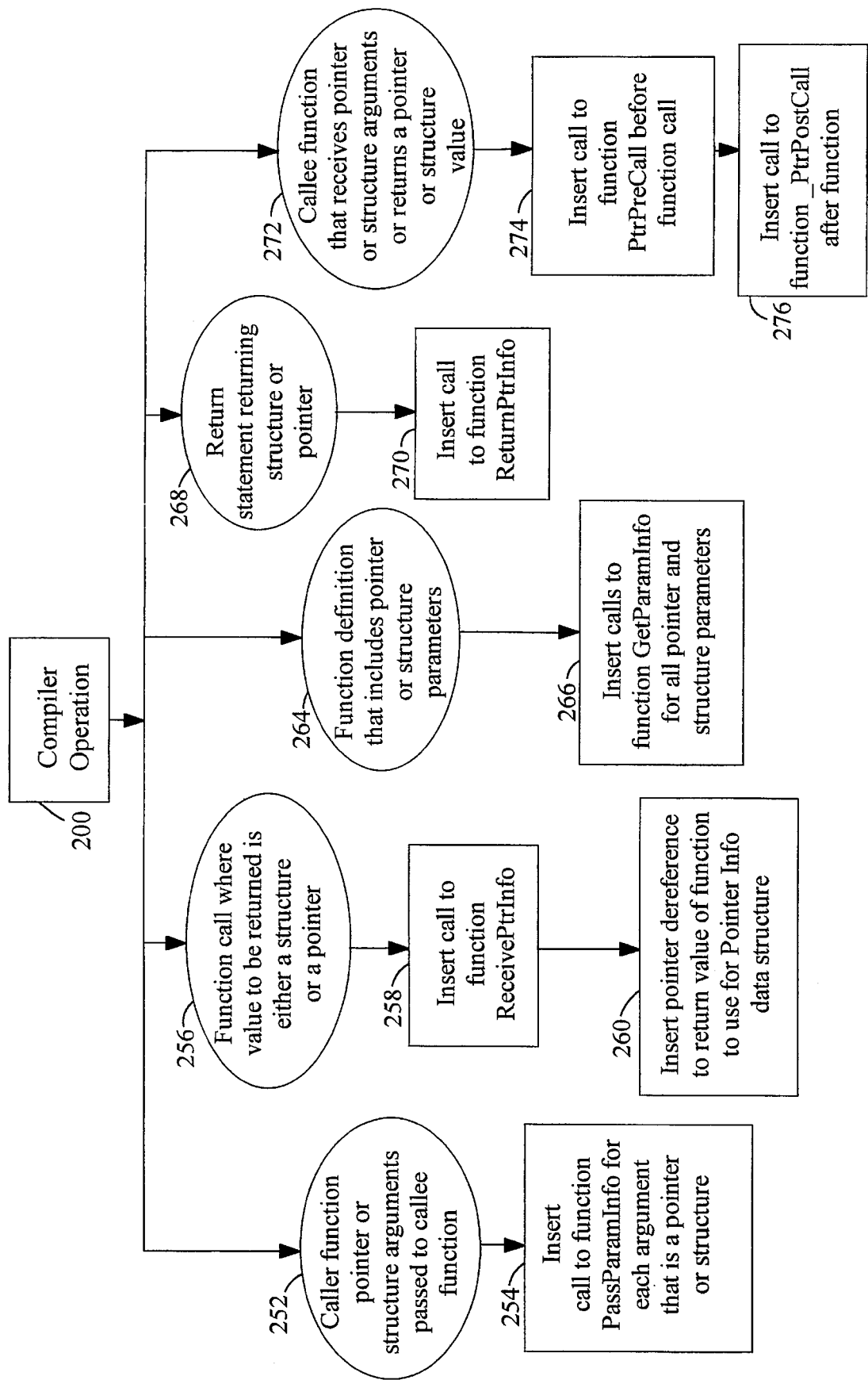

Referring now to FIGS. 2A–C, a flowchart diagram illustrating a portion of the operation of the compiler in compiling a source code program listing is shown. When the compiler of the present invention encounters various declarations, instructions, etc. in the source code listing, the compiler creates various data structures, inserts instructions, or inserts calls to runtime checking functions. These data structures, instructions, and function calls are then used during runtime of the compiled source code to implement the execution checking features of the present invention. A source code listing of one embodiment of the compiler is included as Appendix A in the file up_comp.c.

In the preferred embodiment of the invention, for each function call inserted into the code the compiler passes the coordinates of the respective expression being checked. These coordinates take the form of PtrLeftCoord and Ptr-RightCoord, which are encoded with information about the line number and column number of the expression. The variable PtrLeftCoord is encoded with the line number and column number of the beginning of the expression and the variable PtrRightCoord is encoded with the line number and column number of the end of the expression. The compiler generates these coordinates as it scans through the source code file during compilation. If an error occurs these coordinates are used to inform the user of the precise location where the error occurred.

Declarations of Structures, Arrays, and Pointers—Data Structures

As shown in FIG. 2A, when the compiler encounters a declaration of a structure, an array, or a pointer in step 202, the compiler creates a special data structure associated with the particular object being declared according to the present invention in step 204. The respective data structure for each object is maintained and updated during runtime and is used to facilitate the runtime checking features of the present invention. The various data structures that are created by the compiler and used according to the present invention are described below.

1. Block Info Data Structure

Figure 3:
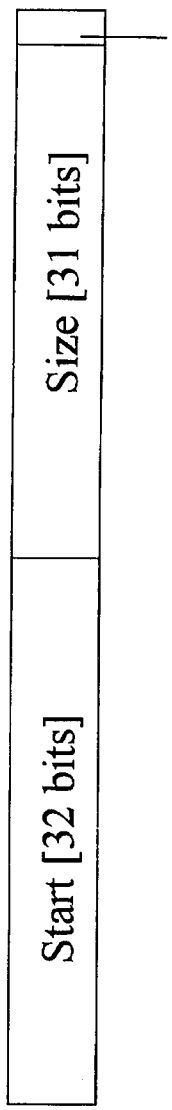
FIG. 3 illustrates a Block Info data structure created at compile time for aggregate data items.

Referring now to FIG. 3, a data structure referred to as Block Info is an 8-byte object that is created by the compiler for respective aggregate data items, these preferably being arrays and structures, but not unions. It is noted that runtime checking is not provided for unions or their members in the preferred embodiment. Also, arrays of arrays are treated as single multidimensional arrays. As a result, no Block Info is generated for arrays within arrays. The Block Info data structure includes the following fields:

Start [32 bits]: points to beginning of the object

Size [31 bits]: size of the object (in bytes)

SFlag [1 bit]: indicates if the data item is a structure or an array

2. Pointer Info Data Structure

Figure 4:
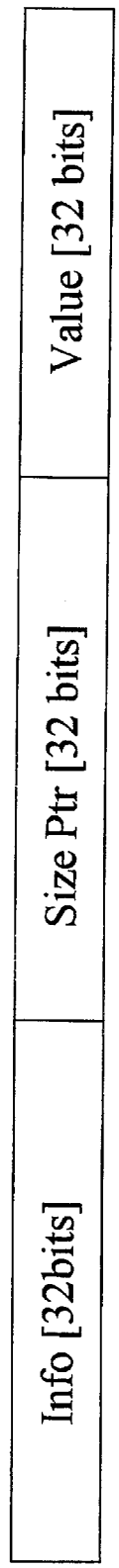
FIG. 4 illustrates a Pointer Info data structure created at compile time for pointers.

Referring now to FIG. 4, a data structure referred to as Pointer Info is a 12-byte object that is associated with every pointer object, including pointers in structures and arrays. A Pointer Info data structure is created for each pointer object during compile time. The Pointer Info data structure includes the following fields:

Info [32 bits]: contains information about the object to which the pointer refers. The type of information contained in this field depends upon the type of the pointer. Possible information includes:

1) address of the respective Pointer Info data structure if the pointer object is a pointer to a pointer; or 2) address of the respective Block Info data structure if the pointer object is a pointer to a structure; or 3) one of the following special values:

CHAR, CHAR1, UCHAR, UCHAR1, . . .

These indicate that the pointer points to a single scalar object of the type specified. A scalar data type is herein defined as any data type other than a structure, pointer, array or void. Examples include numeric data types, character data types, etc. There is a distinct special value for each byte of each type so that it can be determined whether the pointer points to the first byte of an 'int' object or whether the pointer points to the fourth byte of a 'double' object, and so on. It is noted that according to the ANSI-C standard, pointers may legally point just beyond the end of an object.

NULL

Indicates that the pointer was assigned the NULL value. It is noted that not all pointers that have the NULL value have pointer information with this value. Other possible values are IGNORE and UNINIT.

IGNORE

Indicates that runtime checking should not be performed for the pointer. This is the result of certain pointer casts and return values of library functions. Pointers are also ignored when the value in the Pointer Info data structure does not correspond to the actual pointer value. This usually results from modification of pointers in object code that has not been compiled by the compiler 44 of the present invention.

UNINIT

Indicates that the pointer was never initialized. All global pointers are automatically initialized to NULL before execution, but local pointers must be set explicitly by the user program before they can be used.

INVALID

Indicates that the pointer has a value that resulted from an invalid pointer operation.

FUNCTION

Indicates that the pointer points to a function. It is noted that some normal pointer operations are illegal for pointers to functions.

STRUCT

Indicates that the pointer points into a structure of unknown type. This results from casting a pointer to a structure into a pointer to a scalar (e.g. a_char_ptr=(char *)&a_struct).

DYNAMIC

DYNAMIC CLEAR

These two special values indicate that the (void) pointer points into an area of dynamic memory that was just allocated. The second value indicates that the memory was cleared after it was allocated.

SizePtr [32 bits]: points to the respective Block Info data structure if the pointer points to an element of an array or structure; otherwise this field is empty.

Value [32 bits]: contains the value of the pointer.

Dynamic Memory Allocation—Data Structure

Referring now to FIG. 5, a data structure referred to as Dynamic Block Info is a 12-byte object that is associated with respective blocks of memory allocated by the malloc library function, etc. Unlike the prior two data structures which are created at compile time, a Dynamic Block Info data structure is created at runtime for each block of memory allocated by a malloc function call. This data structure must be created at runtime because the malloc function call is a call to a function in an external library. The Dynamic Block Info data structure includes the following fields:

Start [32 bits]: points to the beginning of the memory block

Size [31 bits]: size of the block (in bytes)

SFlag [1 bit]: indicates if the memory allocated is a structure or an array

Type [32 bits]: points to the compiler data structure that describes the type that was first used to reference the dynamic memory.

The code that creates a Dynamic Block Info data structure is found at page 3 of Appendix C in the file up_run2.c.

Current Runtime Information—Data Structure

Referring now to FIG. 6, a data structure referred to as Current Runtime Information is a single structure that contains information about the current runtime state as it relates to runtime checking operations. This data structure is provided in the programming environment and is initialized with information prior to execution of a compiled program. Certain protocols must be followed for passing and retrieving runtime checking information for function arguments and for returning and receiving runtime checking information from a function because of the possibility that the called function or the calling function has not been compiled by the compiler of the present invention. The information in this structure facilitates these protocols. The fields comprised in the Current Runtime Information data structure are as follows.

Argument Info: an array comprising the arguments to the current function. This structure contains Pointer Info and type information for each argument. The information in the Argument Info field is used in the prologue of compiled functions to copy the information into local storage. This information is also used by the library checking functions to check the validity of arguments before calling the library function.

Called function Pointer: points to the address of the last known called function. The information in this field is used to determine whether the argument information in the Argument Info field corresponds to the current function.

Return Value Info: a Pointer Info data structure that contains information for the return value of a function.

Returning function Pointer: points to the address of the function that is returning a value. The information in this field is used to determine to which function the value in the Return Value Info field belongs.

Pointer Reference

1. Compiler Operation

Referring again to FIG. 2A, when the compiler encounters a reference to a pointer in step 206, the compiler inserts a call to a function referred to as _PtrRValue in step 208. This function is used to retrieve the Pointer Info data structure for the respective pointer being referenced. This function also includes a comparison of the value of the pointer with the value in its Pointer Info data structure. The code which inserts this function call is found at page 18 of Appendix A in the file up_comp.c.

2. Runtime Checking Operation

Figure 7:
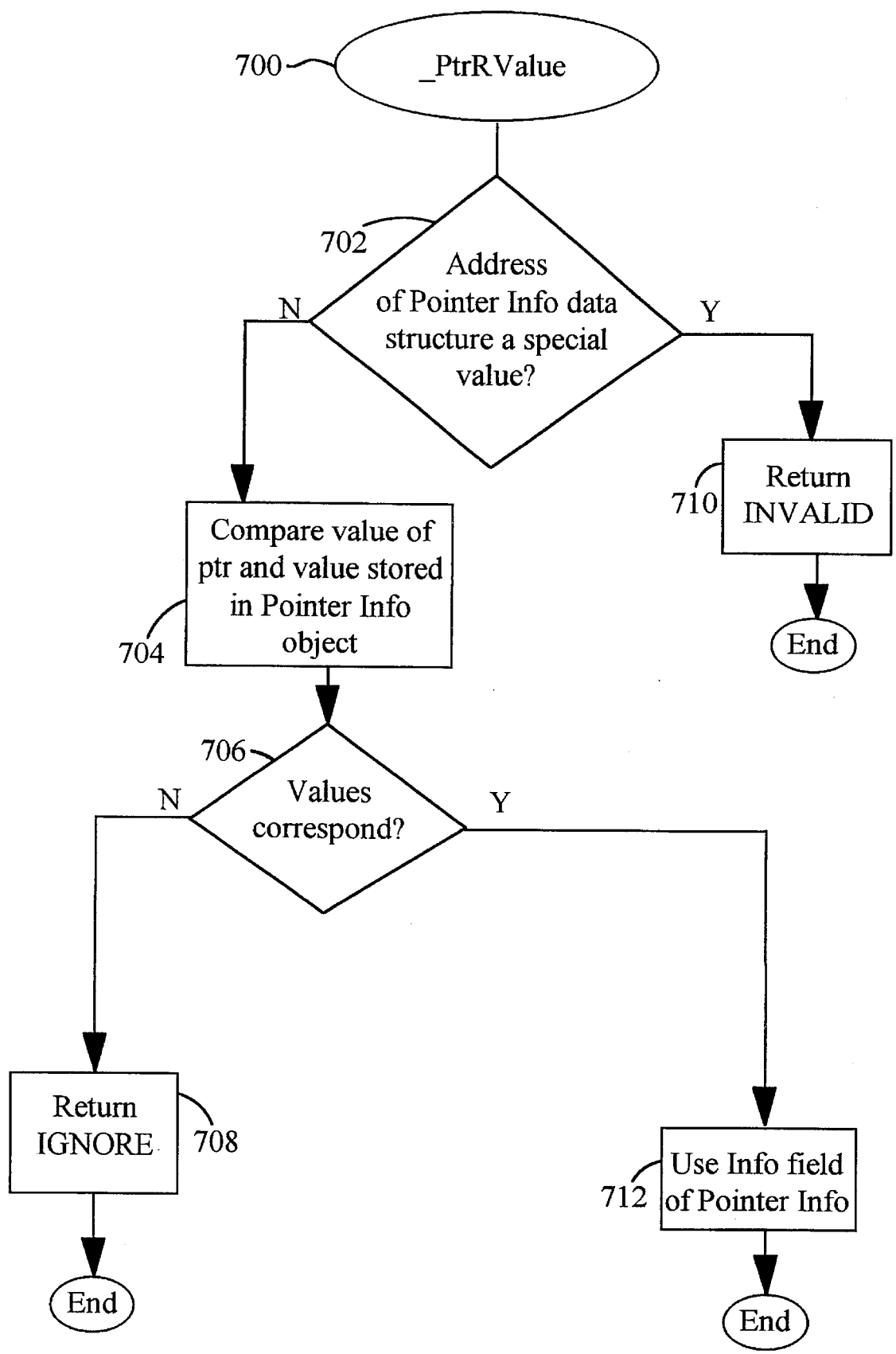
FIG. 7 illustrates a function referred to as PtrRValue that is used to obtain Pointer Info for a pointer being referenced.

Referring now to FIG. 7, whenever a pointer is referenced in an expression in step 700, the function _PtrRValue is called and receives as an argument an address which points to the Pointer Info data structure for the pointer referenced. In step 702 the _PtrRValue function first checks to see whether the value passed in is actually a valid address to a Pointer Info data structure, or rather is a special value of a predefined type. The argument passed into the _PtrRValue function, which is intended to be an address of a Pointer Info data structure, can be a special value in certain cases where there is a pointer dereference expression involving a pointer to a pointer. In such an instance, the Info field of the pointer, which would normally hold the address of a Pointer Info data structure in the case of a pointer to a pointer, might receive a special value if the pointer being pointed to was invalid, uninitialized, etc. If the value passed in is a special value, then the function returns INVALID, and the function completes.

If the value passed in is an address to a Pointer Info data structure, then this pointer contains a valid Pointer Info data structure, and the value of the pointer and the value stored in the Pointer Info object are compared in step 704. If the values are determined to correspond in step 706, then the Info field of the Pointer Info data structure is returned in step 712. If these values do not correspond in step 706, then the IGNORE special value is returned in step 708. Thus, if the values do not correspond, then no further checking for the pointer is performed within the expression. In this instance it is assumed that an external event has occurred which has changed the value of the pointer unbeknownst to the programming environment of the present invention. One example of this is external object code that has not been compiled by the compiler of the present invention.

Therefore, this function is inserted by the compiler whenever a pointer is referenced in the C program to obtain the Pointer Info for this pointer. This function is performed for all pointer references described below. The function _PtrRValue is found at page 20 of Appendix B in the file up_run1.c.

Pointer Arithmetic Expressions

1. Compiler Operation

Referring again to FIG. 2A, when the compiler encounters a pointer arithmetic expression in step 210, such as a[i]; *(a+i); ptr+3; ptr−4; the following operations occur. The compiler inserts a function call to the function _PtrChkArith in step 212 passing the following arguments: the type of the pointer expression, the actual pointer involved in the pointer expression, the integer value that is either added or subtracted to the pointer, the Info field of the Pointer Info data structure for the pointer, the address of the block information for the object pointed to, if any, and the coordinate information about the location of the expression in the source file. The code for this operation is found in the function PtrArith in Appendix A in the file up_comp.c, pages 25 and 26.

2. Runtime Checking Operation

Figure 8A:
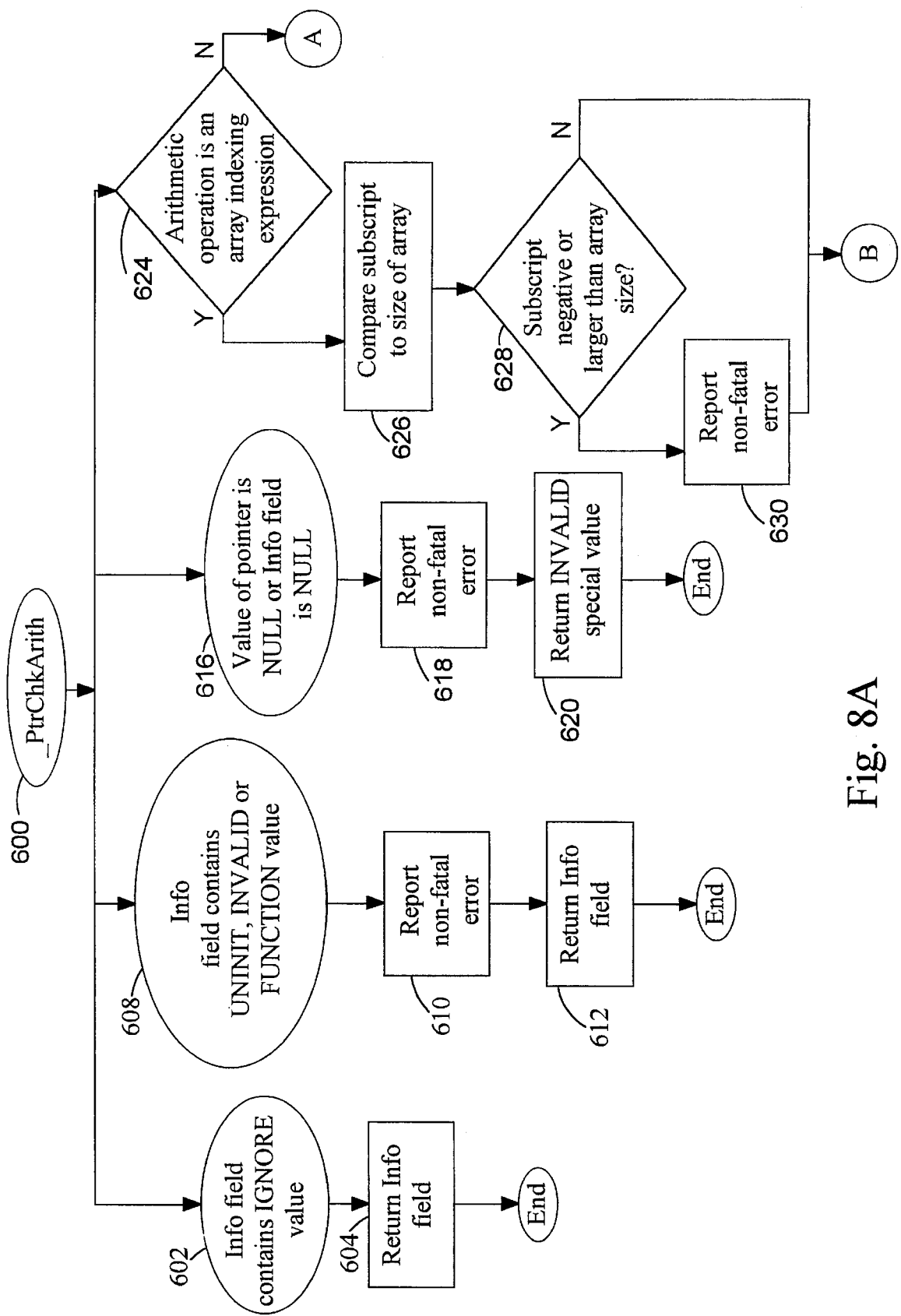
FIGS. 8A–C illustrate a function referred to as _PtrChkArith that performs runtime checking on pointer arithmetic operations.
Figure 8B:
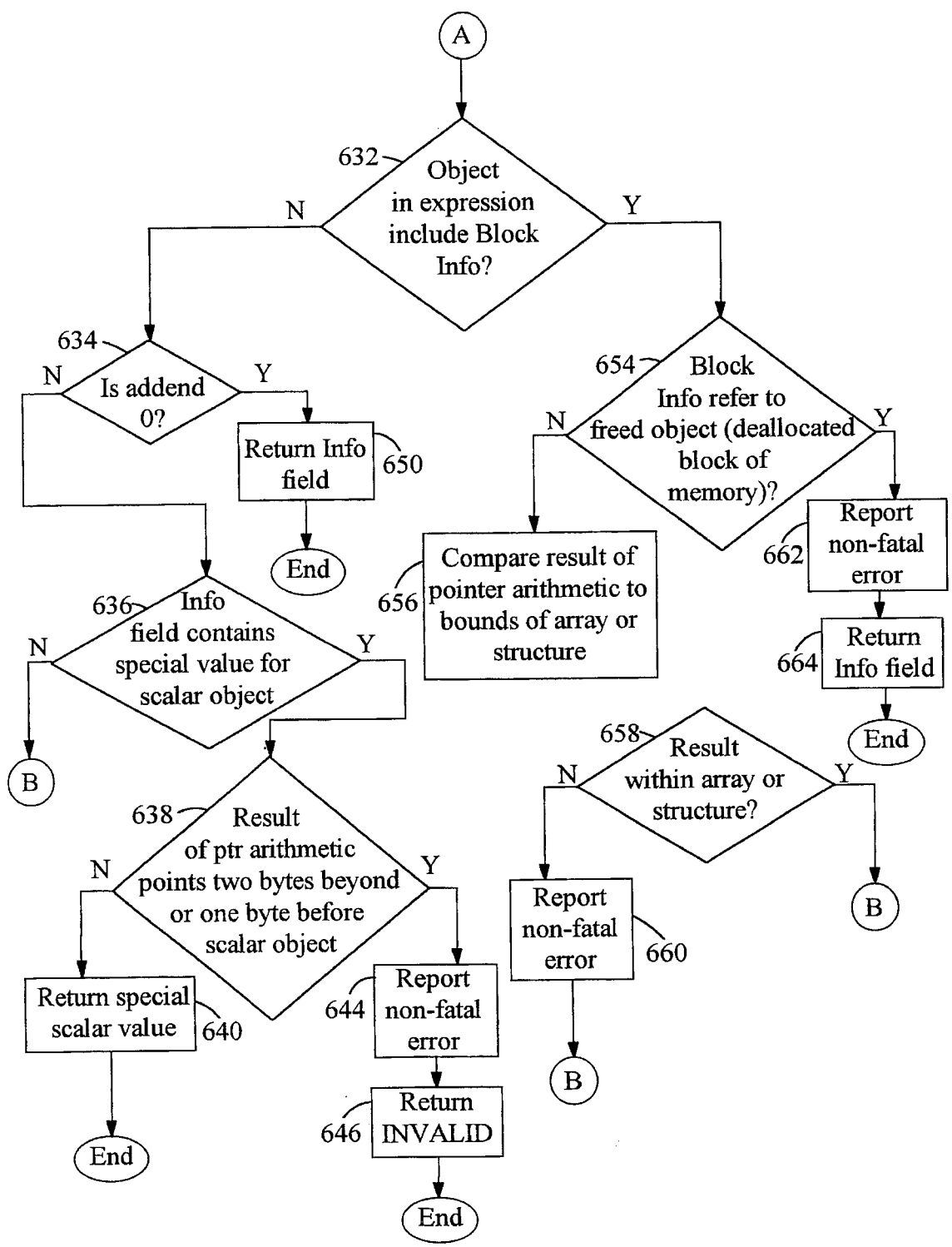
Figure 8C:
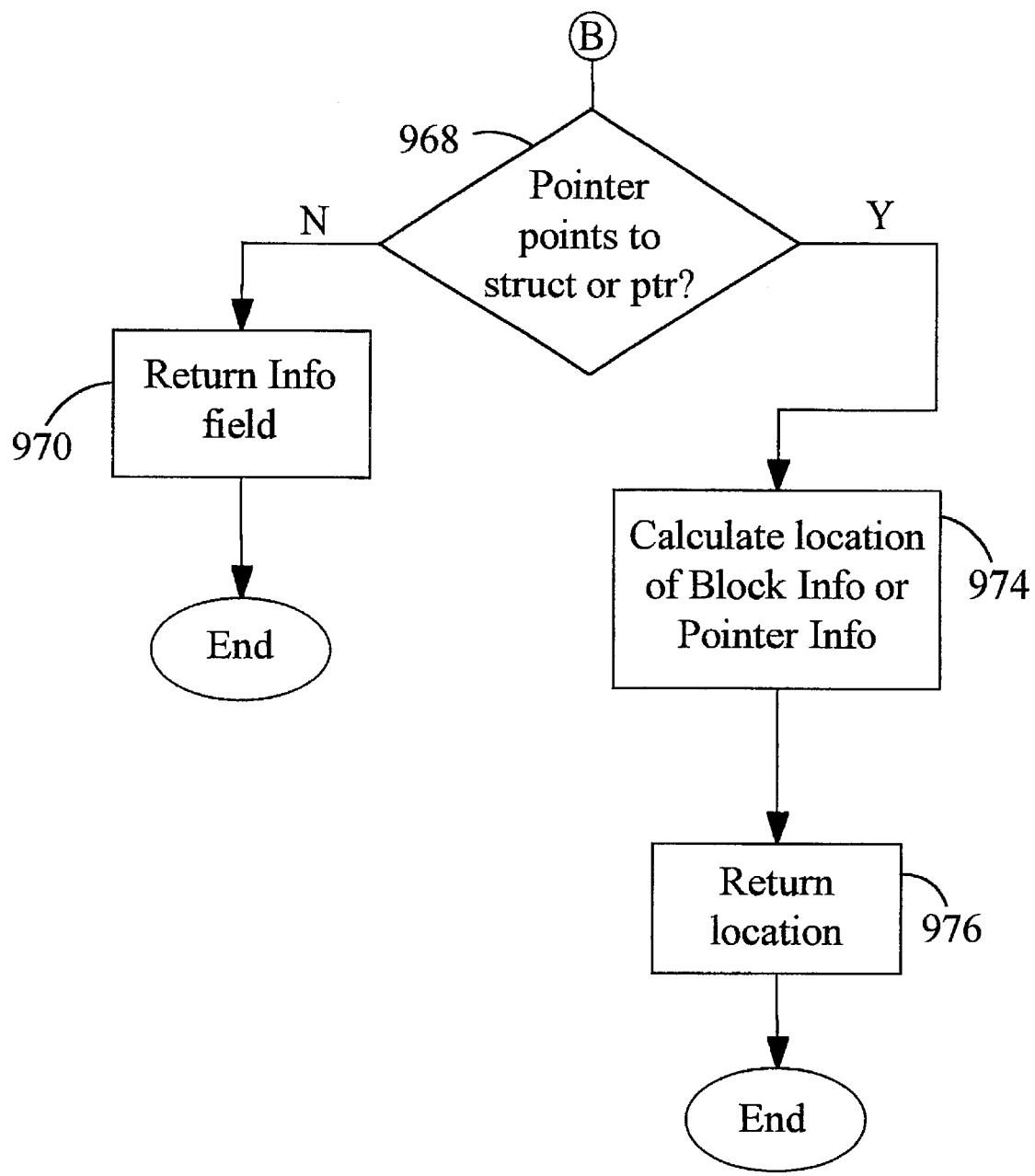

Referring now to FIGS. 8A–8C, during runtime when a pointer arithmetic expression is encountered, the function _PtrChkArith is called in step 600 and performs the following checks. This function uses the information provided in the Pointer Info data structure associated with the pointer used in the arithmetic expression.

If the Info field of the Pointer Info data structure contains the IGNORE special value in step 602, then no checks are performed and the function returns the Info field in step 604.

If the Info field contains one of the following special values: UNINIT, INVALID, or FUNCTION in step 608, then a non-fatal error is reported in step 610. The Info field passed into this function is also returned in step 612.

If the Info field contains the NULL special value or the value of the pointer is NULL in step 616, then a non-fatal error is reported in step 618 and the function returns an INVALID special value in step 620.

If the arithmetic operation is determined to be an array indexing expression (indicated by the 'type' parameter) in step 624, then the subscript in the expression is compared to the size of the array in step 626. If the subscript is negative or it is larger than the array size in step 628, then an error is reported in step 630.

If the arithmetic operation is determined not to be an array indexing expression in step 624, then in step 632 (FIG. 8B) the function determines if the pointer in the expression includes a Block Info data structure. As mentioned above, the pointer will include a Block Info data structure if the pointer points to an element in either an array or a structure. If the pointer includes a Block Info data structure, then the function determines if the Block Info data structure refers to a freed object in step 654, i.e., a deallocated block of memory. If so, then in step 662 an error is reported. If the Block Info data structure does not refer to a freed dynamic object in step 654, then the result of the pointer arithmetic is compared to the bounds of the array or structure given by the Block Info data structure in step 656. If the result is determined to not be within the array or structure in step 658, then an error is reported in step 660.

If the object in the expression does not include a Block Info data structure in step 632, then the function determines if the addend is zero in step 634. If so, the function returns the Info field of the Pointer Info data structure in step 650. If the addend is determined to be a non-zero number in step 634, then in step 636 the function determines if the Info field of the Pointer Info data structure contains one of the special values for scalar objects (CHAR, CHAR1, etc.). If so, then the function determines if the result of the pointer arithmetic points two bytes beyond or one byte before the scalar object in step 638. If so, an error is reported in step 644 and the function returns an INVALID value in step 646. If the result of the pointer arithmetic does not point two bytes beyond or one byte before the scalar object in step 638, then in step 640 the function returns the special scalar value.

If the Info field of the Pointer Info data structure does not contain one of the special values for scalar objects in step 636, then the function advances to step 668 (FIG. 8C). In step 668 the function determines if the pointer involved in the arithmetic expression involves either a pointer to a pointer or a pointer to a structure. If the pointer is determined to point to either a structure or another pointer in step 668 (FIG. 6C), then the location of the Block Info or Pointer Info data structure for the referenced object is calculated and returned in step 674. If the pointer is determined to not point to either a structure or a pointer in step 668, then the Info field of the Pointer Info data structure is returned in step 670.

If a pointer arithmetic expression includes two or more embedded arithmetic operations, i.e., various subexpressions within a larger arithmetic expression, each subexpressions will have a function call to the function _PtrChkArith. The function call resulting from the subexpression will return pointer information to the larger expression in which the respective subexpression is embedded for that larger expression's function call to the function _PtrChkArith. The function _PtrChkArith is at pages 26, 27, and 28 of Appendix B in the file up_run1.c.

Pointer Dereference
1. Compiler Operation

Referring again to FIG. 2A, when the compiler encounters a pointer dereference in step 214, i.e., when an access to the object to which a pointer points is encountered, the following operations occur. The compiler inserts a function call in step 216 to a function called _PtrChkDeref in the code being compiled prior to the pointer dereference. This function call passes the arguments of the current function where the pointer dereference is located, the type of the pointer expression, the actual pointer itself, the Pointer Info data structure corresponding to the pointer in the expression, and the Block Info data structure corresponding to the pointer expression, if the pointer points to an array or structure. In addition, the two coordinates of the pointer expression, i.e., the location in the source code where the pointer expression exists, is passed along to the function. If an error occurs during runtime, the coordinate information is used to indicate to the user where the runtime error occurred. The code which inserts this function call prior to a pointer dereference is found at page 20 of appendix A in the file up_comp.c.

2. Runtime Checking Operation

Figure 9A:
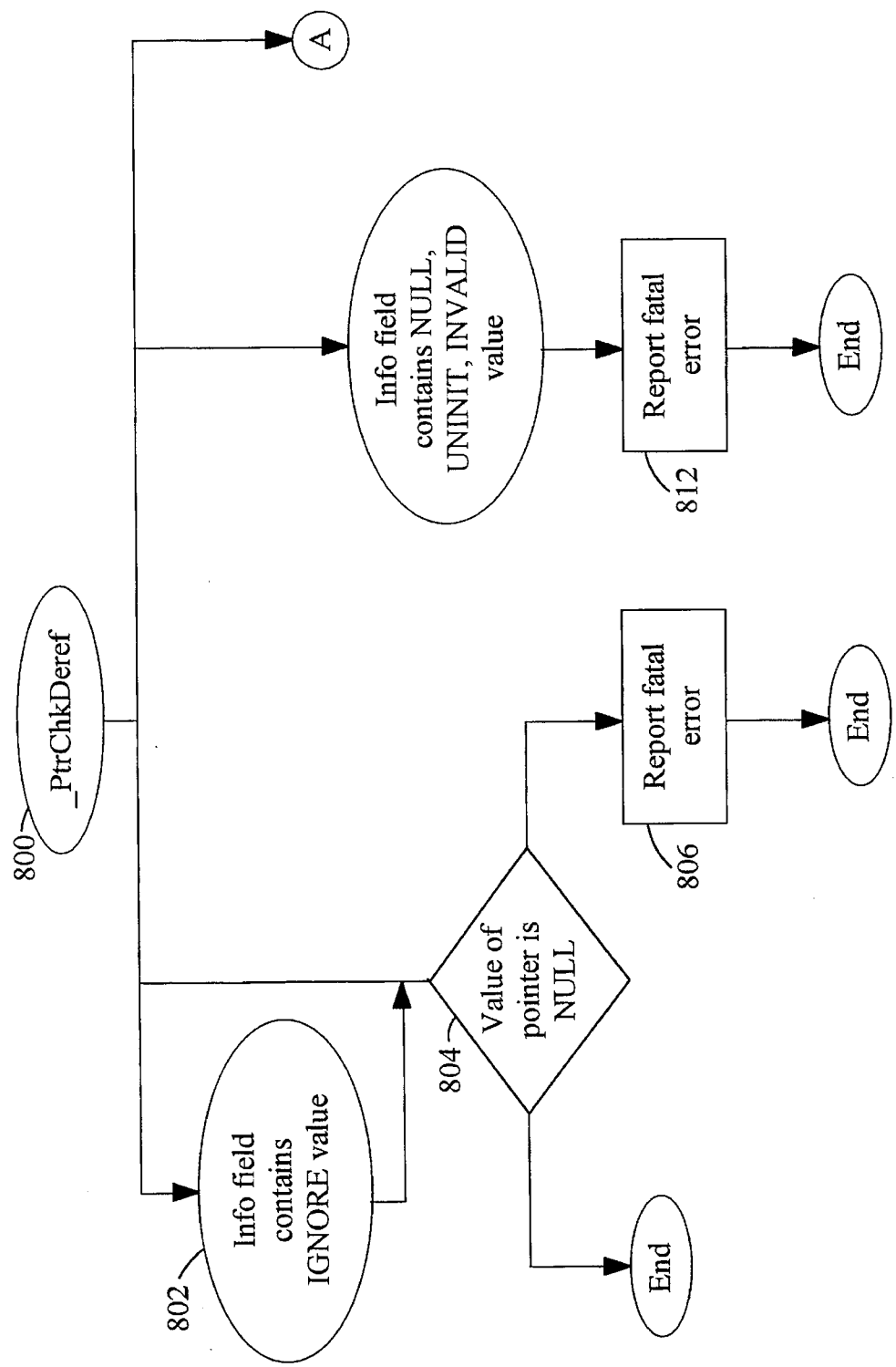
FIGS. 9A–C illustrate a function referred to as _PtrChkDeref that performs runtime checking on pointer dereference operations.
Figure 9B:
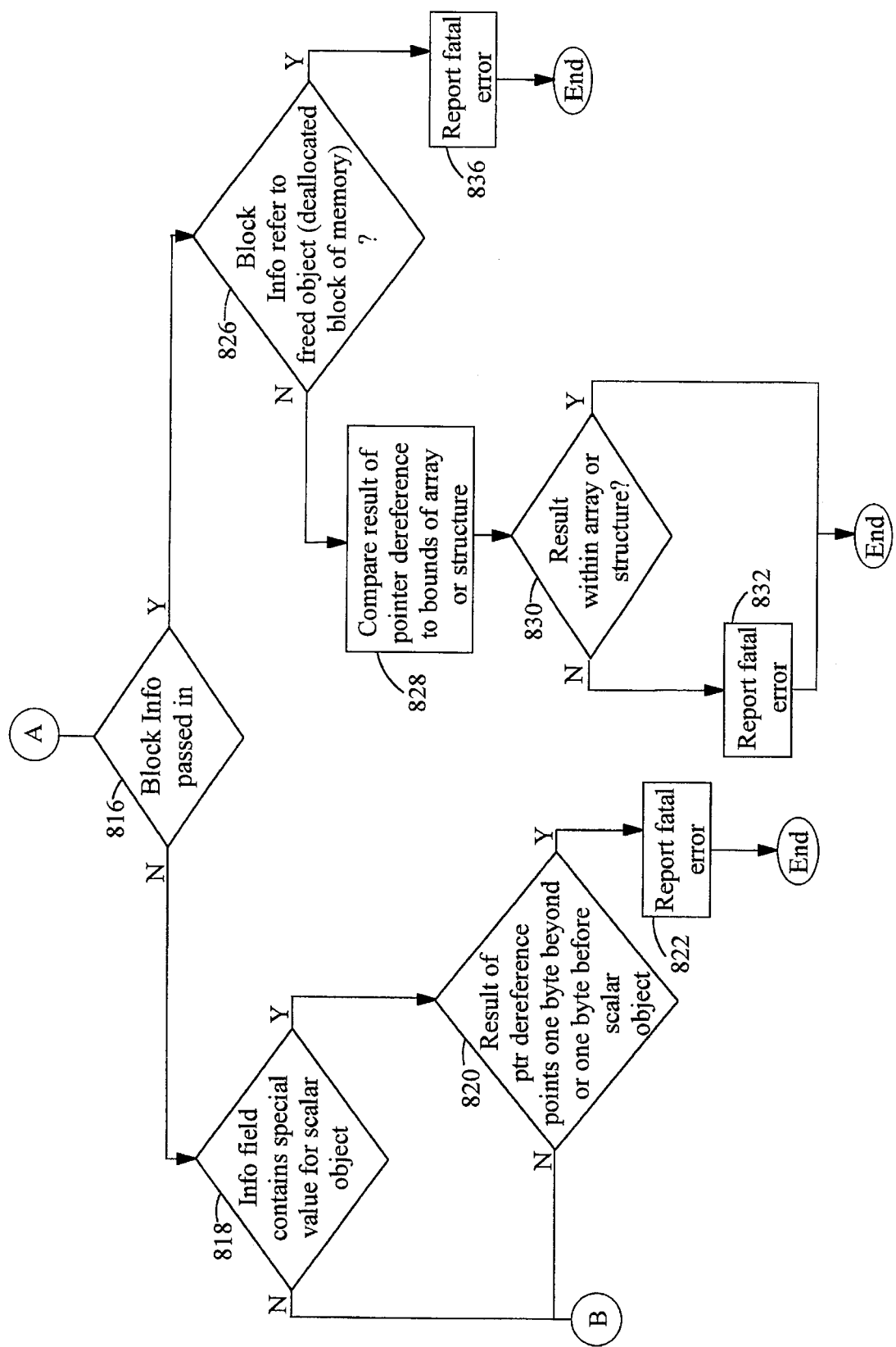
Figure 9C:
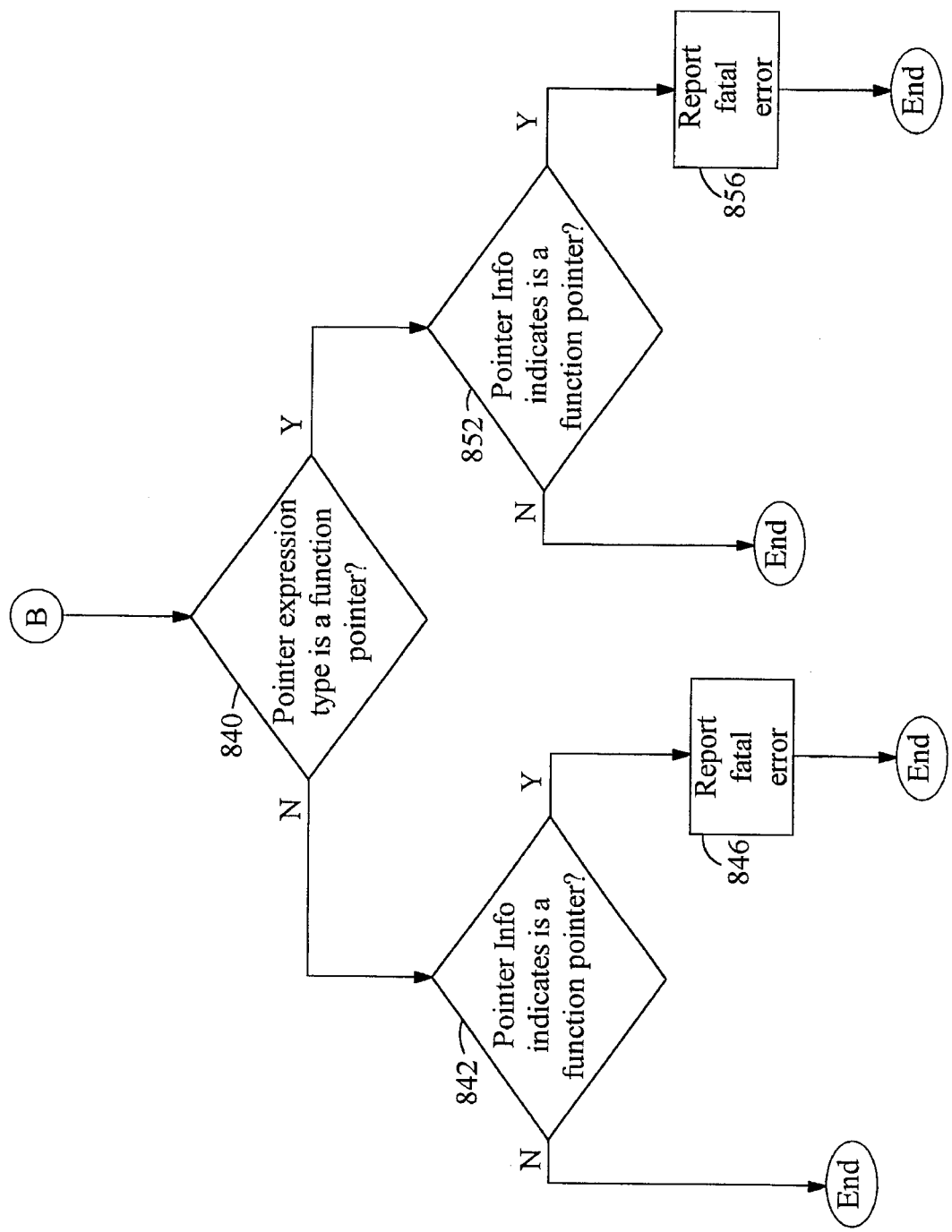

Referring now to FIGS. 9A–C, during runtime when a pointer dereference is encountered, the function _PtrChkDeref performs the following checks.

If the Info field of the Pointer Info data structure contains the IGNORE special value in step 802, then the function advances to step 804. In step 804 the function determines if the value of the pointer is NULL. If the value of the pointer is NULL in step 804, then a Fatal error is reported in step 806. IF the value of the pointer is not NULL in step 804, then no checks are performed.

IF the Info field contains one of the Following special values: NULL, UNINIT, INVALID in step 810 then a Fatal error is reported in step 812.

Referring now to FIG. 9B, in step 816 the function determines if a Block Info data structure was passed into the function. If so, then in step 826 the function determines if the Block Info data structure refers to a Freed object, i.e., a deallocated block of dynamic memory. IF so, then an error is reported in step 836. IF the Block Info data structure is determined to not point to a free object in step 826, then in step 828 the result of the pointer dereference is compared to the bounds of the array or structure given by the Block Info data structure. In step 830 the function determines if the result is within the array or structure. If not, then in step 832 an error is reported. Otherwise operation completes.

IF there is determined to be no Block Info data structure passed into the function in step 816, then in step 818 the function determines if the Info field of the Pointer Into data structure contains a special value For a scalar object, i.e., the Info field contains one of the special values for scalar objects (CHAR, CHAR1, etc.). If so, then in step 820 the function determines if the result of the pointer arithmetic would point one byte beyond or one byte before the scalar object. If so, then an error is reported in step 822, and operation completes. If the Info field does not contain a special value for a scalar object in step 818, then the function advances to step 840 in FIG. 9C. IF the result of the pointer arithmetic in step 820 does not point one byte beyond or one byte before the scalar object, then the function also advances to step 840 in FIG. 9C.

Referring now to FIG. 9C, in step 840 the function determines if the pointer expression type is a function pointer. If the pointer expression type is determined to be a function pointer in step 840, then in step 852 the function determines what the Pointer Info data structure indicates. If the Pointer Info indicates that the pointer is not a function pointer in step 852, then an error is reported in step 856. If the Pointer Info indicates that the pointer is a function pointer in step 852, then operation completes. If the pointer expression type is determined not to be a function pointer in step 840, then in step 842 the function determines what the Pointer Info data structure indicates. If the Pointer Info indicates that the pointer is a function pointer in step 842, then an error is reported in step 846. Otherwise operation completes.

Therefore, the runtime checking that occurs on a Pointer Dereference is very similar to the runtime checking that occurs for a pointer arithmetic expression. The compiler's type is compared with the actual type of the object that the pointer references, and some cases are reported as errors such as dereferencing a data pointer as a function or vice versa. Dereferencing invalid pointer values is a fatal error because it may cause a memory fault or other serious problem. Pointer dereference errors include dereference of uninitialized pointers, null pointers, out-of-bounds pointer expressions, freed pointers, and invalid pointer expressions. The function _PtrChkDeref is found at page 31 of Appendix B in the file up_run1.c.

Structure Member Reference
1. Compiler Operation

A structure member reference includes the C expression struct.member as well as the pointer dereference arrow member to structures. Referring now to FIG. 2A, when the compiler encounters a structure member reference in step 218, the compiler inserts a function call to the function _PtrStructMem passing the address of the structure, the pointer information for the structure, the offset information for the structure member and the coordinates of the expression in step 220. The code which inserts this function call is found at page 23 of appendix A in the file up_comp.c.

2. Runtime Checking Operations

Figure 10:
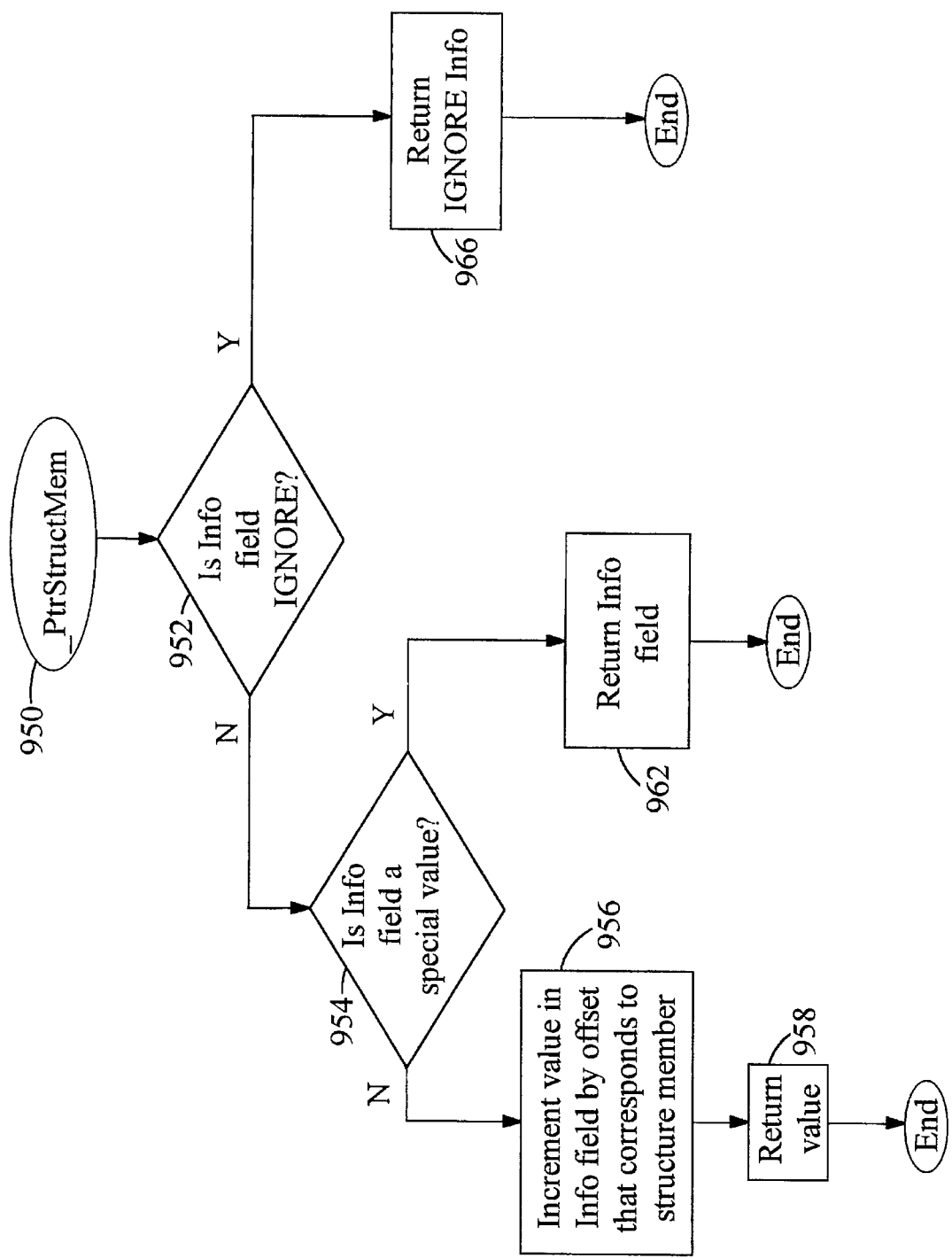
FIG. 10 illustrates a function referred to as _PtrStructMem that performs runtime checking on pointer structure member references.

The function _PtrStructMem performs no runtime checking operations itself, but is used to return the pointer information for a structure member. Referring now to FIG. 10, when the member of a structure is referenced during execution in step 950, the function _PtrStructMem determines if the Info field contains the IGNORE special value in step 952. If so, the function returns the IGNORE special value in step 966. If the Info field is determined not to contain the IGNORE special value in step 952, then the function determines if the Info field is a special value in step 954. If so, the Info field is returned in step 962. If not, then the value in the Info field is incremented by the offset that corresponds to the structure member in step 956 and the value is returned in step 958. This function is found at page 25 of Appendix B in the file up_run1.c.

Pointer Cast Expression

A cast expression forces an expression to be of a specific type when a pointer cast is encountered during execution, it is necessary for the present invention to keep track of the new data types to which the respective variable is being cast so that this information can be provided to other runtime checking functions. If pointer casts were not monitored in this way, then a pointer cast of an object from one data type to another could confuse later runtime checking operations involving this object. If the pointer cast involves a dynamically created memory object, Block Info and Pointer Info data structures regarding this new object are created at runtime.

1. Compiler Operation

Referring again to FIG. 2A, when a cast expression is encountered by the compiler in step 222, the following operations occur. If the cast is from a void pointer type to any other type of pointer, then the compiler inserts a call to the function _PtrCast in step 224. If the cast expression is casting to a structure pointer, or a pointer to a pointer, or a pointer to an array, then the compiler does not insert a function call. If the cast expression is casting from a pointer to a structure to any other type of scalar pointer, then a call is inserted to the function _PtrCastStructBlk in step 224. Finally, if the cast expression is from either a pointer to a structure, or a pointer to a pointer, or a pointer to an array cast to a pointer to a scalar object, then the compiler inserts a call to the function _PtrCastToScalar in step 224. This code is found at pages 24 and 25 of Appendix A in the file up_comp.c.

2. Runtime Checking Operation

The three functions _PtrCast, _PtrCastToScalar, and _PtrCastStructBlk monitor the new data types to which a respective pointer variable is cast and also create new Block Info and Pointer Info data structures if the pointer cast involves a dynamically created memory object. These functions are found at pages 24 and 25 of the file up_run1.c.

The table illustrated in FIG. 11 describes the actions performed when casting from one type of pointer to another. The table shows the actions performed for a cast expression: $(Y^*)$ e, where expression e has type $(X^*)$, and X and Y are arbitrary C types. The Pointer Info and Block Info headings in the table describe the Pointer Info and Block Info data structures of the resulting expression. The table classifies various C types into the following three categories:

(1) Struct/Pointer/Array;
(2) Void; and
(3) Scalar (includes everything but above)

The scalar classification includes all data types other than struct/pointer/array and void, including the integer numeric data types, characters and unions.

As shown in the table, when a pointer to a scalar is cast to a pointer to a scalar, a pointer to a scalar is cast to a void pointer, or a void pointer is cast to a pointer to a scalar, the Info field and SizePtr field for the resulting expression are simply copied from the e expression. However, when either a pointer to scalar or a void pointer is cast to either of a pointer to a pointer, pointer to a structure or pointer to an array, IGNORE is placed into the Pointer Info data structure and EMPTY is placed into the Block Info data structure. This is because, although this operation is allowed in C, this operation is very unusual and would confuse the runtime checking operation of the present invention.

Pointer casting errors are generated by these functions when a pointer expression is cast to type (AnyType$^*$) and there is not enough space for an object of type AnyType at the location given by the expression. In the preferred embodiment, this occurs only when casting a dynamically allocated object for the first time, for example (double$^*$) malloc(1)).

These functions are found at pages 24 and 25 of Appendix B in the file up_run1.c.

Address of Object Expression

1. Compiler Operation

Referring now to FIG. 2B, when the compiler encounters a C expression involved with taking the address of an object, i.e., &obj, in step 226, the following operations occur. In step 228, the compiler creates a Pointer Info data structure corresponding to the elements in the expression. The value stored in the Info field is one of the special values corresponding to the type of the object as described above, and the value of the SizePtr field is set to zero, indicating that it is not an array or struct object. An expression which takes the address of an object is essentially equivalent to a pointer declaration and thus, as in a pointer declaration, the compiler creates a Pointer Info data structure. It is also noted that no function calls to runtime checking functions are inserted. The code which generates these data structures is found at pages 20 and 21 of appendix A in the file up_comp.c.

Pointer and Structure Assignment

1. Compiler Operation

Referring now to FIG. 2B, when an assignment of either a pointer or a structure is encountered, the compiler performs the following operations. For a pointer assignment in step 230, the compiler inserts a call to the function _PtrCheckAssign in step 232 passing the following arguments: the right side of the assignment expression, the pointer information for the left hand side of the expression and the information in the Pointer Info data structure for the right hand side of the expression. In addition, coordinate information is passed to the function _PtrCheckAssign which indicates the line and column numbers of the expression that is being checked. If an error occurs during runtime, the function _PtrCheckAssign uses the coordinate information to indicate to the user where the runtime error occurred. For a structure assignment in step 234, if the right side of the structure assignment is determined to have no pointer information in step 236, then the compiler inserts a function call to the function _PtrIgnoreStruct in step 238 which indicates that the left side of the structure assignment should also not have pointer information. If the right side of the assignment is determined to have pointer information in step 236, then a call to the function _PtrAssignStruct is inserted which assigns the pointer information from the right side of the expression to the left side. The code which inserts these function calls is found at pages 21 and 22 of appendix A in the file up_comp.c.

2. Runtime Checking Operation

Figure 12A:
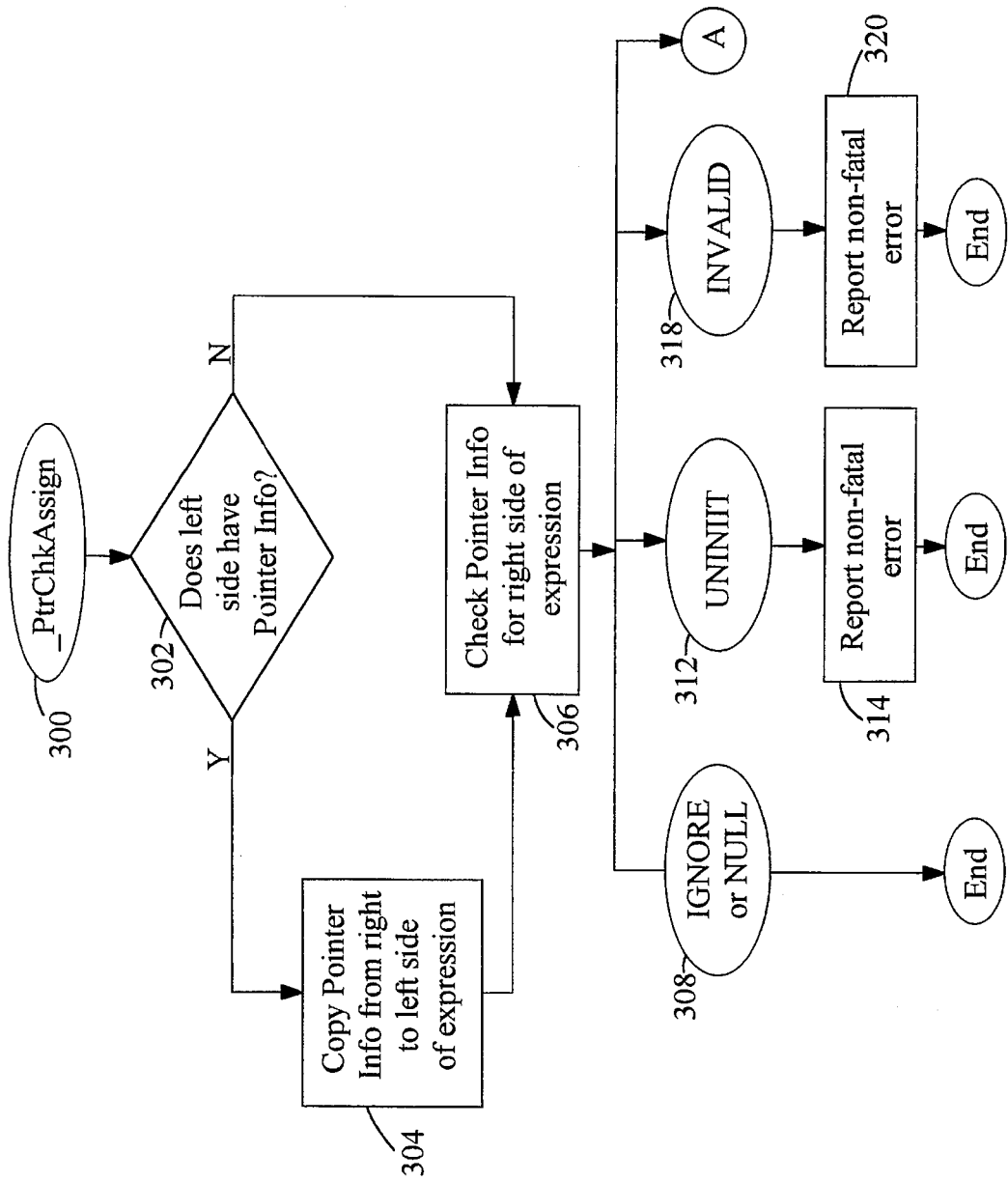
FIGS. 12A–B illustrate a function referred to as _PtrChkAssign that performs runtime checking on pointer assignment operations.
Figure 12B:
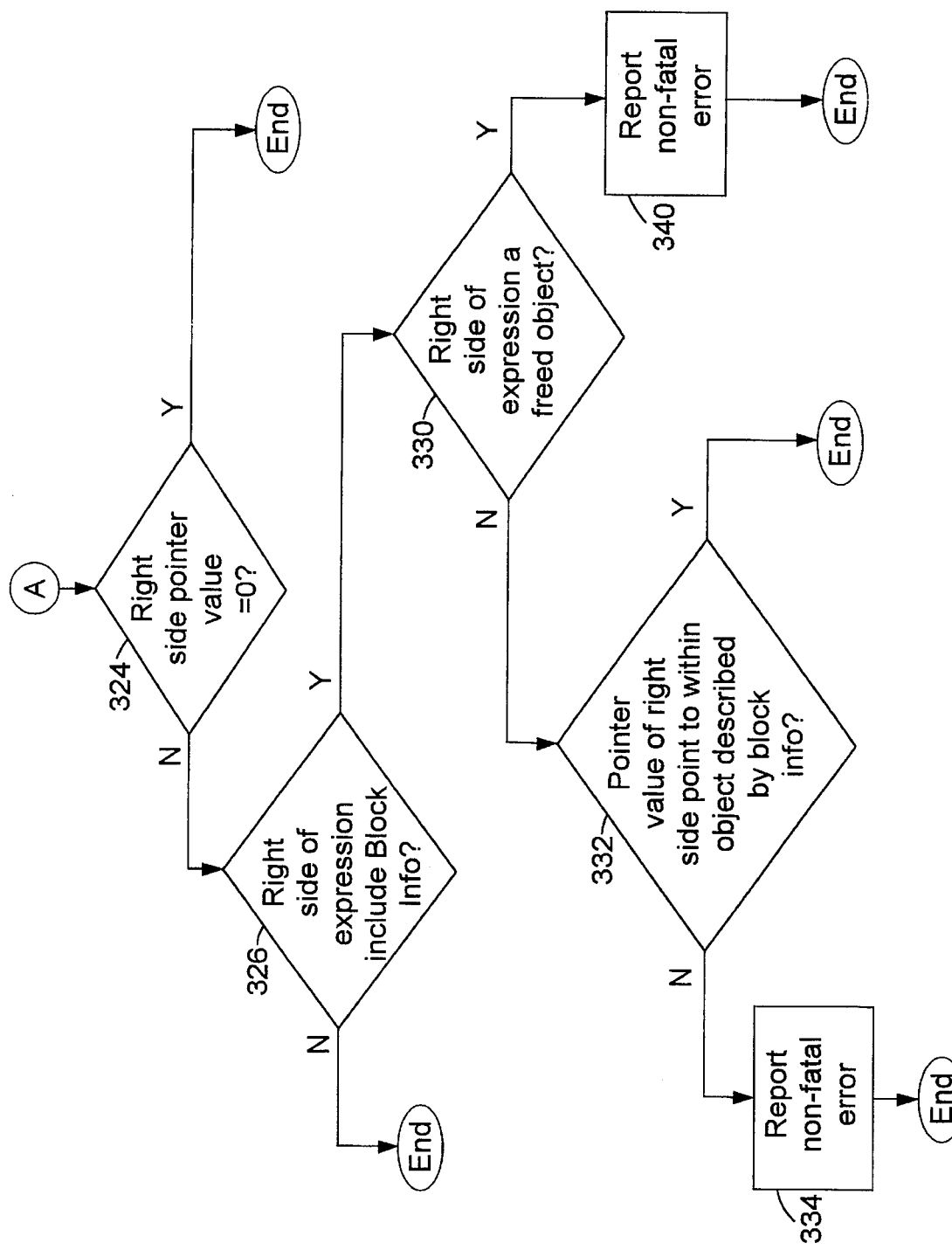

Referring now to FIGS. 12A and 12B, the runtime function _PtrChkAssign first checks to see if the left side of the expression contains Pointer Info in step 302. If so, then in step 304 the Pointer Info from the right side of the expression is copied to the leer side of the expression, and the function then advances to step 306. If the left side of the expression does not contain Pointer Info, i.e., the address to what should be the Pointer Info is a special value, then the function advances directly to step 306. In step 306 the function checks the Pointer Info for the right side of the expression. If the pointer information for the right side of the expression is determined to be either IGNORE or NULL in step 308, then no operations are performed. If the Info field for the right side is UNINIT, i.e., the pointer on the fight side is determined to be uninitialized in step 3 12, then an assignment of uninitialized value error is reported in step 314. If pointer on the right side is determined to be INVALID in step 318, then an assignment of invalid value error is reported in step 320.

Referring now to FIG. 12B, in step 324 the function determines if the right side pointer value is a non-zero number. If the right side pointer value is zero, then operation completes. If the value is non-zero, then in step 326 the function determines if the object on the right side of the assignment includes block information. If not, then operation completes. If so, then the function checks to see if the object is a freed object in step 330. If the object is determined to be a freed object in step 330, the function reports an assignment of a freed dynamic object error in step 340. If the object is determined not to be a freed object in step 330, then the function checks to see if the pointer value of the right hand side points to within the object described by the block information in step 332. If so, then operation completes. If not, the function reports either an assignment of an over array bounds or under array bounds error in step 334. This function is located at page 30 of Appendix B in the file up_run1.c.

Thus, pointer assignment errors are generated when pointer variables are assigned an invalid pointer value, and the warnings provided by the present invention can help determine when a particular pointer becomes invalid. The Pointer Info for the right side of the assignment is checked for invalid pointer values, uninitialized pointer values, out-of-bounds pointer expressions, and freed pointer values, and an error is reported on any of these occurrences. The pointer information for the right side of the expression is also copied into the Pointer Info data structure for the left side pointer.

Figure 13:
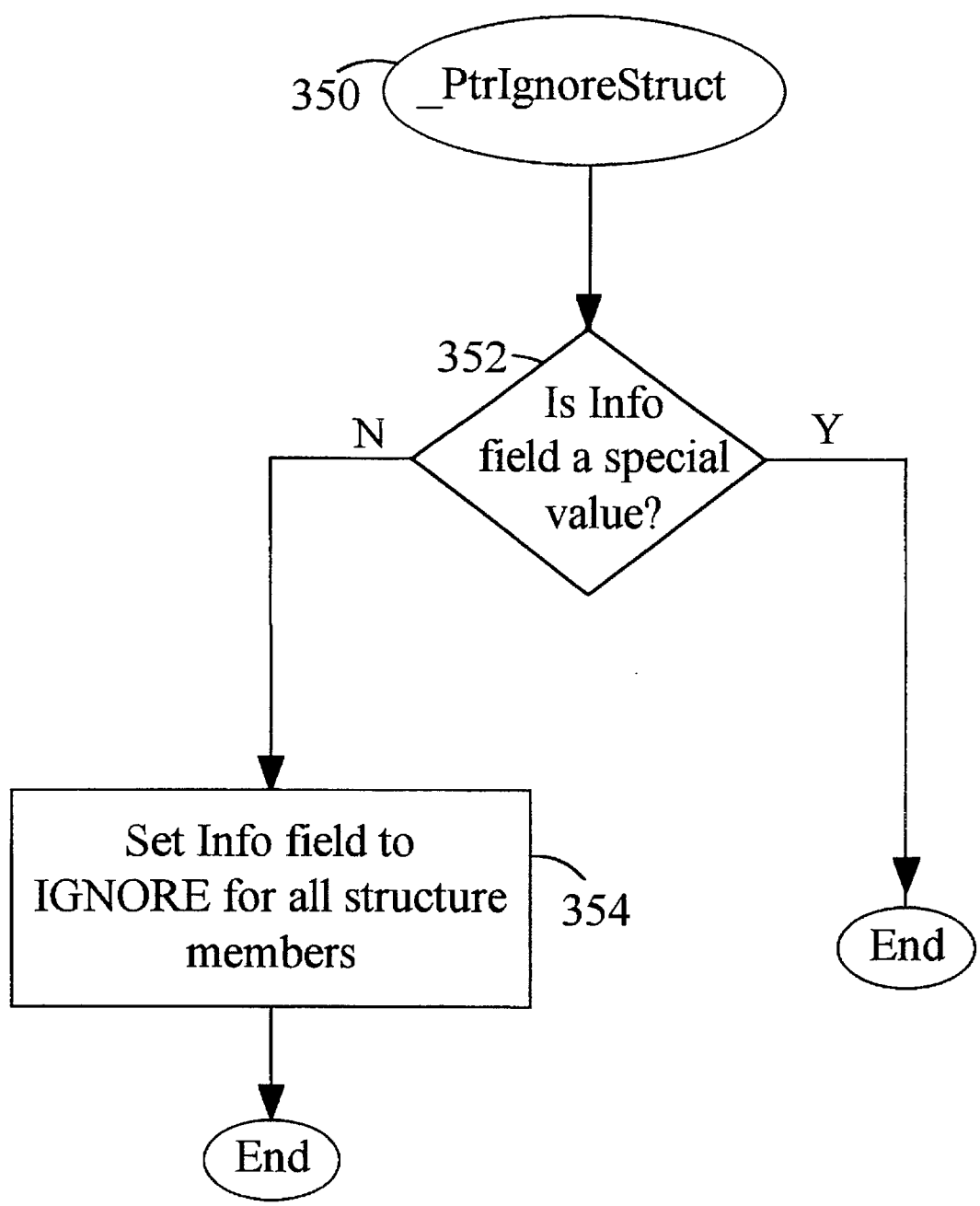
FIG. 13 illustrates a function referred to as _PtrIgnoreStruct which is called during a structure assignment when the right side of the expression does not have pointer information.

In the case of a structure assignment, the functions _PtrIgnoreStruct and _PtrAssignStruct perform the following operations. Referring now to FIG. 13, the function _PtrIgnoreStruct called in step 350 first determines if the Info field of the pointer is a special value in step 352. If not, the function sets the Info field of the Pointer Info data structure for all of the members of the structure to the IGNORE special value in step 354. If so, then operation completes. As mentioned above, this function is inserted by the compiler when a structure assignment is encountered and the right side of the expression has no pointer information.

Figure 14:
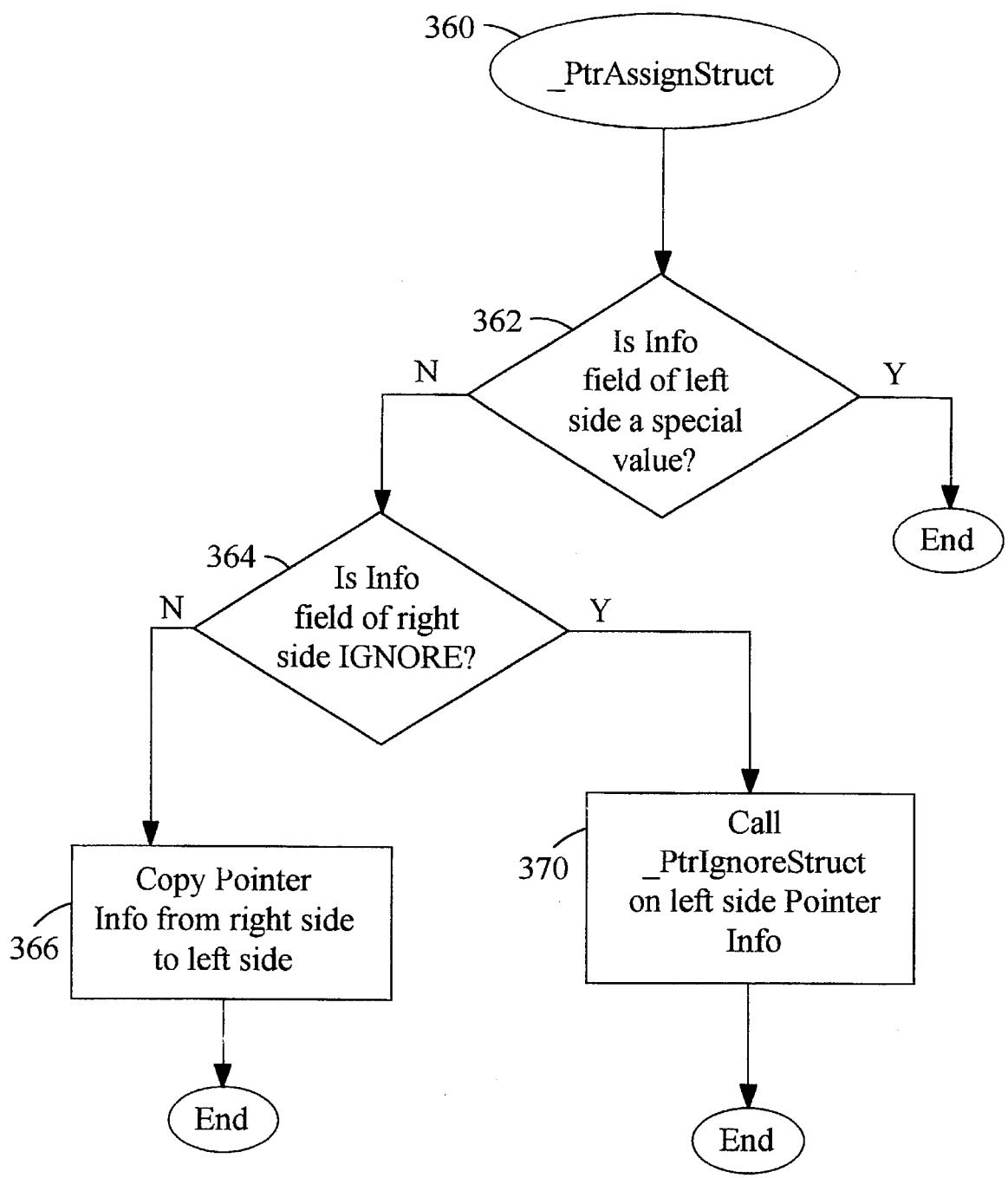
FIG. 14 illustrates a function referred to as _PtrAssignStruct which is called during a structure assignment when the right side of the expression has pointer information.

Referring now to FIG. 14, if the right side of the expression does have pointer information, the function _PtrAssignStruct is called in step 360. In step 362 the function determines if the Info field of the left side is a special value. If so, then operation completes. If the Info field of the left side is determined not to be a special value in step 362, then the function determines if the Info field of the right side contains the IGNORE special value in step 364. If so, then the function _PtrIgnoreStruct is called on the left side of the Pointer Info data structure in step 370. If not, then the function copies the information in the Pointer Info data structure from the right side of the expression to the left side of the expression in step 366.

The functions _PtrIgnoreStruct and _PtrAssignStruct are found on pages 19 and 20 of Appendix B in the file up_run1.c.

Pointer Comparisons and Subtractions

1. CompilerOperation

When the compiler encounters a pointer comparison operation in the user's source code in step 242, the compiler inserts a function call to the function _PtrChkCompare in step 244 passing the pointer information for both the left and fight hand side, the block information for both the left and fight hand side, and the coordinates of this comparison expression. The code which inserts this function call is found in Appendix A in the file up_comp.c at pages 27 and 28.

When a pointer subtraction expression is encountered in step 246, the compiler inserts a function call to the function _PtrChkSubtract in step 248 passing the same arguments as in the function _PtrChkCompare. This code is also found at page 27 of Appendix A in the file up_comp.c.

2. Runtime Checking Operation

Figure 15:
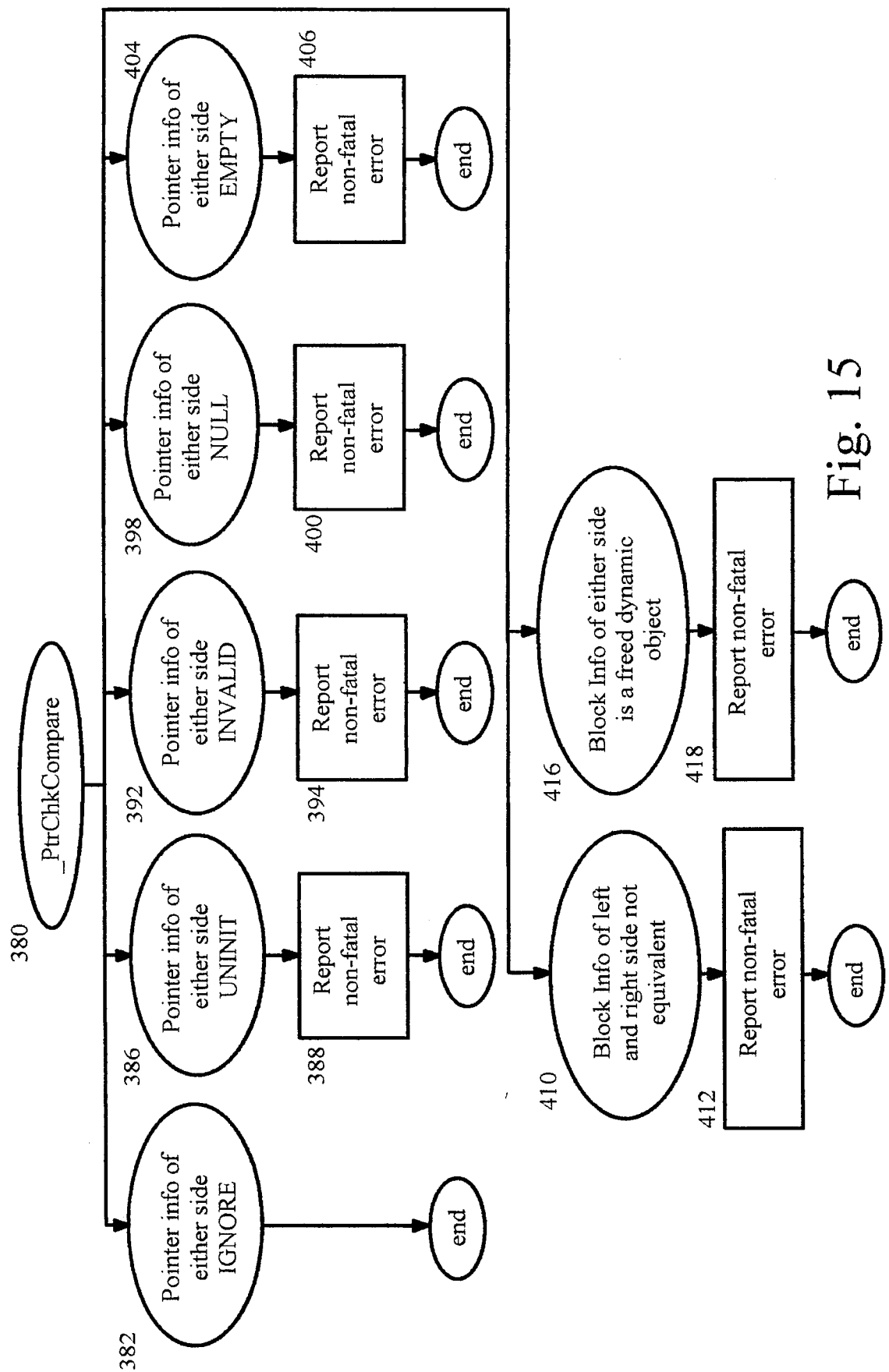
FIG. 15 illustrates a function referred to as _PtrChkCompare that performs runtime checking on pointer comparisons.

Referring now to FIG. 15, the runtime function _PtrChkCompare is called in step 380. The function checks the validity of pointer comparisons using the Pointer Info data structure for the left side and the right side of the pointer comparison expression. If the Info field of either of the Pointer Info data structures is determined to be the IGNORE special value in step 382, the function does nothing. If the Info field of either of the Pointer Info data structures indicates that the respective pointer is uninitialized in step 386, then a compare uninitialized error is reported in step 388. If the Info field of either of the pointer information data structures is determined to be INVALID in step 392, a compare invalid error is reported in step 394. If the Info field of either of the pointer information data structures is determined to be NULL in step 398, then a null comparison error is reported in step 400. If the block information for the left hand side or the right hand side is determined to be EMPTY in step 404, then a compare to scalar objects error is reported in step 406. If the block information is determined not to be equivalent for both the left hand side and the right hand side in step 410, a comparison to different object error is reported in step 412. Finally, if the block information for either side is determined to be a freed dynamic object in step 416, then a comparison to freed object error is reported in step 418.

Figure 16:
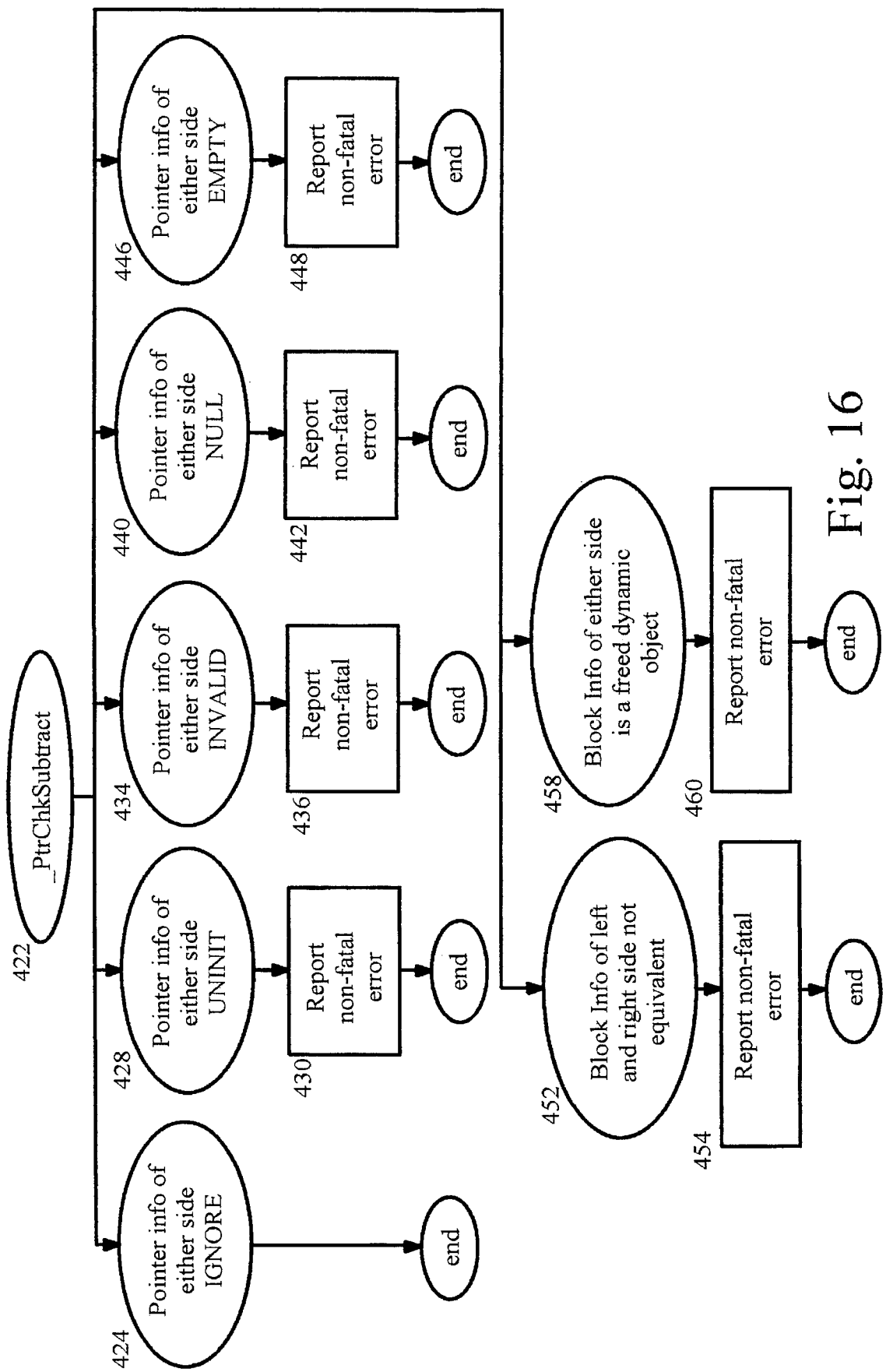
FIG. 16 illustrates a function referred to as _PtrChkSubtract that performs runtime checking on pointer subtractions.

Referring now to FIG. 16, the function _PtrChkSubtract function is called in step 422. The function performs the same checks for pointer subtraction and is essentially equivalent to pointer comparison except that subtraction errors are reported instead of comparison errors. The above two functions are located at pages 28 and 29 of the file up_run1.c, Appendix B.

Therefore, in the case of pointer comparisons and subtractions, if either of the pointers involved in the comparison or subtraction is invalid, then an error is reported. If the Block Info for both pointers is not identical then the pointers do not point to the same object and an error is reported. If the Block Info has its Size field set to 0, then the object was deallocated from dynamic memory and an error is reported. Additional errors are reported in comparisons or subtractions involving uninitialized pointers, freed pointers, or those involving addresses of non-array objects.

Function Calls and Returns

Passing parameters which are pointers or structures involves a protocol which includes copying the pointer information to a global array by the caller function and then copying from this global array by the callee function. Returning pointers and structures from functions involves a similar protocol between the callee function and the caller function. This protocol does not entail any error checking in itself, but rather is used to pass information between the caller and callee functions to enable error checking on arguments provided to a callee function and also on return values provided back to the caller function.

1. Compiler Operation

Referring now to FIG. 2C, when the compiler encounters a function call in the user's code having either pointer or structure arguments that are passed to a callee function in step 252, the following function calls are inserted. For each argument that is either a pointer or structure, the compiler inserts a call to the function __PassParamInfo in step 254 passing the pointer information and the type information for the argument. The code for this is found on page 29 in the function PtrPassParamInfo which is in Appendix A in the file up__comp.c.

When the compiler encounters a function call in the user's code where the value to be returned is either a structure or a pointer in step 256, the compiler inserts a call to the function __ReceivePtrInfo in step 257 passing the address of the function that is called. The compiler then inserts a pointer dereference to the return value of that function in step 260, and this value is used as the value in the Pointer Info data structure for the resulting expression. The code for this is found on page 29 in Appendix A in the file up__comp.c. When the compiler encounters a function definition, either a caller or callee function, in step 264, the compiler inserts into the prologue of the function definition a call to the function __GetParamInfo in step 266 for each one of its arguments that are either pointer or structure type.

When a return statement is encountered in a callee function that returns either a pointer or a structure value in step 268, the compiler inserts a call to the function __ReturnPtrInfo. This code is found on page 28 in the function PtrReturnInfo in Appendix A, file up__comp.c.

For any function that is called, i.e., a callee function that either receives pointer or structure arguments or returns a pointer or structure value, the compiler inserts before the function call a call to the function __PtrPreCall, and after the function call the compiler inserts a call to the function __PtrPostCall.

2. Runtime Checking Operation

Figure 17:
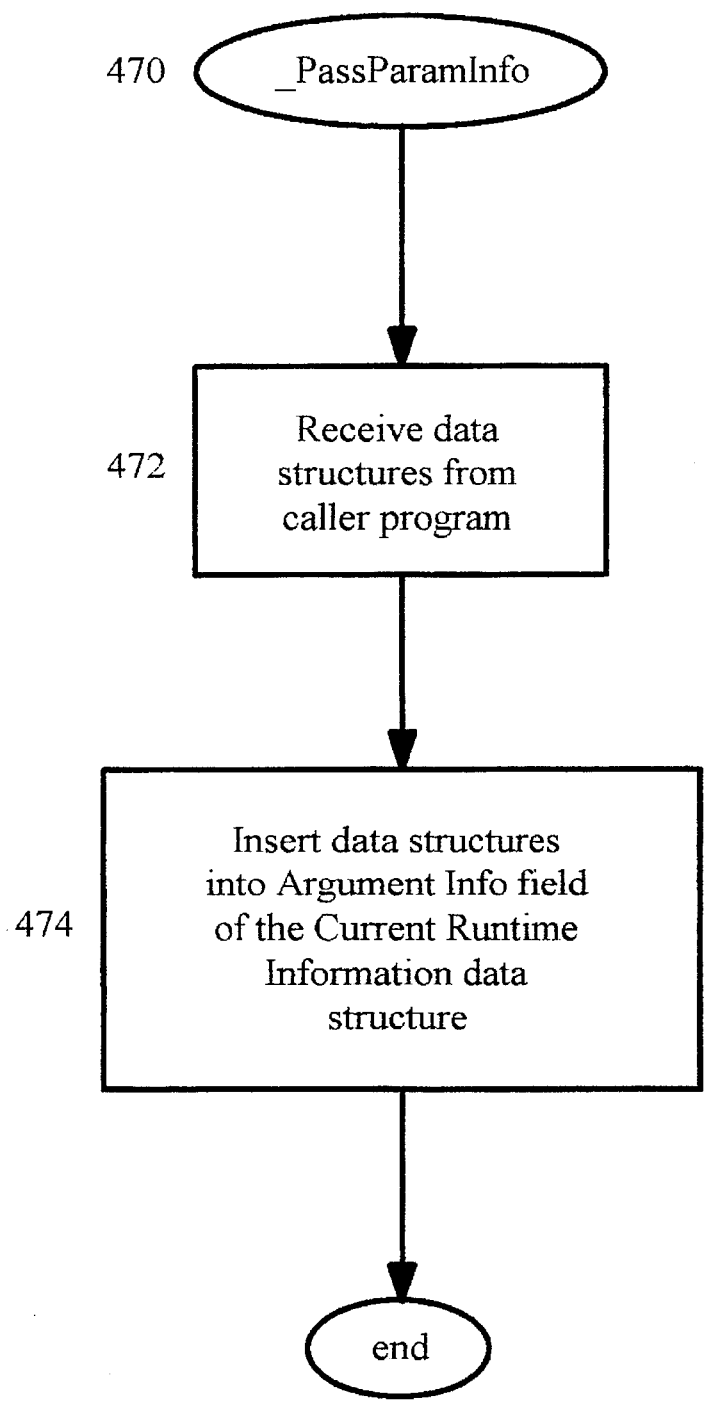
FIGS. 17–20 illustrate functions which implement a protocol for passing information regarding arguments and return values between caller and callee functions.

Referring now to FIG. 17, when a function call is encountered, the runtime function __PassParamInfo is called in step 470. The function receives pointer information and block information for a particular parameter to a function in step 472 and inserts this information into a global array of parameter information that is part of the Current Runtime Information data structure in step 474. This information is used by the function that is being called to obtain pointer information for its arguments, as described below. This function is found on page 21 of Appendix B in the file up__run1.c.

Figure 18:
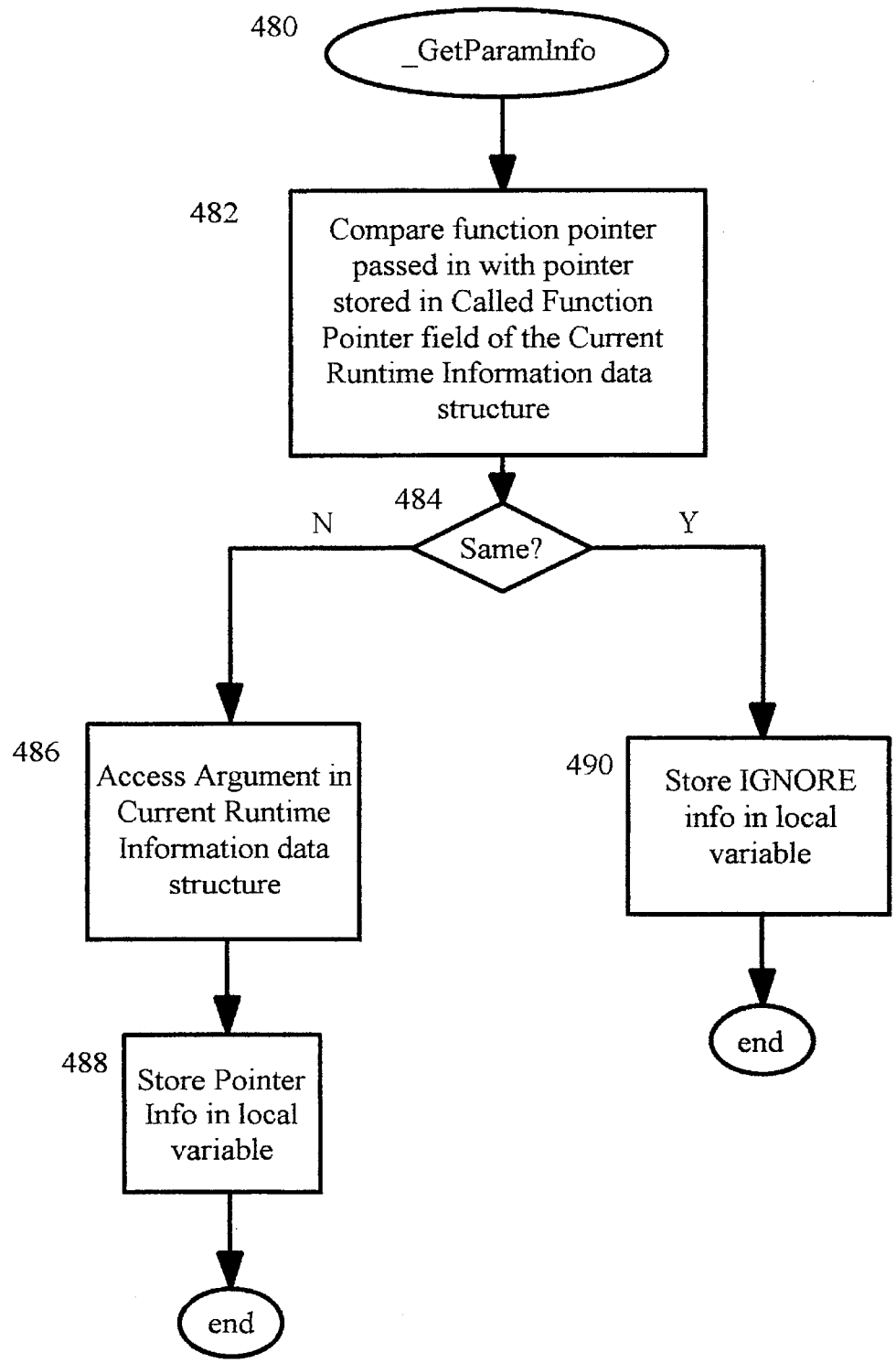

Referring now to FIG. 18, inside of function prologues, the function __GetParamInfo is called in step 480. The function obtains the pointer information for parameters to the function. This function accesses the global array in the Current Runtime Information data structure to obtain the pointer information and block information for individual arguments to the function in step 482. This information was placed there by the __PassParamInfo function. Thus the __GetParamInfo function obtains the pointer information for parameters received by a callee function. This pointer and block information is stored in a local variable in step 484. The function __GetParamInfo is found on page 22 in Appendix A in the file up__run1.c.

Figure 19:
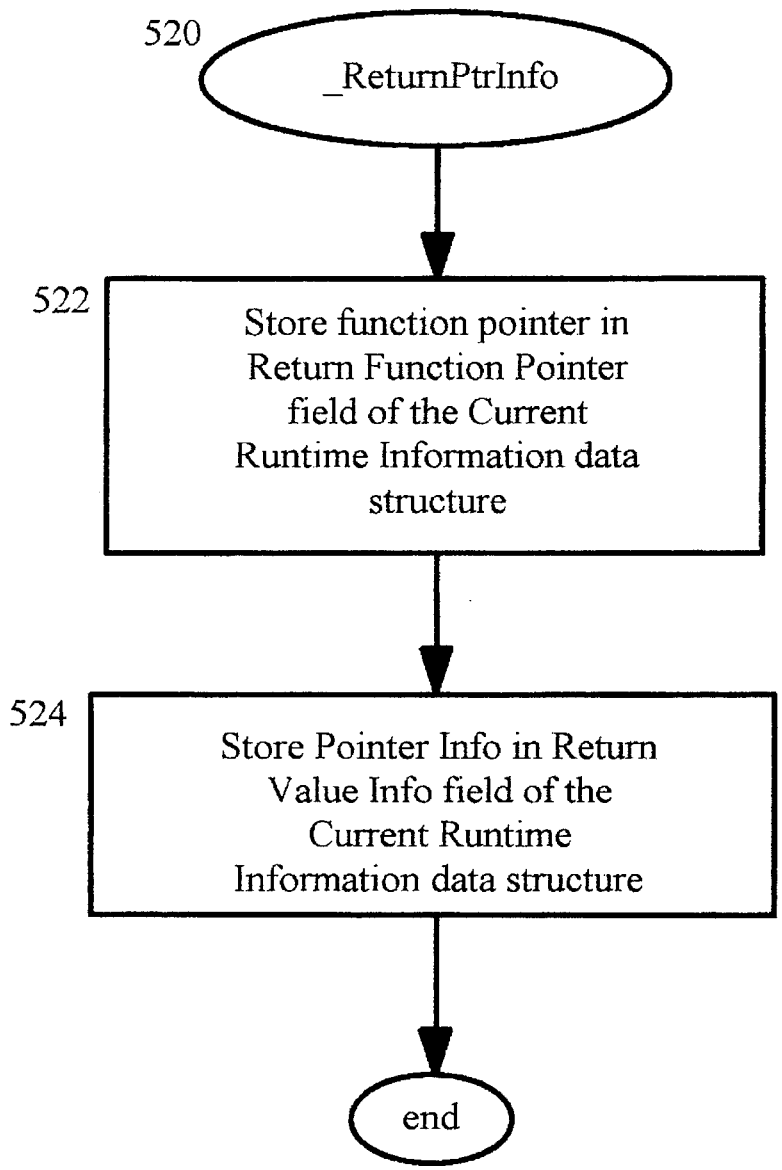

Referring now to FIG. 19, the __ReturnPtrInfo function is called inside a callee function in step 520. The function stores the function pointer to be returned in the Current Runtime Information data structure in step 522. The function __ReturnPtrInfo then places the pointer information, i.e., the contents of the Pointer Info data structure, for the return value of the callee function into the Current Runtime Information data structure in step 524.

Figure 20:
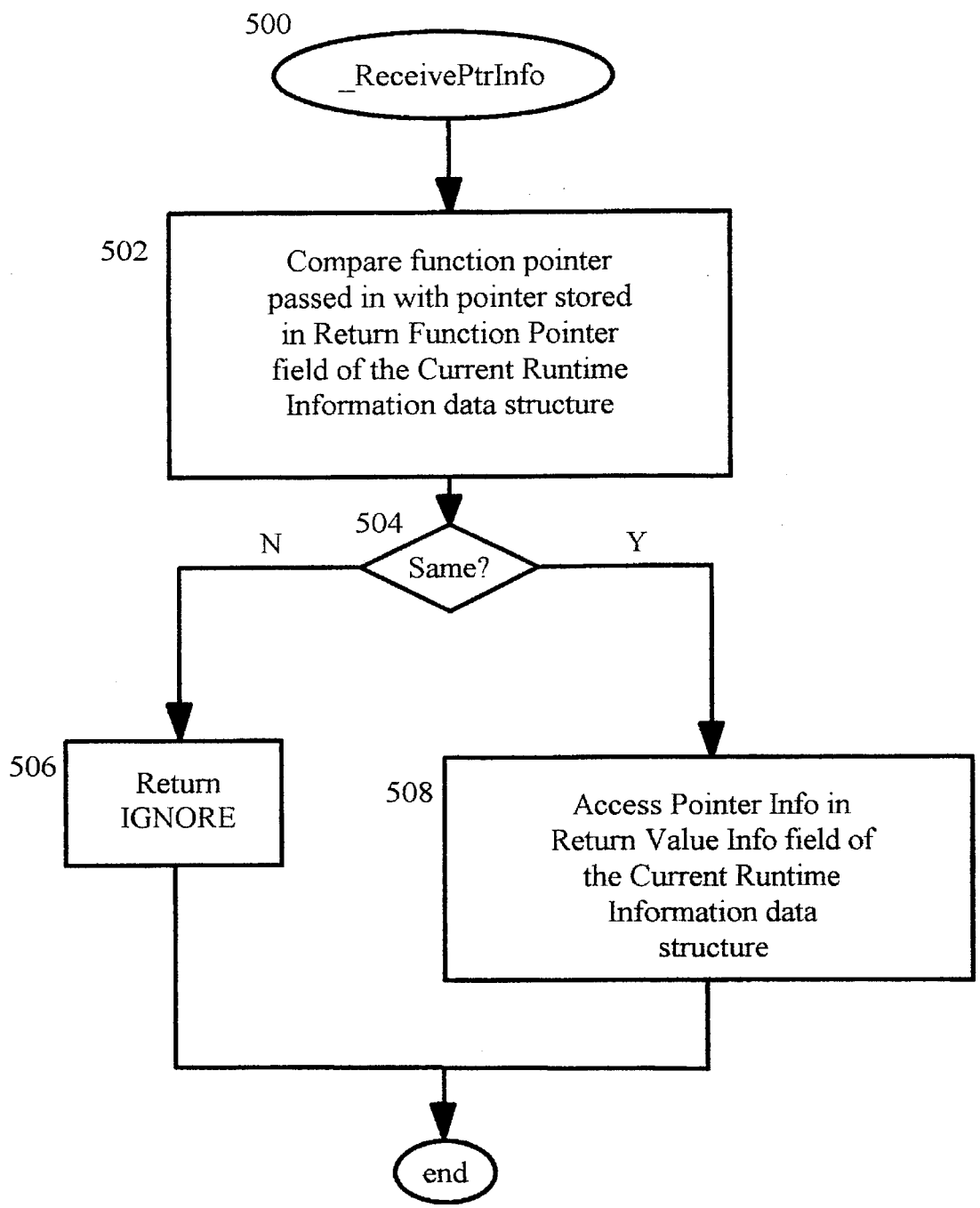

Referring now to FIG. 20, the function __ReceivePtrInfo is called inside a caller function in step 500. This function compares the function pointer passed in with the pointer stored in the Current Runtime Information data structure in step 502. If they are determined to be the same in step 504, then the function accesses the Pointer Info data structure in the Current Runtime Information data structure in step 508. If they are not the same, then the IGNORE special value is returned in step 506. The runtime functions __ReturnPtrInfo and __ReceivePtrInfo, are found on pages 23 and 24 in Appendix B in the file up__run1.c.

The functions __PtrPreCall and __PtrPostCall are also involved in this protocol for initializing and restoring the global data structures. Specifically, __PtrPreCall sets the Called Function Pointer field of the Current Runtime Information data structure to the address of the called function, and __PtrPostCall resets the Argument Info field of the Current Runtime Information data structure to NULL. These functions pass respective information into the Current Runtime Information data structure so that this information can be used by other runtime error checking functions to facilitate the runtime checking capabilities of the present invention.

Therefore, for passing pointers and structures between functions, the present invention copies the pointer information for the arguments to a function into the Current Runtime Information data structure before the function call. Inside of the prologue of the callee function, instructions are generated to copy that information into local objects allocated by the compiler. The Called Function Pointer field in the Current Runtime Information data structure is checked to determine if those arguments were meant for the current function.

In order to return pointers and structures from functions, at return statements instructions are generated that copy the pointer information for the return value into the Current Runtime Information object before returning. The caller function accesses this information for the return value. The Return Function Pointer field of the Current Runtime Information data structure is checked to determine if the information is meant for the current function.

Dynamic Memory

Figure 21:
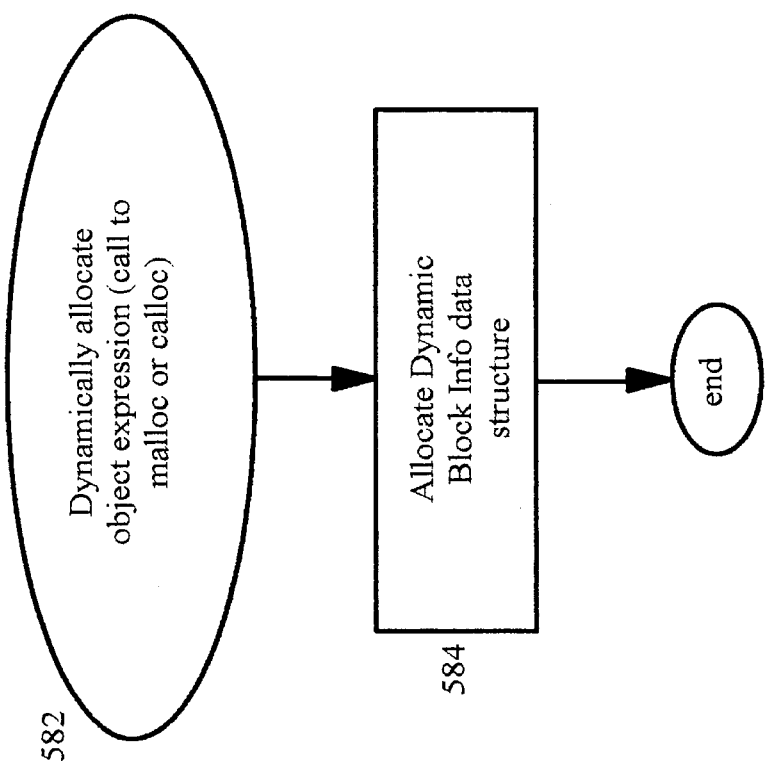
FIG. 21 illustrates a function that allocates a Dynamic Block Info data structure when an object is dynamically allocated.

Dynamic memory operations are handled differently than the operations described above because, unlike other objects, the type and size of objects that are stored in dynamic memory are not known at compile time. A source code listing of one embodiment of the invention which performs runtime checking on dynamically allocated objects is included as Appendix C in the file up_run2.c. Referring now to FIG. 21, when an object is dynamically allocated in step 582, i.e., when an object is created at runtime by a call to functions malloc or calloc, the present invention dynamically allocates a Dynamic Block Info data structure for the respective object in step 584.

Figure 22:
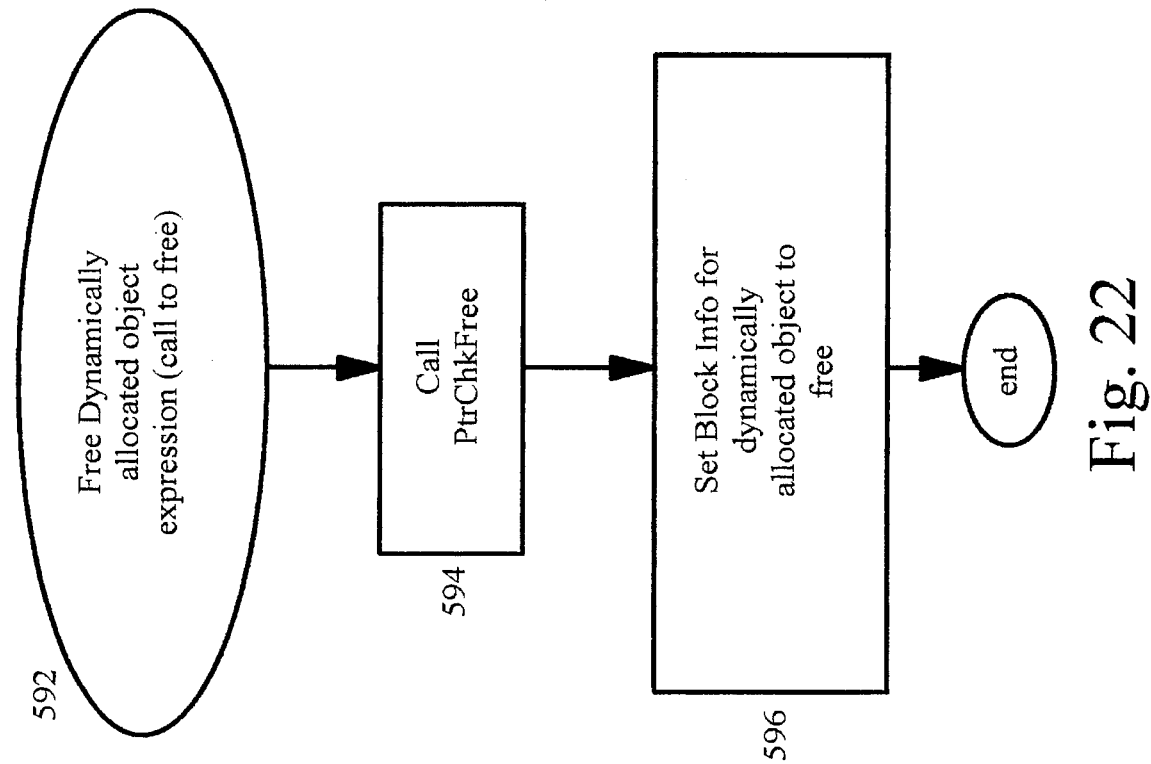
FIG. 22 illustrates a function that is called when a dynamically allocated object is freed.

Referring now to FIG. 22, when an object is deallocated or freed in step 592 by a call to function free, a function referred to as PtrChkFree is called in step 594. This function implements various runtime checking operations according to the present invention, as described below. In step 596, the Size field of the Dynamic Block Info structure is set to 0 to indicate that it is a freed object. The Dynamic Block Info data structure is never deallocated itself until the program terminates.

Figure 23:
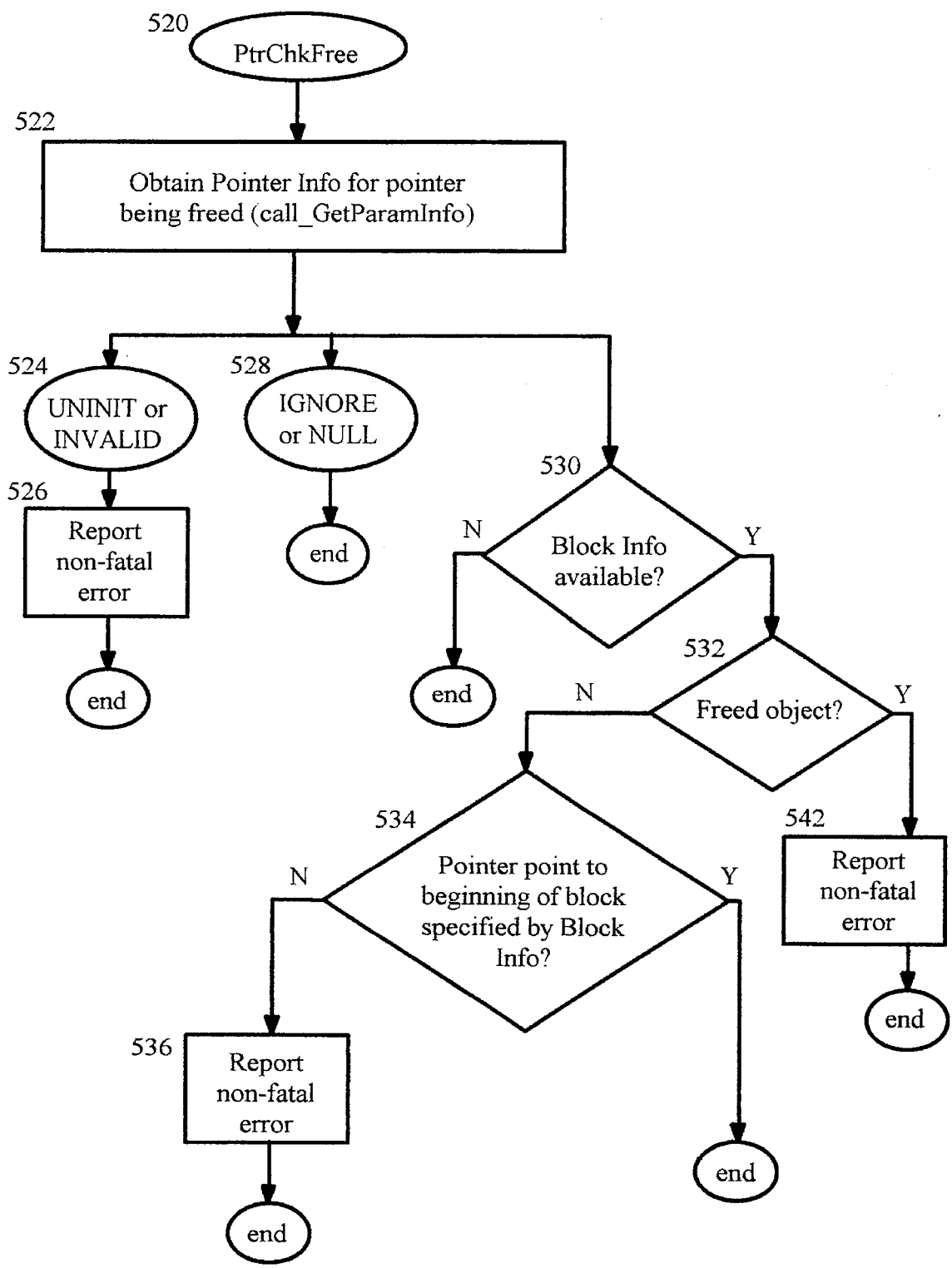
FIG. 23 illustrates a function referred to as PtrChkFree that performs runtime checking on a dynamically allocated object that is being freed.

Referring now to FIG. 23, when the function PtrChkFree is called in step 520, the function obtains the Pointer Info data structure for the pointer being freed in step 522. This is accomplished using the _GetParamInfo function. If the Info field is UNINIT or INVALID in step 524, then an error is reported in step 526. If the Info field is IGNORE or NULL instep 528, operation completes. In step 530 the function determines if Block Info is available. If not, then operation completes. If so, then in step 532 the function determines if the object is a freed object, i.e., if the object has already been freed. If so, then an error is reported in step 542. If the object is determined to not be a freed object in step 532, then in step 534 the function determines if the pointer points to the beginning of the block specified by Block Info. If so, then operation completes. If not, then an error is reported in step 536.

Figure 24:
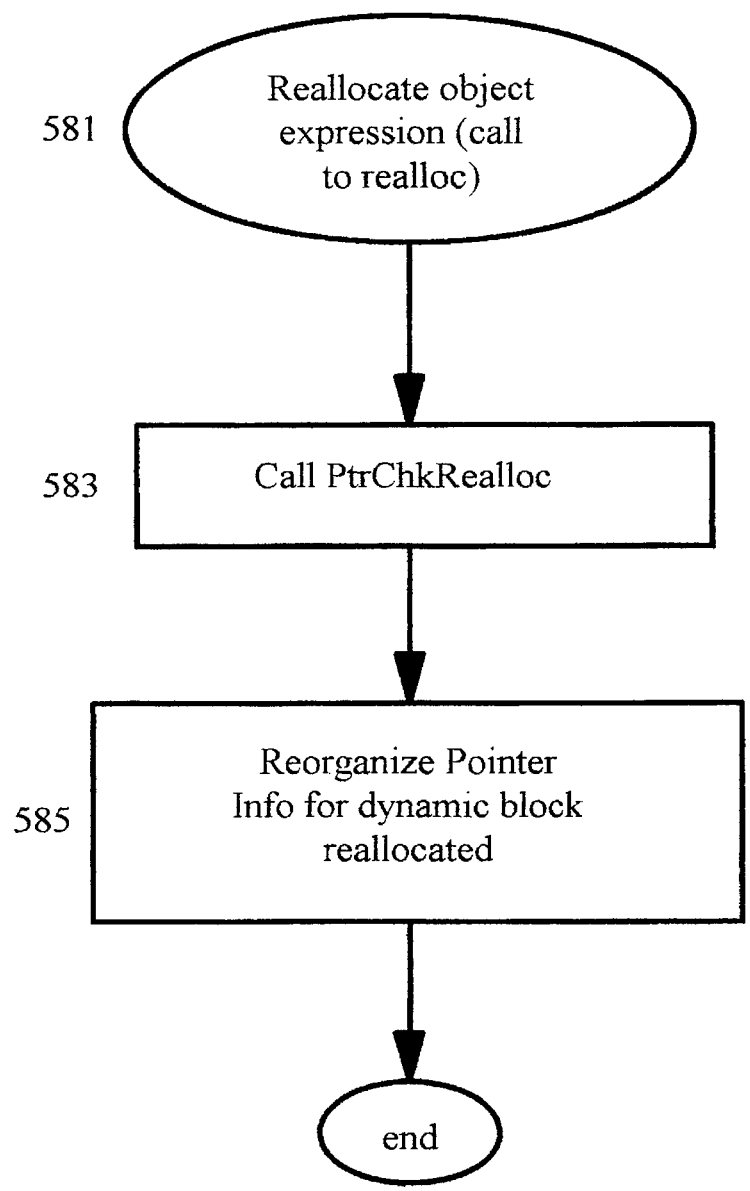
FIG. 24 illustrates a function that is called when an object is reallocated.

Referring now to FIG. 24, when function realloc is called during runtime that reallocates an object in step 581, a function referred to as PtrChkRealloc is called in step 583. If the PtrChkRealloc function does not report an error, then in step 585 the Pointer Info data structure is reorganized for the dynamic block that is being reallocated.

Figure 25:
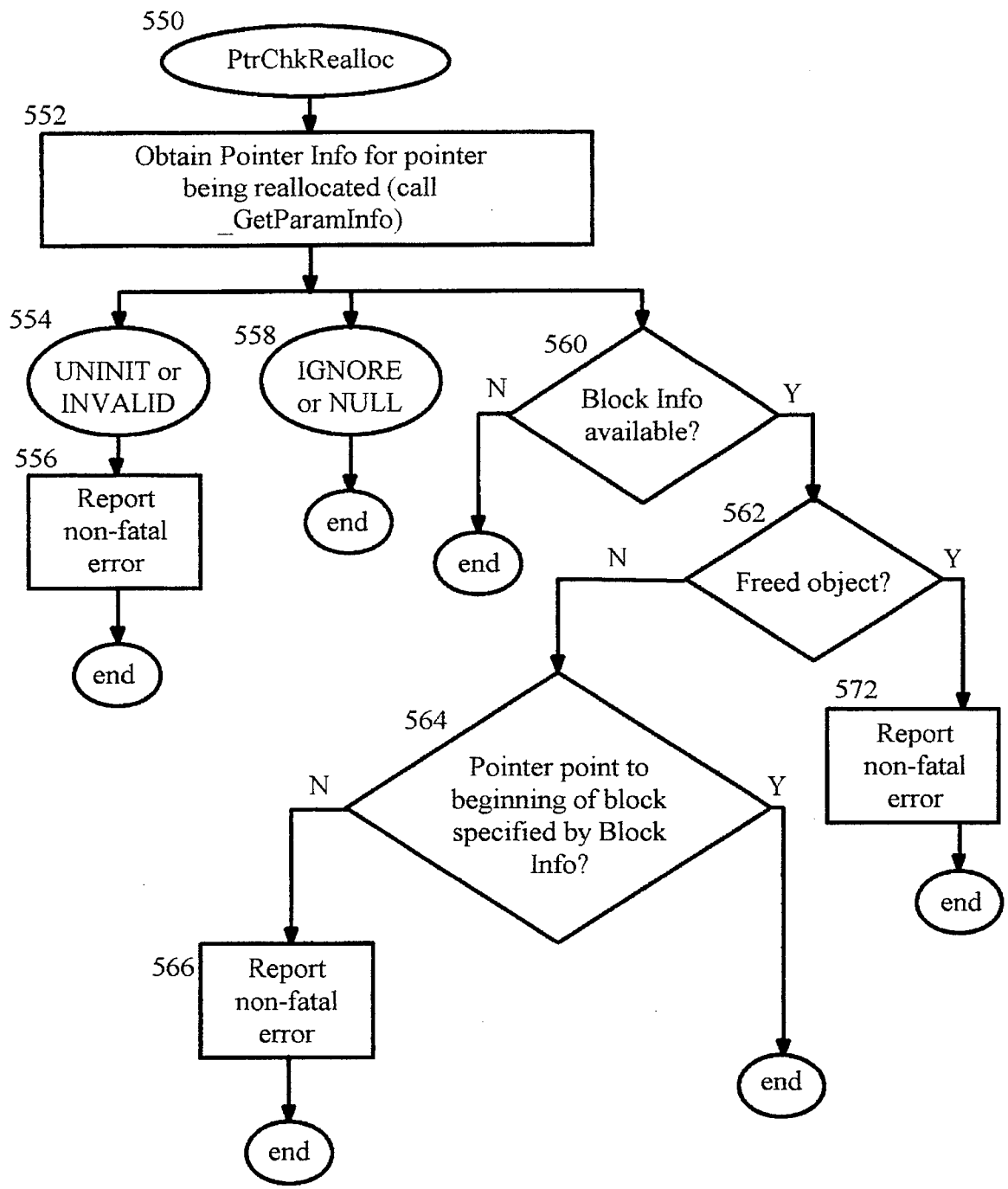
FIG. 25 illustrates a function referred to as PtrChkRealloc that performs runtime checking on a dynamically allocated object that is being reallocated.

Referring now to FIG. 25, the function PtrChkRealloc is similar to the function PtrChkFree described in step 23. When the function PtrChkRealloc is called in step 550, the function obtains the Pointer Info data structure for the pointer being freed in step 552. This is accomplished using the _GetParamInfo function. If the Info field is UNINIT or INVALID in step 554, then an error is reported in step 556. If the Info field is IGNORE or NULL instep 558, operation completes. In step 560 the function determines if Block Info is available. If not, then operation completes. If so, then in step 562 the function determines if the object is a freed object. If so, then an error is reported in step 572. If the object is determined to not be a freed object in step 562, then in step 564 the function determines if the pointer points to the beginning of the block specified by Block Info. If so, then operation completes. If not, then an error is reported in step 566.

Memory allocation routines have no information about the type of the object that will be stored in memory. In order to better track dynamic memory objects, the present invention keeps track of cast expressions from pointers into dynamic memory as described above. The first time a pointer into dynamic memory is cast into a (non-void) type, this type is recorded in the Dynamic Block Info data structure, and any additional informational objects which are necessary for providing runtime checking are provided.

The dynamic memory runtime checking functions of the present invention catch illegal operations with dynamic memory and detect corrupted dynamic memory during allocation and deallocation. Memory deallocation errors include attempts to free uninitialized pointers, previously freed pointers, invalid pointers, pointers not allocated with malloc or calloc, and addresses not at the start of an allocated block.

FUNTIME CHECKING FOR LIBRARY FUNCTIONS

In the programming environment of the present invention, a number of library files are included where runtime checking is desirable. The present invention includes a library protection function generator program referred to as libprot which helps implement runtime checking operations for library functions. If runtime checking is desired to be implemented for a library routine, pragmas according to the present invention are inserted into the library source code which specify the desired restrictions on arguments to the function. If the source code for the library is not available, the pragmas according to the present invention are placed in a separate source code file.

Figure 26:
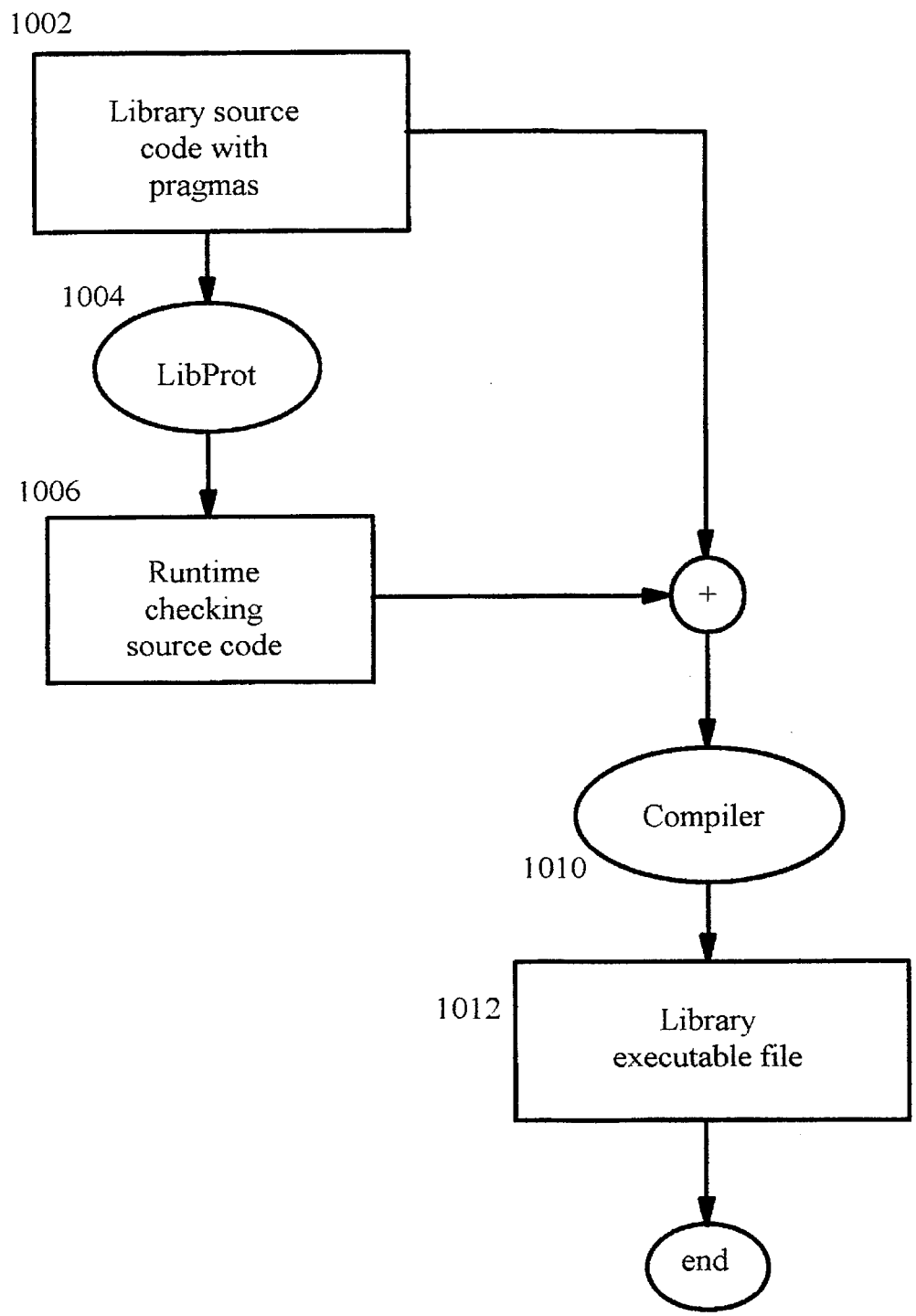
FIG. 26 illustrates a method for creating runtime checking code for checking arguments passed to external libraries where the source code of the library is available.

Referring now to FIG. 26, if the source code for the library is available, the library source code including the desired pragmas 1002 is compiled by the libprot compiler 1004 to generate runtime checking source code 1006. This runtime checking source code 1006 is then combined with the original library source code 1002, and this combined source code is compiled with a standard compiler 1010. The compiler produces an object file or executable file 1012 that includes calls to runtime checking operations according to the present invention. Therefore, for each library function that has one of these pragmas, the libprot program generates a runtime checking function that performs the checks specified by the pragma. If there are multiple pragmas for a function, then the generated function performs the checks for each pragma in the order in which they appear in the input file. The libprot compiler also expands all macros in the pragma line.

Figure 27:
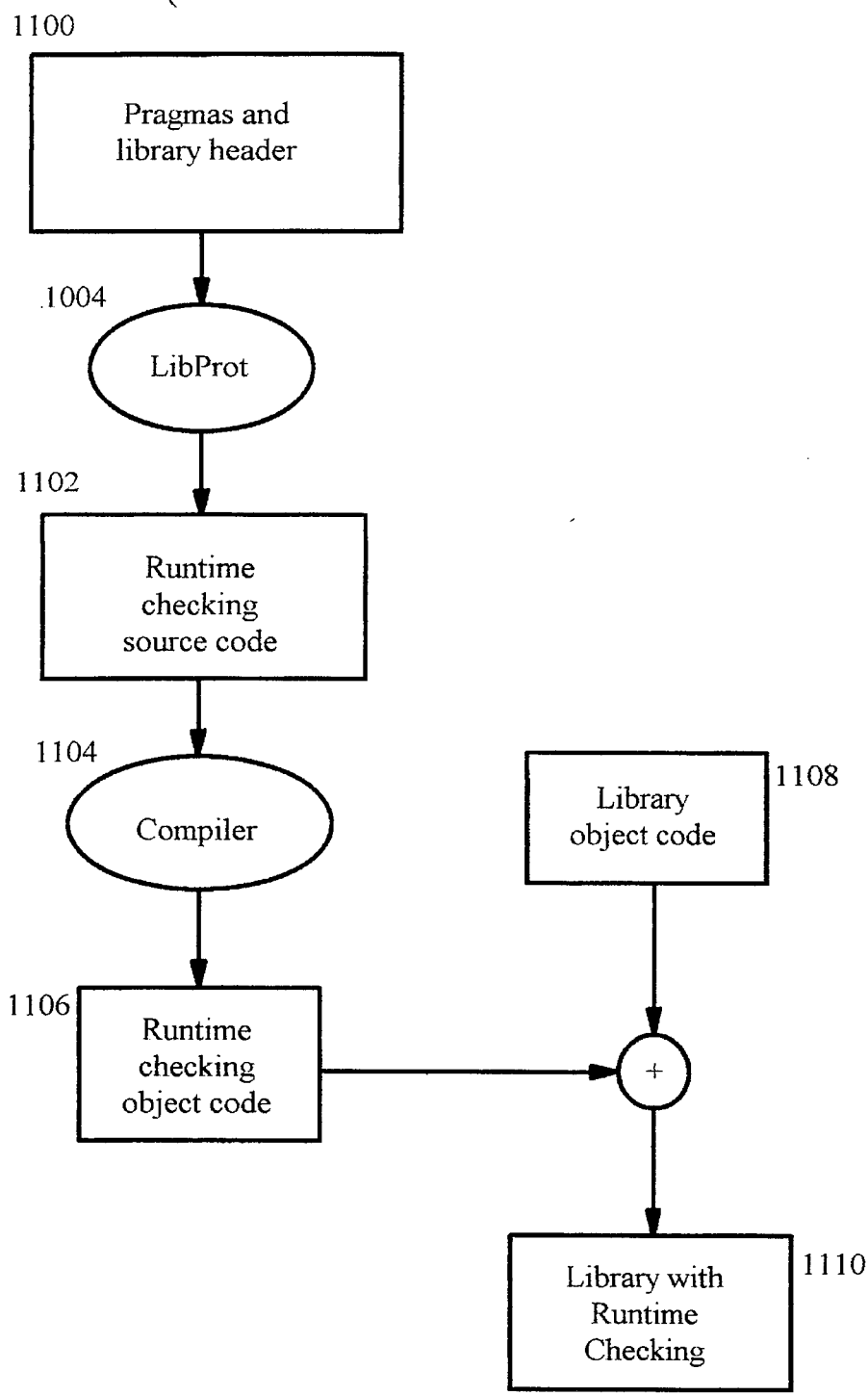
FIG. 27 illustrates a method for creating runtime checking code for checking arguments passed to external libraries where the source code of the library is not available.

Referring now to FIG. 27, if the source code for the respective library is not available, but rather only library object code 1108 is available, the following operations occur. A source file 1100 including the desired pragmas and the respective library header is compiled by the libprot compiler 1004 to generate runtime checking source code 1102. The runtime checking source code 1102 is compiled by a standard compiler 1104 to generate runtime checking object code. The runtime checking object code is combined with the library object code 1108 to generate a library with runtime checking capabilities.

In the preferred embodiment of the invention, pragmas are used to insert argument restrictions into library routines to insulate the user from having to write routines that specify the desired restrictions. However, other methods for allowing the user to specify argument restrictions are also contemplated.

Library Runtime Checking Pragmas

The various pragmas which can be inserted into library routines according to the present invention are described below. As mentioned above, these pragmas are inserted into a library function to specify restrictions on arguments to the library functions. The words in italics in the pragma specifications below have the following meanings:

ident—an identifier.

function—the name of the function for which the pragma applies. This function must be previously declared.

parameter—a parameter identifier for the function. Must be previously declared (either in a prototype or function definition).

Cexp—a C expression (may include references to globals, function parameters and other pragma primitives). The expression should not involve references to structure members or any other expression involving constant offsets from a fixed address.

errorcode—one of the error code constants listed in a later section of this document.

1) #pragma CheckLibSize function parameter Cexp

Restrictions: parameter is a pointer or array type, Cexp is an integer type.

The function generated by this pragma generates a fatal error if the array starting at location given by parameter does not have at least Cexp elements. If Cexp evaluates to zero, then parameter must have at least 1 element.

2) #pragma CheckLibCond function Cexp errorcode parameter

Restrictions: Cexp has integer type.

The function generated by this pragma evaluates the expression Cexp. If the expression Cexp evaluates to zero, a fatal error of type errorcode is generated for the argument corresponding to parameter.

3) #pragma CheckLibGen function Cexp

The function generated by this pragma evaluates the expression Cexp before calling function.

4) #pragma CheckLibReturn function Cexp

Restrictions: Cexp must be of the same type as the return type of function.

The value for the expression Cexp is returned as the value of the function call (function is not called).

5) #pragma CheckLibBkptCond function Cexp ident

Restrictions: Cexp must have integer type ident must be a parameter that has pointer type, a previously declared global variable (may be static), or the primitive RETVAL if function is a non-void function.

This pragma differs from the other pragmas described above in that the pragmas introduced above specify restrictions on arguments into functions, whereas the pragma CheckLibBkptCond checks for errors after a function executes. The expression Cexp is evaluated after the call to function. If the expression evaluates to a non-zero value and an option referred to as "Break on library errors" has been enabled, then a non-fatal runtime error is generated for the function call. The identifier ident (or "return value" ifident is RE TVAL) and its value are included in the error message. If ident is a parameter, then the value of the dereference of the parameter is displayed.

Special Cases: An asterisk * may be used in place of function to indicate that the pragma should apply to all function declarations in the file, except for those that have an explicit CheckLibBkptCond pragma. Also, if Cexp is 0, then ident is not required and no breakpoint checking is performed for the function.

6) #pragma CheckLibRetPtrArg function parameter

This pragma is intended for library functions that return pointers. This pragma specifies that the pointer information to be returned from the function is the pointer information for the argument corresponding to parameter.

This is necessary because a library function cannot be compiled by the compiler of the present invention, and thus the protocol used for returning pointers between caller and callee functions cannot be used.

Pragma Primitives

The following primitives are available for use within the C expressions in pragma lines to aid in specifying restrictions on arguments to functions. In each case, par am refers to a parameter of pointer or array type.

1. NELEMS(param)

Returns the number of elements (unsigned int) in the array specified by param. If unknown, it returns INT_MAX. If invalid array, then it returns 0.

2. NBYTES(param)

Returns the number of bytes (unsigned int) in the array specified by param. If unknown, it returns INT_MAX. If invalid array, then it returns 0.

3. ELEMTYPE(parara)

Returns an integer value that corresponds to the type of the object hat the pointer argument param points to. This is useful for determining what type of argument was passed to a parameter of type void *. The return value is one of the following enumeration constants as defined in "libprot.h". The constant _UPLibOtherType is returned if the type is not known or does not correspond to any of the other enumeration constants.

```
enum UPLibArgTypes {
    _UPLibCharType,
    _UPLibShortType,
    _UPLibIntType,
    _UPLibFloatType,
    _UPLibDoubleType,
    _UPLibOtherType
};
```

4. CHKPTR(param)

Performs basic checks on the pointer parameter. Returns non-zero if no errors were found. Reports a fatal runtime error (and does not return) otherwise.

5. CHKSTR(param)

Performs same checks as CHKPTR, but also verifies that the array is null terminated. Returns non-zero if no errors. Reports a fatal runtime error (and does not return) otherwise.

6. CHKSIZE(param, size)

Determines whether the array specified by param is large enough to hold size elements of the indicated type. A size of 0 is treated the same as if size were 1. A negative size is treated as the corresponding unsigned integer quantity. Returns non-zero if no errors were found; reports a fatal error (and does not return) otherwise.

7–9. CHKPTRNULL(param), CHKSTRNULL(parara), CHKSIZENULL(param,size)

These are exactly the same as CHKPTR, CHKSTR, and CHKSIZE, except they return non-zero and do not report an error if param was assigned NULL. NOTE: It is incorrect to replace CHKPTRNULL(param) with the C expression param==NULL CHKPTR(param). Although param may be NULL, it is possible that it was never initialized and that it has this value by chance. These primitives report an error if param was never initialized, even if it has the NULL value.

10. BLKEND(param)

Attempts to obtain the address of the element just past the end of the array specified by param. Reports a fatal runtime error (and does not return) if param is not a valid array. Returns 0 if unable to determine the address. Note: BLKEND(param) (CHKPTR(param), param+NELEMS(param))

11. RETVAL

Valid only in CheckLibBkptCond pragmas. Contains the return value of the function for which the pragma applies. Its type is the return type of the function. It is not valid for void functions.

Error Codes The following error codes defined in the file libprot.h are recognized by the CheckLibCond pragma. In addition, the function UPLibReportError (int errcode, int parampos, . . . ) can be used to report any of these errors directly. The first argument errcode must be one of the following errors. The second argument parampos indicates which argument to highlight when the error occurs and is the 1-based position of a parameter. If it is zero, then the entire function call expression is highlighted. Additional arguments may be passed to UPLibReportError if errcode expects them.

| Error Code | Message Text |
|---|---|
| UPLibGenError | Illegal argument(s) to library function. |
| UPLibArgNull | Null pointer argument to library function. |
| UPLibArgInvalid | Invalid pointer argument to library function. |
| UPLibArgInit | Uninitialized pointer argument to library function. |
| UPLibArgFree | Pointer to free memory passed to library function. |
| UPLibArgUnder | Negative index into array argument to library function. |
| UPLibArgOver | Array too small as argument to library function. |
| UPLibArgScalar | Scalar argument to library function, expected array. |
| UPLibArgArray | Array argument to library function, expected scalar. |
| UPLibArgNotString | Missing terminating null in string argument. |
| UPLibArgTooSmall | Array argument too small. |
| UPLibArgNotChar | Argument must be character. |

Example Pragmas

The following are examples of pragmas used to implement runtime checking operations according to the present invention.

EXAMPLE 1

```
int isalnum(int ch);
#pragma CheckLibCond isalnum (ch >= EOF && ch <= 0xff)
    _UPLibArgNotChar ch
```

Function isalnum expects its argument to be a valid character (between 0 and 255) or the special integer value EOF, which is −1. The CheckLibCond pragma indicates that the given condition must hold before the function is called. If the condition is false at runtime, then an error is reported corresponding to the constant UPLibArgNotChar and the argument corresponding to the parameter ch is highlighted in the source code.

EXAMPLE 2

```
int ValidatePanel(int panel, int *valid);
#pragma CheckLibGen ValidatePanel    CHKPTR(valid)
```

The library function ValidatePanel expects a valid integer pointer as its second argument valid. The CheckLibGen pragma indicates that the expression CHKPTR(valid) should be evaluated before ValidatePanel is called. The libprot program converts the CHKPTR primitive into an appropriate call into an internal function that verifies that the second argument is a valid pointer.

EXAMPLE 3

```
int strcmp(const char *s1,
    const char *s2);
#pragma CheckLibGen    (CHKSTR(s1) && CHKSTR(s2))
    LWPREFIX(strcmp)
```

The string comparison function strcmp requires that both its arguments be NULL terminated strings. This requirement is specified by the CHKSTR(s1) CHKSTR(s2)) C expression.

EXAMPLE 4

```
int ResetTextBox(int panel,
    int control, char *text);
#pragma CheckLibGen ResetTextBox    CHKSTRNULL(text)
```

The library function ResetTextBox takes a third argument text that must be either a NULL terminated string or NULL. This is easily checked with the CHKSTRNULL primitive. (The C expression text==0 ||CHKSTR(text) is not equivalent to CHKSTRNULL(text. See information about primitives above.)

EXAMPLE 5

```
void *memset(void *s, int c, size_t n);
#pragma CheckLibGen memset CHKSIZE(s, n)
#pragma CheckLibRetPtrArg memset s
```

The library function memset requires that the first argument s point to an allocated block of memory that is at least n bytes in length. The first pragma specifies this requirement with the CHKSIZE primitive. The second pragma indicates that memset returns s as its return value and that the pointer information passed into the function for s should be returned with the return value.

EXAMPLE 6

```
FILE *tmpfile(void);
#pragma CheckLibBkptCond tmpfile (RETVAL == 0) RETVAL
```

When the function tmpfile fails for some reason, it returns 0. The CheckLibBkptCond pragma specifies the conditions under which the function fails and indicates what value to display in the error message. In the case of tmpfile this pragma indicates that a runtime error should be displayed including the return value of the function if the return value is 0. (Note: the present invention reports this type of runtime error only if the "Break on library errors" runtime option is enabled.)

EXAMPLE 7

```
double log(double x);
#pragma CheckLibBkptCond log
    (errno == ERANGE || errno == EDOM) errno
```

The logarithm function log fails and sets the global variable errno to ERANGE or EDOM if the input is negative or too large. This ChkLibBkptCond pragma specifies the conditions under which the log function fails and indicates that the value of errno should be displayed at runtime if it does fail.

EXAMPLE 8

```
int XGraphPopup(char *popupTitle, void *xArray,
    int numPoints, int xDType);
int32 CalcArithArraySize(int32 lwtype, int32 numPoints);
int32 VerifyType(int32 lwtype, int32 elemtype);
#pragma CheckLibGen XGraphPopup
    CHKSTRNULL(popupTitle)
#pragma CheckLibCond XGraphPopup VerifyType(xDType,
    ELEMTYPE(xArray)) _UPLibArgTypeMismatch xArray
```

```
#pragma CheckLibSize XGraphPopup xArray
    CalcArithArraySize(xDType, numPoints)
```

The pragmas for the library function XGraphPopup demonstrate the ability to make complex runtime checks. The function takes a void pointer xArray that must point to an array with numPoints items. The size of each item is given by the parameter xDType which is an integer whose value corresponds to one of the predefined constants (VAL_CHAR, VAL_INTEGER, etc.) defined in the "userint.h" header file.

The first of the pragmas above simply verifies that the argument popupTitle is either NULL or points to a valid NULL terminated string. The second pragma verifies that the type specified by parameter xDType corresponds to the actual type of the elements in array xArray. It assumes the existence of a function VerifyType that returns 0 if the type given by ELEMTYPE does not correspond to the type given by xArray. Finally, the last pragma verifies that the array xArray has at least numPoints elements. The function CalcArithArraySize computes the number of bytes required to hold numPoints elements of size given by xDType.

The Libprot Compiler

The libprot compiler is used for an input file referred to as in_file by typing in the following command:

Usage: libprot<in_file>-o<out_src_file>-h <out_hdr_file>

The input file must be legal ANSI C source code. The macro _LIBPROT_ is predefined by libprot for conditional compilation. The pragmas in the input file are used to generate runtime checking functions as described above. The output header file contains declarations of the generated functions.

The file "libprot.h" in Appendix F includes declarations necessary for compiling the generated output file.

How libprot Creates Source Code

1. The Libprot compiler compiles the input source code, but does not generate any object code. As #pragmas are encountered they are parsed and all primitives are translated as described below. The resulting information is stored in the symbol table with the functions for which they were specified.

Primitive Transformations:

```
    fun         -the function in whose pragma
                 the primitive occurs
    POS(param)  -the parameter position of param
    NELEMS (param)
        =>_UPLibGetNumElems (param, POS(param), &fun)
    NBYTES (param)
        =>_UPLibGetNumBytes (param, POS(param), &fun)
    ELEMTYPE (param)
        =>_UPLibGetPtrArgType (param, POS(param), &fun)
    BLKEND (param)
        =>_UPLibGetBlkEnd (param, POS(param), &fun)
    CHKPTR (param)
        =>_UPLibChkSize (param, sizeof *param,
            1, 0, POS(param), &fun)
    CHKPTRNULL (param)
        =>_UPLibChkSize (param, sizeof *param,
            1, 1, POS(param), &fun)
    CHKSTR (param)
        =>_UPLibChkString (param, 0, POS(param), &fun)
    CHKSTRNULL (param)
        =>_UPLibChkString (param, 1, POS(param), &fun)
    CHKSIZE (param, size)
        =>_UPLibChkSize (param, sizeof *param, size,
```

Primitive Transformations:

```
            0, POS(param), &fun)
    CHKSIZENULL (param, size)
        =>_UPLibChkSize (param, sizeof *param, size,
            1, POS(param), &fun)
    RETVAL
        =>_UPLibRetVal
```

2. After reading the entire input file, libprot goes through each function in the symbol table and checks whether there is any #pragma information associated with the function. If so, then libprot generates a function definition. If the function name is "fun" then the generated function has the name "_UP_fun" and has the same prototype as "fun". Each pragma for the function is then transformed into C code as described below.

Pragma Transformations:

```
    fun             -the function in whose pragma
                     the primitive occurs
    POS(param)      -the parameter position of param
    ReturnType      -the function return type (assuming not void)
#pragma CheckLibSize fun param exp
    =>_UPLibChkSize (param, sizeof *param, exp, 0,
        POS(param), &fun)
#pragma CheckLibCond fun exp errorcode param
    =>if (!exp)
        _UPLibReportError (errorcode, POS(param));
#pragma CheckLibGen fun exp
    =>exp;
#pragma CheckLibReturn fun exp
    =>return exp;
#pragma CheckLibBkptCond fun exp ident
    => (
        ReturnType_UPLibRetBal;
        _UPLibRetVal = fun (param1,
            <other parameters>);
        if (exp)
            _UPLibBreakpoint ("ident", ident, (void*)&fun);
        return _UPLibRetVal;
    )
```

Compiler pragmas

The compiler of the present invention uses the following pragmas to enable and disable runtime checking for library functions. If runtime checking is enabled for a function, then the runtime checking or "protected" version that was generated with the libprot program is used in place of the regular library function. These pragmas are ignored when compiling without debugging information, i.e., when the debugging level in a menu referred to as the Run Options menu is set to None.

pragma EnableLibraryRuntimeChecking pragma DisableLibraryP-untimeChecking

These two pragmas enable and disable library checking for all the function declarations that occur after the pragma within a header or source file. The pragmas affect only the functions declared in the file in which the pragmas occur (nested include files are not affected).

pragma EnableFunctionRuntimeCheckingfunction pragma DisableFunctionRuntimeCheckingfunction

These pragmas enable and disable library checking for a particular function. The function must be declared before the occurrence of the pragma. Protection for statically linked library functions cannot be disabled except by placing the DisableLibraryRuntimeChecking pragma in the library header file.

Operation of the Present Invention

Figure 28A:
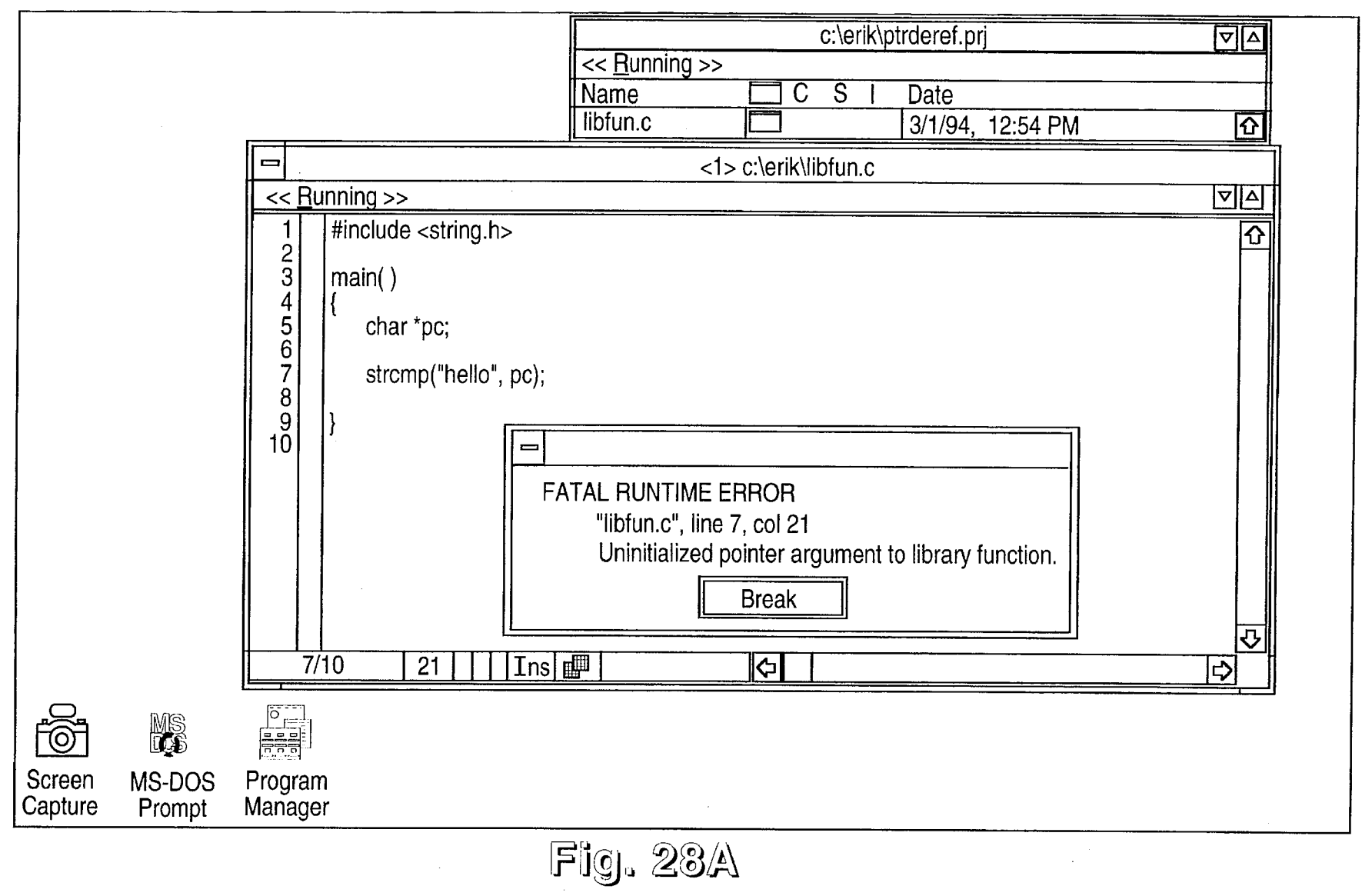
Figure 28B:
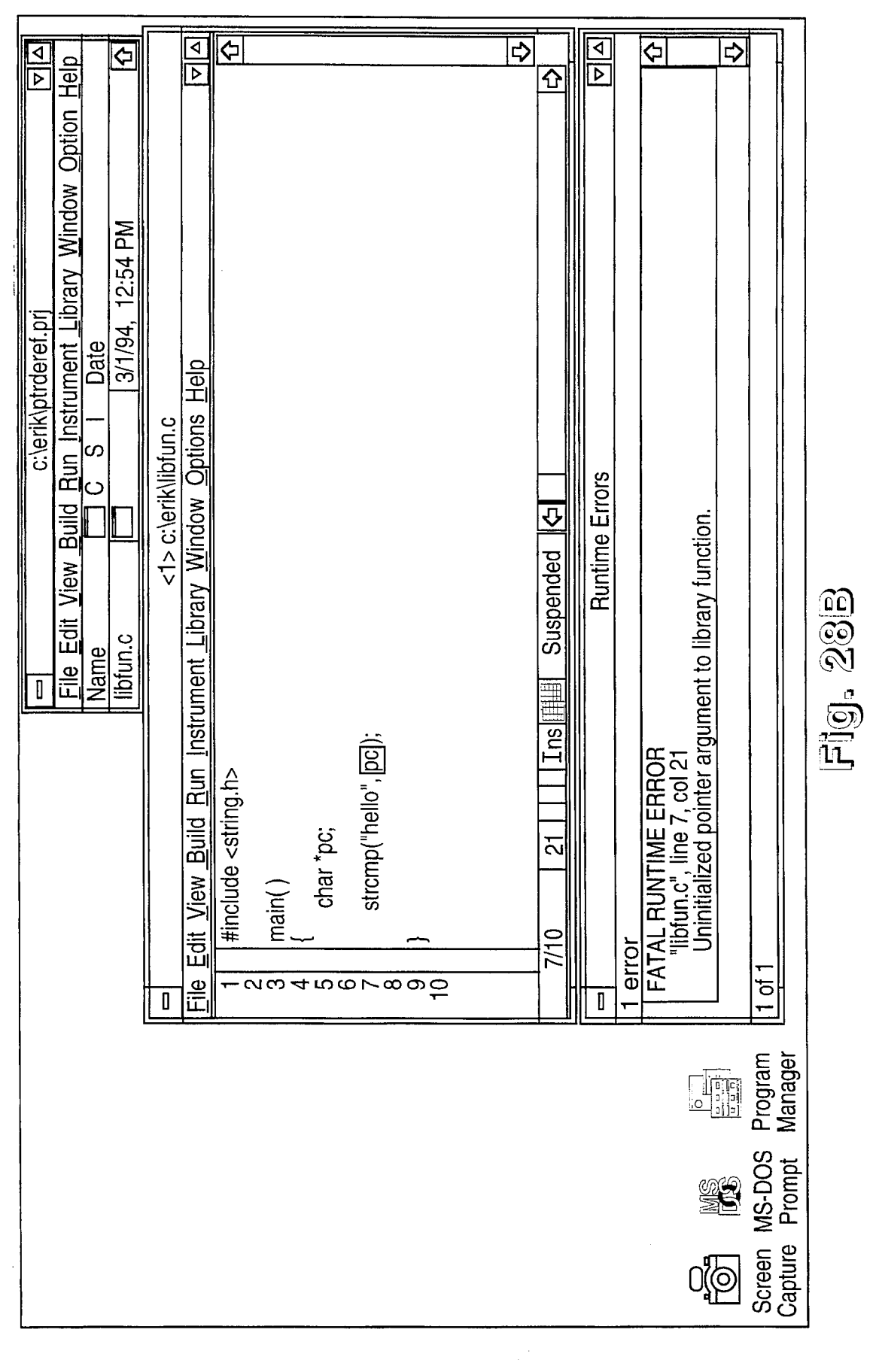
Figure 29B:
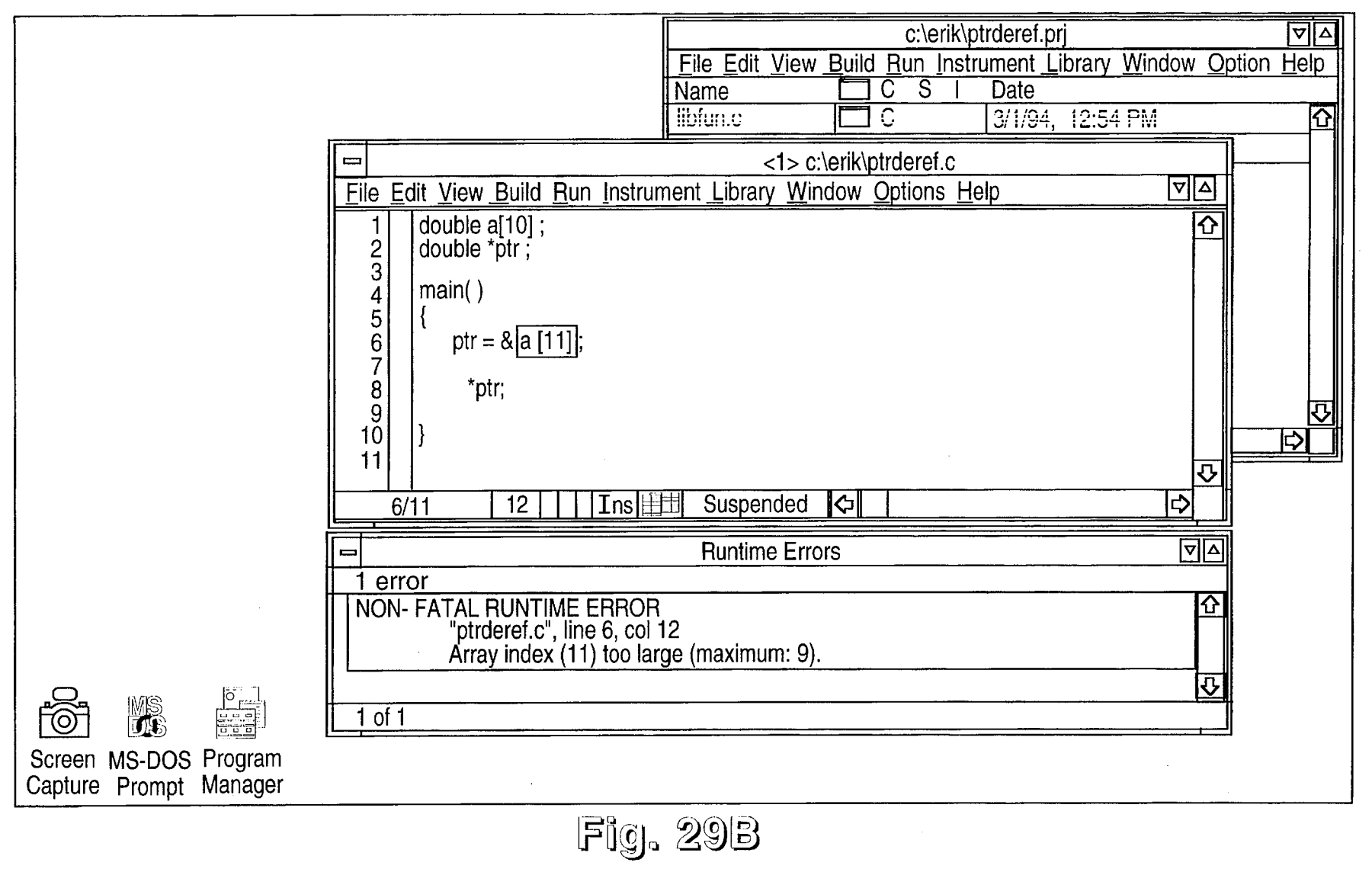
Figure 30A:
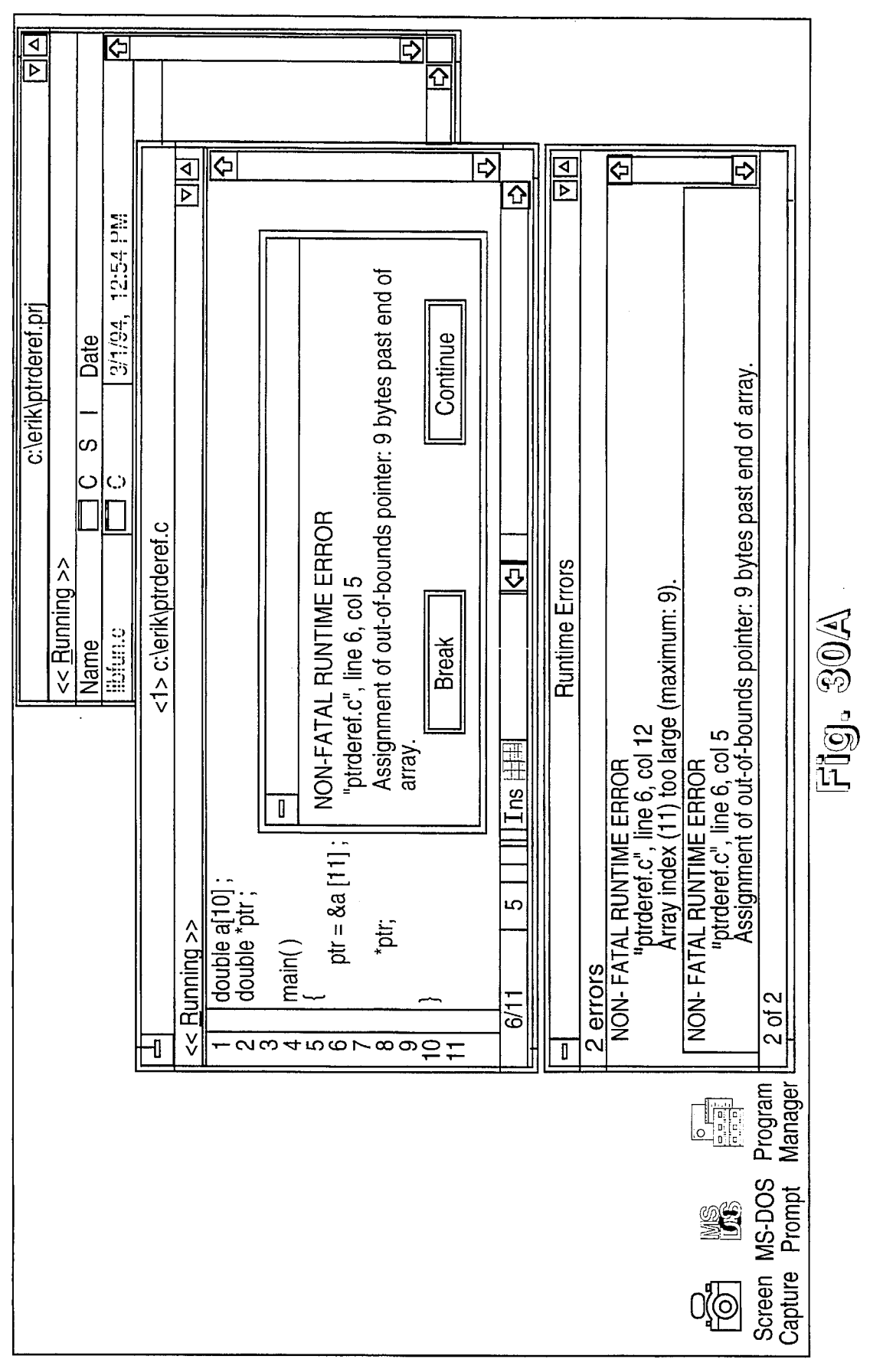
Figure 30B:
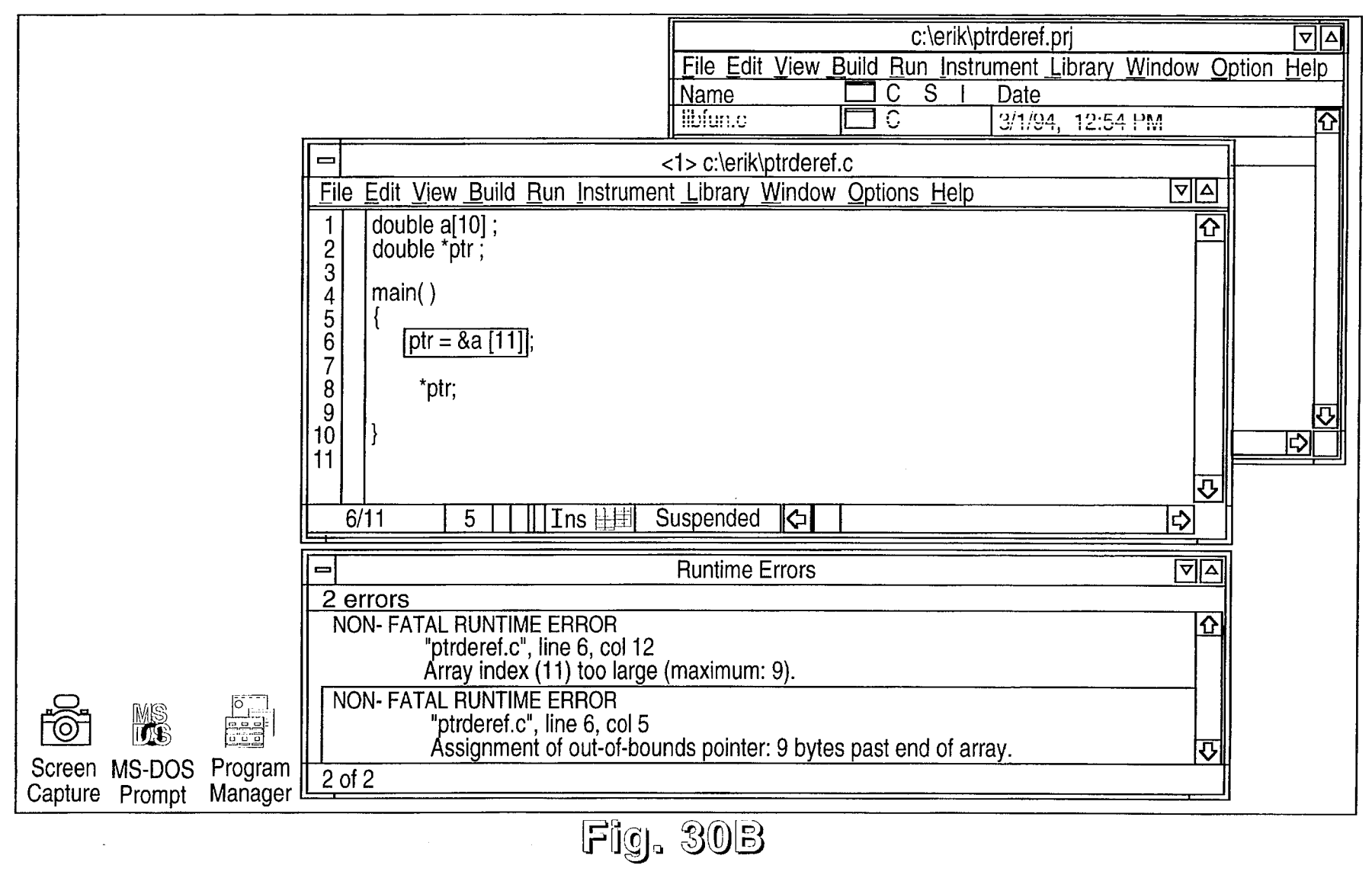
Figure 31B:
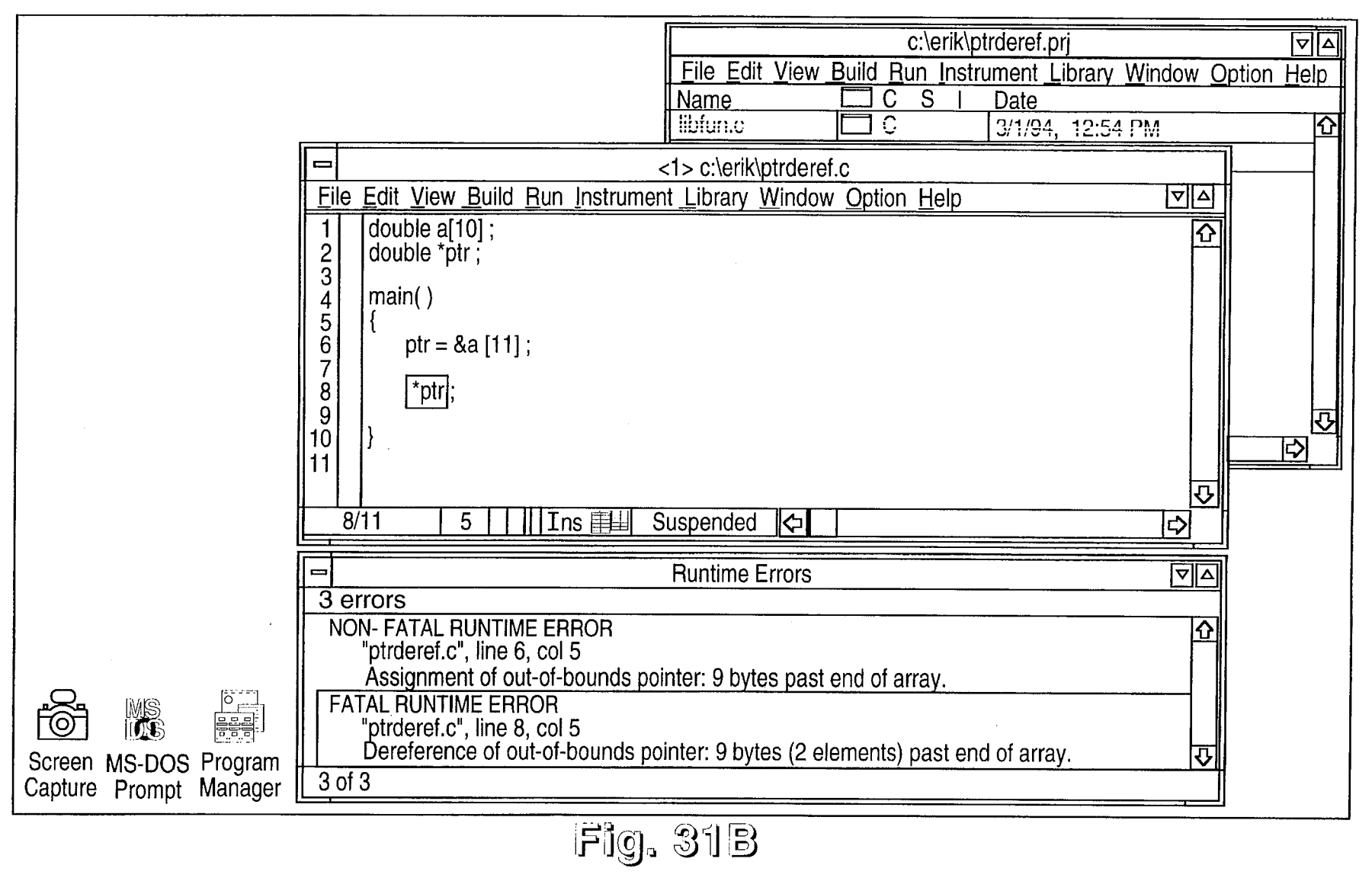

As mentioned above, the present invention is implemented in a computer system to perform runtime checking on various operations within a program to aid the user in debugging. FIGS. 28–31 illustrate the computer's video screen showing programming errors and an error notification by the runtime checking method of the present invention. Each of FIGS. 28–31 include two illustrations A and B wherein FIG. A illustrates the initial error notification provided by the method of the present invention and FIG. B illustrates operation of the runtime checking method in highlighting the portion of the expression causing the error. FIGS. 28A–B illustrate an error of passing an uninitialized pointer to a library function, FIGS. 29A–B illustrate an error indexing an array out-of-bounds, FIGS. 30A–B illustrate an error assigning a pointer to an out-of-bounds pointer, and FIGS. 31A–B illustrate an error of dereferencing an out-of-bounds pointer. It is noted that the error in FIG. 28 is a fatal error, and thus the user's only choice is to break out of the program. The errors in FIGS. 29–31 are non-fatal errors, and thus the user is given the choice of breaking or continuing.

Additional Runtime Checking Operations in an Alternate Embodiment

1. Union members and pointers to union members

In the preferred embodiment, runtime checking is not provided for unions or pointers to unions. However, in an alternate embodiment unions are treated like structures by allocating full pointer information for the union and all of its members. Whenever one union member is assigned a value, the pointer information for the other union members is updated accordingly. This method was not implemented in the preferred embodiment because of 1) the complexity involved in updating pointer information for all union members whenever any member is updated, 2) the possibly large amount of extra storage required to maintain information for all union members (unions are normally used when the user needs to save space) and 3) unions are rarely used in practice.

2. Pointers to local objects of function that has already returned

In the preferred embodiment runtime checking is not provided to catch errors where operations are performed on pointers that point to a local variable of a function that has already returned. However, in an alternate embodiment, the present invention maintains a list of pointers for each function call that contains all the pointers that point into an object that is local to the function call. When the function returns, all the pointers on the list are invalidated. For each pointer assignment (including pointers in arrays and structures), the pointer must be removed from the list it was previously in (if any) and added to the list for the function call to which the object belongs (if it is a local). This large amount of bookkeeping was deemed too expensive for the benefits provided, and thus this runtime checking function was not included in the preferred embodiment.

In another embodiment, an extra field is added to the Pointer Info and Block Info data structures that contains a serial number of the function call to which the object pointed to belongs (if local). Each function call is assigned a unique serial number during execution, which is stored in the Block Info data structure for all objects local to the function. For each pointer assignment, the serial number of the object being assigned is stored with the Pointer Info data structure for the pointer. Whenever a pointer is referenced, the serial number in the Pointer Info data structure is compared to a list of serial numbers for the currently active functions. If the serial number is not in the list, then an error is reported. The large amount of extra storage required for this method was deemed too expensive for the benefits provided, and thus this runtime checking function was not included in the preferred embodiment.

In yet another embodiment, when a pointer is referenced, the present invention ensures that the pointer points to an address that is within the current stack. This method was not implemented because: 1) it does not catch the more subtle errors, and 2) this type of access will likely cause a system access violation error, which the present invention handles through another mechanism.

3. Pointers that are initialized to point within objects that have undefined size at compile time, e.g.

extern int a[];

int *ptr=&a[3 ];

If the array 'a' in the above example does not have at least four elements, then the initialization is an error. The preferred embodiment does not include a method for detecting this error. However, in an alternate embodiment, this error is detected. This error cannot be caught at compile time, but can be caught at link time using the following method. During compilation, the present invention according to this alternate embodiment maintains a list of pointers that were initialized to objects of undefined size. After resolving all global symbols during linking, the present invention examines the list and verifies that the objects into which the pointers point are large enough. The present invention then reports errors for those that are not. This method was not implemented in the preferred embodiment because this type of error rarely occurs.

4. Comparison and subtraction of pointers to the same scalar object, e.g. &obj>&obj.

The preferred embodiment does not include a method for detecting this error. However, in an alternate embodiment, the present invention passes the values of the pointers for the comparison or subtraction to the __PtrChkCompare or __PtrChkSubtract functions. The present invention then uses the pointer values and the special values stored in the Info field for the pointers to determine if the comparison or subtraction is valid. This method was not implemented because of the extra overhead required to pass two more parameters to these functions and because this type of comparison or subtraction rarely occurs.

5. Unspecified pointer parameters in variable argument functions. For example, in the following function, runtime checking for the local variable 'ptr':

```
void f(int a, . . .)
(
    va_list ap;
    int *ptr;
    va_start (ap, a);
    ptr = va_arg (ap, int*);
)
```

In the preferred embodiment, no runtime checking is performed for these errors. However, in an alternate embodiment, the compiler recognizes the special macros 'va_start' and 'va_arg', and inserts calls to special functions that are passed both the type information and the parameter number that is being accessed. These functions determine whether the argument passed to the function is compatible with the type that is being referenced and accesses the pointer information (if any) for the argument, which is used for the expression. Special care is taken to ensure that the pointer information is available for all of the arguments throughout the function. If another variable argument function is called from within a variable argument function, then information for the arguments are pushed onto a stack when it is called and popped off afterwards so that when the function returns information for the arguments to the current function is still available. This method was not implemented because of the complexity involved and because variable argument functions are rarely used.

It is also noted that present invention is language specific and cannot be used on programs in other languages. Further, the present invention does not provide error checking for object code that was not compiled by the compiler of the present invention (except for certain library restrictions). Finally, because of the integrated nature of the present invention, both the linker and debugger of the present invention must be used when performing runtime checking of programs.

Conclusion

Therefore, a method and apparatus for providing runtime checking in a compiled programming development environment is disclosed. Runtime checking is supported for a full text-based programming language, such as the ANSI-C programming language. Runtime checking is also provided for arguments passed to library functions.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for performing runtime checking operations in a compiled programming development environment, comprising the steps of:
   a) compiling a source code file into executable object code comprising machine language instructions, wherein said source code file includes aggregate data items and pointers and also includes expressions which manipulate said aggregate data items and pointers, wherein said step of compiling comprises:
      creating data structures for aggregate data items and pointers in the source code file; and
      inserting calls to runtime checking functions for one or more expressions in the source code file which manipulate said aggregate data items and pointers; and
   b) executing the executable object code, wherein said step of executing comprises:
      executing one or more of said runtime checking functions to determine if invalid operations occur in said expressions which manipulate said aggregate data items and pointers; and
      reporting an error to the user if an invalid operation is found to occur after said step of executing one or more of said runtime checking functions.

2. The method of claim 1, wherein said step of executing the executable object code further comprises:
   executing said expressions which manipulate said aggregate data items and pointers if an invalid operation does not occur in said respective expressions in said step of executing one or more of said runtime checking functions.

3. The method of claim 1, wherein said step of executing said runtime checking functions comprises accessing said data structures and utilizing information in said data structures.

4. The method of claim 1, wherein said step of compiling further comprises:
   inserting instructions in said executable object code which modify values in one or more of said data structures;
   wherein said step of executing the executable object code further comprises executing said instructions which modify values in said one or more of said data structures.

5. The method of claim 1, wherein said step of compiling further comprises:
   inserting instructions in said executable object code which modify values in one or more of said data structures in response to expressions in said source code file which manipulate said aggregate data items and pointers;
   wherein said step of executing the executable object code further comprises executing said instructions which modify values in said one or more of said data structures to update information in said data structures in accordance with said expressions in said source code file which manipulate said aggregate data items and pointers.

6. The method of claim 1, wherein said step of reporting an error comprises providing information on the location in the source code file of the violation causing the error.

7. The method of claim 6, wherein said step of compiling the source code file comprises generating information about the location of said expressions which manipulate said aggregate data items and pointers;
   wherein said step of reporting an error uses said location information to provide information on the location in the source code file of the violation causing the error.

8. The method of claim 1, wherein said step of executing the executable object code comprises updating a data structure comprising current runtime information; and
   wherein said current runtime information data structure comprises information regarding the current function being executed.

9. The method of claim 1, wherein said step of creating data structures for aggregate data items and pointers comprises:
   creating a Block Info data structure for each of a plurality of aggregate data items in the source code file, wherein said Block Info data structure comprises information regarding the beginning of the respective aggregate data item and the size of the respective aggregate data item.

10. The method of claim 1, wherein said step of creating data structures for aggregate data items and pointers comprises:
    creating a Pointer Info data structure for each of a plurality of pointers in the source code file, wherein said Pointer Info data structure comprises information regarding the object to which said respective pointer points.

11. The method of claim 1, wherein said aggregate data items comprise arrays.

12. The method of claim 1, wherein said aggregate data items comprise structures and arrays.

13. The method of claim 1, wherein one or more data structures associated with respective one or more pointers include information regarding the type of object to which said respective pointer points;
    wherein said step of executing said runtime checking functions comprises:
       accessing a data structure associated with a pointer; and
       determining if said object type information in said data structure associated with said pointer corresponds to the type of said pointer;
    wherein said step of reporting an error includes reporting an error if said object type information in said data structure associated with said pointer does not correspond to the type of said pointer.

14. The method of claim 1, wherein said step of executing the executable object code comprises:

accessing a data structure associated with a pointer;

determining if said data structure associated with said pointer indicates that runtime checking functions for said pointer should be ignored;

not performing runtime checking functions for said pointer if said data structure indicates said runtime checking functions for said pointer should be ignored.

15. The method of claim 1, wherein said step of executing said runtime checking functions comprises:

accessing a data structure associated with a pointer; and determining if said data structure associated with said pointer indicates that said pointer is uninitialized;

wherein said step of reporting an error includes reporting an error if said data structure indicates said pointer is uninitialized.

16. The method of claim 1, wherein said step of executing the runtime checking functions comprises:

accessing a data structure associated with a pointer; and determining if said data structure associated with said pointer indicates that said pointer is invalid;

wherein said step of reporting an error includes reporting an error if said data structure indicates said pointer is invalid.

17. The method of claim 1, wherein said step of executing said runtime checking functions comprises:

accessing a data structure associated with a pointer; and determining if said data structure associated with said pointer indicates that said pointer has a null value;

wherein said step of reporting an error includes reporting an error if said data structure indicates said pointer has a null value.

18. The method of claim 1, wherein one or more data structures associated with respective one or more pointers include information regarding the type of object to which said respective pointer points;

wherein said step of executing said runtime checking functions comprises:

accessing a data structure associated with a pointer;

determining if said pointer points to an aggregate data item; and determining if said aggregate data item pointed to by said pointer resides in a deallocated block of memory if said pointer points to an aggregate data item;

wherein said step of reporting an error includes reporting an error if said aggregate data item pointed to by said pointer resides in a deallocated block of memory.

19. The method of claim 18, wherein said step of determining if said aggregate data item pointed to by said pointer resides in a deallocated block of memory comprises accessing a data structure associated with said aggregate data item to determine if said aggregate data item resides in a deallocated block of memory.

20. The method of claim 1, wherein one or more data structures associated with respective one or more pointers include information regarding the type of object to which said respective pointer points;

wherein said step of executing said runtime checking functions comprises:

accessing a data structure associated with a pointer, wherein said pointer is included in an expression that produces a result;

determining if said pointer points to an aggregate data item;

determining if said result of said pointer expression is within the bounds of said aggregate data item if said pointer points to an aggregate data item;

reporting an error if the result of said pointer expression is not within said bounds of said aggregate data item.

21. The method of claim 1, wherein one or more data structures associated with respective one or more pointers include information regarding the type of object to which said respective pointer points;

wherein said step of executing said runtime checking functions comprises:

determining if said object type information in said data structure associated with said pointer corresponds to the type of said pointer;

determining if said pointer points to an object other than a non-aggregate data item; and determining if said pointer points two bytes beyond or one byte before said non-aggregate object if said pointer points to an object other than a non-aggregate data item;

wherein said step of reporting an error includes reporting an error if said pointer points two bytes beyond or one byte before said non-aggregate object.

22. The method of claim 1, wherein said step of executing said runtime checking functions comprises:

accessing data structures of first and second pointers on left and right respective sides of a pointer assignment expression;

determining if said first pointer includes a pointer data structure; and copying the pointer data structure from said second pointer to said first pointer if said first pointer includes pointer information.

23. The method of claim 1, wherein said step of executing said runtime checking functions comprises:

accessing data structures of first and second pointers included in a pointer comparison expression; and determining if said first and second pointers point to the same object;

wherein said step of reporting an error includes reporting an error if said first and second pointers do not point to the same object.

24. The method of claim 1, wherein said step of executing said runtime checking functions comprises:

accessing data structures of first and second pointers included in a pointer subtraction expression; and determining if said first and second pointers point to the same object;

wherein said step of reporting an error comprises reporting an error if said first and second pointers do not point to the same object.

25. The method of claim 1, wherein said step of executing the executable object code comprises:

accessing one or more data structures for pointers and aggregate data items in arguments being passed from a caller function to a callee function;

placing said one or more data structures into a current runtime information data structure;

beginning execution of said callee function; and accessing said one or more data structures from said current runtime information data structure inside said callee function to perform runtime checking operations on expressions inside said callee function.

26. The method of claim 25, wherein said step of executing said runtime checking functions further comprises:

said callee function generating a return value comprising a pointer or aggregate data item;

placing the address of said callee function in the current runtime information data structure;

said callee function returning said return value;

comparing the address of said callee function and the value stored in said current runtime information data structure;

placing an ignore value in a data structure associated with said return value if the address of said callee function does not match said value stored in said current runtime information data structure;

accessing information in said return value data structure if the address of said callee function matches said value stored in said current runtime information data structure.

27. The method of claim 1, wherein the source code file includes an expression that references a pointer;

wherein said step of executing said runtime checking functions comprises:
comparing the value of said pointer and a value stored in the data structure associated with said pointer;
determining if said values correspond; and
placing an ignore value in said pointer data structure if said values do not correspond.

28. The method of claim 1, wherein said step of reporting an error comprises reporting either a fatal error or a non-fatal error, said step of executing the executable file further comprising:

discontinuing operation of said step of executing the executable file if a fatal error is reported in said step of reporting an error.

29. The method of claim 28, wherein said step of executing the executable object code further comprises:

continuing operation of said step of executing the executable object code if a non-fatal error is reported in said step of reporting an error.

30. The method of claim 1, further comprising:

linking said executable object code with externally compiled object code to create linked object code after said step of compiling;

wherein said step of executing the executable object code comprises executing said linked executable object code.

31. The method of claim 1, wherein said step of executing the executable object code further comprises:

dynamically allocating an object in dynamic memory; and creating one or more data structures for said dynamically allocated object.

32. The method of claim 31, wherein said step of executing the executable object code further comprises:

executing one or more of said runtime checking functions to determine if invalid operations occur in expressions which manipulate said dynamically allocated object; and wherein said step of reporting comprises reporting an error if an invalid operation is found to occur in said step of executing one or more of said runtime checking functions.

33. The method of claim 31, wherein said step of executing the executable object code comprises:

monitoring cast expressions in said source code file to determine the type of said dynamically allocated object; and updating said data structure for said dynamically allocated object with said type information.

34. The method of claim 31, wherein said step of executing the executable object code further comprises:

monitoring a pointer into dynamic memory being cast to a non-void type;

recording said non-void type information into said one or more data structures;

creating one or more additional data structures if said non-void type is an aggregate data item.

35. The method of claim 31, wherein said step of executing said runtime checking functions comprises:

executing an expression including a pointer cast expression that casts a pointer to an object of X type to a pointer to an object of Y type;

determining if X is void and said pointer to said object of X type is a pointer to a dynamically created object;

determining if there is sufficient memory for said cast operation to occur if X is void and said pointer to said object of X type is a pointer to a dynamically created object;

reporting an error if there is insufficient space for said cast operation to occur.

36. A method for performing runtime checking on arguments passed to external libraries in a compiled programming environment, comprising the steps of:

inserting argument restrictions into a source code file;

generating argument runtime checking code based on said inserted argument restrictions;

linking said argument runtime checking code to a library;

executing a program which includes one or more calls to functions in said library, wherein said one or more calls to said functions in said library pass one or more arguments to said functions in said library;

executing said argument runtime checking code to determine if said one or more arguments passed to said functions in said library violate said argument restrictions;

reporting an error if said one or more arguments passed to said functions in said library violate said argument restrictions.

37. The method of claim 36, wherein said step of generating comprises generating argument runtime checking source code;

wherein said step of linking comprises linking said argument runtime checking source code with source code of said library to generate linked library source code;

the method further comprising:
compiling said linked library source code into a library object code file;

wherein said step of executing said argument runtime checking code comprises executing said compiled argument runtime checking code in said library object code file.

38. The method of claim 36, wherein said step of generating comprises generating argument runtime checking object code; and wherein said step of linking comprises linking said argument runtime checking object code with object code of said library.

39. The method of claim 36, wherein said step of inserting comprises inserting argument restrictions into a source code file of said library.

40. The method of claim 36, wherein said source code file includes declarations of said functions in said library.

41. A method for performing runtime checking operations in a compiled programming environment, comprising the steps of:

a) compiling a first number of source code files into unlinked object code files comprising machine language instructions, wherein said first number of source code files includes aggregate data items and pointers and also includes expressions which manipulate said aggregate data items and pointers, wherein said step of compiling comprises:

creating runtime checking data structures for aggregate data items and pointers in said first number of source code files; and inserting calls to runtime checking functions for one or more expressions in said first number of source code files which manipulate said aggregate data items and pointers;

b) compiling a second number of source code files into unlinked external object code files, wherein said step of compiling said second number of source code files into unlinked external object code files does not include said steps of creating runtime checking data structures or inserting calls to runtime checking functions;

c) linking said unlinked object code files and said unlinked external object code files into a plurality of linked object code executable files; and d) executing said plurality of linked object code executable files, wherein said step of executing comprises:

executing one or more of said runtime checking functions to determine if invalid operations occur in said expressions which manipulate said aggregate data items and pointers; and reporting an error to the user if an invalid operation is found to occur after said step of executing one or more of said runtime checking functions.

42. The method of claim 41, wherein said step of linking comprises:

receiving an identifier comprised in an expression in an unlinked object code file;

determining if the definition of said identifier resides in an unlinked object code file that was compiled by the compiler of step (a);

determining the address of a data structure associated with said identifier if the definition of said identifier resides in an unlinked object code file that was compiled by the compiler of step (a); and associating said address of said data structure with said identifier.

43. The method of claim 41, wherein said step of linking comprises:

receiving an identifier comprised in an expression in an unlinked object code file;

determining if the definition of said identifier resides in an unlinked object code file that was compiled by the compiler of step (a);

associating an ignore value with said identifier if the definition of said identifier resides in an unlinked object code file that was not compiled by the compiler of step (a).

44. A method for performing runtime checking operations in a compiled programming development environment, comprising the steps of:

a) compiling a source code file into executable object code comprising machine language instructions, wherein said source code file includes pointers and also includes expressions which manipulate said pointers, wherein said step of compiling comprises:

creating data structures for pointers in the source code file; and inserting calls to runtime checking functions for one or more expressions in the source code file which manipulate said pointers; and b) executing the executable object code, wherein said step of executing comprises:

executing one or more of said runtime checking functions to determine if invalid operations occur in said expressions which manipulate said pointers; and reporting an error to the user if an invalid operation is found to occur after said step of executing one or more of said runtime checking functions.

45. An apparatus for performing runtime checking operations in a compiled programming development environment, comprising:

a compiler which compiles a source code file into executable object code comprising machine language instructions, wherein said source code file includes aggregate data items and pointers and also includes expressions which manipulate said aggregate data items and pointers, wherein said compiler creates data structures for aggregate data items and pointers in the source code file and inserts calls to runtime checking functions for one or more expressions in the source code file which manipulate said aggregate data items and pointers; and means for executing the executable object code, wherein said means executes one or more of said runtime checking functions to determine if invalid operations occur in said expressions which manipulate said aggregate data items and pointers and reports an error to the user if an invalid operation is found to occur after executing one or more of said runtime checking functions, wherein said means for executing accesses one or more of said data structures in executing said runtime checking functions.

* * * * *

UNITED STATES PATENT AND TRADEMARK OFFICE
CERTIFICATE OF CORRECTION

PATENT NO. : 5,583,988

DATED : December 10, 1996

INVENTOR(S) : Eric Crank; Jon Bellin

It is certified that error appears in the above-identified patent and that said Letters Patent is hereby corrected as shown below:

```
Claim 41, line 35, please delete "alter" and substitute therefor --
after --.
```

Signed and Sealed this

Twenty-fifth Day of February, 1997

Attest:

BRUCE LEHMAN

*Attesting Officer*  *Commissioner of Patents and Trademarks*